(12) United States Patent
Lym et al.

(10) Patent No.: US 7,577,782 B2
(45) Date of Patent: Aug. 18, 2009

(54) APPLICATION PROGRAMMING INTERFACE FOR DATA TRANSFER AND BUS MANAGEMENT OVER A BUS STRUCTURE

(75) Inventors: Kevin K. Lym, Alameda, CA (US); Hisato Shima, Tokyo (JP); Scott Smyers, San Jose, CA (US); Bruce A. Fairman, Woodside, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 139 days.

(21) Appl. No.: 11/002,048

(22) Filed: Dec. 1, 2004

(65) Prior Publication Data

US 2005/0097245 A1 May 5, 2005

Related U.S. Application Data

(63) Continuation of application No. 10/607,071, filed on Jun. 25, 2003, now Pat. No. 6,901,474, which is a continuation of application No. 09/607,134, filed on Jun. 29, 2000, now Pat. No. 6,631,435, which is a continuation-in-part of application No. 09/337,057, filed on Jun. 21, 1999, now Pat. No. 6,243,783, which is a continuation of application No. 08/594,651, filed on Feb. 2, 1996, now Pat. No. 5,991,520.

(51) Int. Cl.
*G06F 13/20* (2006.01)

(52) U.S. Cl. .................. 710/313; 710/305; 710/306; 711/1

(58) Field of Classification Search .......... 710/313, 710/305–306, 310, 100; 370/395; 711/1; 709/250

See application file for complete search history.

(56) References Cited

U.S. PATENT DOCUMENTS 3,836,722 A  9/1974  Muller et al. ........... 179/15 BS (Continued)

FOREIGN PATENT DOCUMENTS

EP  0 267 974  11/1986

(Continued)

OTHER PUBLICATIONS

"The Parallel Protocol Engine," Matthias Kaiserswerth, IEEE/ACM Transactions on Networking, Dec. 1993, New York, pp. 650-663.

(Continued)

*Primary Examiner*—Clifford H Knoll
*Assistant Examiner*—Kim T Huynh
(74) *Attorney, Agent, or Firm*—Haverstock & Owens LLP

(57) ABSTRACT

In a first embodiment, an applications programming interface (API) implements and manages isochronous and asynchronous data transfer operations between an application and a bus structure. During an synchronous transfer the API includes the ability to transfer any amount of data between one or more local data buffers within the application and a range of addresses over the bus structure using one or more asynchronous transactions. An automatic transaction generator may be used to automatically generate the transactions necessary to complete the data transfer. The API also includes the ability to transfer data between the application and another node on the bus structure isochronously over a dedicated channel. During an isochronous data transfer, a buffer management scheme is used to manage a linked list of data buffer descriptors. During isochronous transfers of data, the API provides implementation of a resynchronization event in the stream of data allowing for resynchronization by the application to a specific point within the data. Implementation is also provided for a callback routine for each buffer in the list which calls the application at a predetermined point during the transfer of data. An isochronous API of the preferred embodiment presents a virtual representation of a plug, using a plug handle, to the application. The isochronous API notifies a client application of any state changes on a connected plug through the event handle. The isochronous API also manages buffers utilized during a data operation by attaching and detaching the buffers to the connected plug, as appropriate, to manage the data flow.

22 Claims, 22 Drawing Sheets

U.S. PATENT DOCUMENTS

| | | | |
|---|---|---|---|
| 3,889,236 A | 6/1975 | Herger et al. | 340/172.5 |
| 3,906,484 A | 9/1975 | Melvin, Jr. et al. | 340/347 DD |
| 4,067,059 A | 1/1978 | Derchak | 364/200 |
| 4,218,756 A | 8/1980 | Fraser | 364/900 |
| 4,379,294 A | 4/1983 | Sutherland et al. | 340/825.5 |
| 4,395,710 A | 7/1983 | Einolf, Jr. et al. | 340/825.5 |
| 4,409,656 A | 10/1983 | Andersen et al. | 364/200 |
| 4,493,021 A | 1/1985 | Agrawal et al. | 364/200 |
| 4,507,732 A * | 3/1985 | Catiller et al. | 710/59 |
| 4,633,392 A | 12/1986 | Vincent et al. | 364/200 |
| 4,641,238 A | 2/1987 | Kneib | 364/200 |
| 4,641,307 A | 2/1987 | Russell | 370/60 |
| 4,739,323 A | 4/1988 | Miesterfeld et al. | 340/825.5 |
| 4,857,910 A | 8/1989 | Baunach | 340/799 |
| 4,897,783 A | 1/1990 | Nay | 364/200 |
| 4,972,470 A | 11/1990 | Farago | 380/3 |
| 4,998,245 A | 3/1991 | Tanaka et al. | 370/85.1 |
| 5,005,151 A | 4/1991 | Kurkowski | 364/900 |
| 5,008,879 A | 4/1991 | Fischer et al. | 370/85.2 |
| 5,117,070 A | 5/1992 | Ueno et al. | 178/2 R |
| 5,128,677 A | 7/1992 | Donovan et al. | 341/177 |
| 5,191,418 A | 3/1993 | Tran | 358/142 |
| 5,199,106 A | 3/1993 | Bourke et al. | 395/275 |
| 5,276,684 A | 1/1994 | Pearson | 370/94.1 |
| 5,301,287 A | 4/1994 | Herrell et al. | 395/400 |
| 5,307,491 A | 4/1994 | Feriozi et al. | 395/700 |
| 5,325,510 A | 6/1994 | Frazier | 395/425 |
| 5,343,469 A | 8/1994 | Ohshima | 370/85.1 |
| 5,359,713 A | 10/1994 | Moran et al. | 395/200 |
| 5,361,261 A | 11/1994 | Edem et al. | 370/85.3 |
| 5,369,773 A | 11/1994 | Hammerstrom | 395/800 |
| 5,400,340 A | 3/1995 | Hillman et al. | 370/105.3 |
| 5,402,419 A | 3/1995 | Osakabe et al. | 370/85.1 |
| 5,412,698 A | 5/1995 | Van Brunt et al. | 375/373 |
| 5,420,573 A | 5/1995 | Tanaka et al. | 340/825.24 |
| 5,444,709 A | 8/1995 | Riddle | 370/94.1 |
| 5,446,854 A * | 8/1995 | Khalidi et al. | 711/1 |
| 5,465,402 A | 11/1995 | Ono et al. | 455/161.2 |
| 5,475,860 A | 12/1995 | Ellison et al. | 395/846 |
| 5,487,153 A | 1/1996 | Hammerstrom et al. | 395/250 |
| 5,493,570 A | 2/1996 | Hillman et al. | 370/105.3 |
| 5,497,466 A | 3/1996 | Roden et al. | 395/306 |
| 5,499,344 A | 3/1996 | Elnashar et al. | 395/250 |
| 5,504,757 A | 4/1996 | Cook et al. | 370/84 |
| 5,506,846 A | 4/1996 | Edem et al. | 370/95.2 |
| 5,509,126 A | 4/1996 | Oprescu et al. | 395/307 |
| 5,517,662 A | 5/1996 | Coleman et al. | 395/800 |
| 5,519,701 A | 5/1996 | Colmant et al. | 370/60.1 |
| 5,524,213 A | 6/1996 | Dais et al. | 395/200.17 |
| 5,526,353 A | 6/1996 | Henley et al. | 370/60.1 |
| 5,533,018 A | 7/1996 | DeJager et al. | 370/60.1 |
| 5,535,208 A | 7/1996 | Kawakami et al. | 370/84 |
| 5,537,408 A | 7/1996 | Branstad et al. | 370/79 |
| 5,544,324 A | 8/1996 | Edem et al. | 395/200.17 |
| 5,546,389 A | 8/1996 | Wippenbeck et al. | 370/60 |
| 5,546,553 A | 8/1996 | Robertson et al. | 395/405 |
| 5,548,587 A | 8/1996 | Bailey et al. | 370/60.1 |
| 5,550,802 A | 8/1996 | Worsley et al. | 370/13 |
| 5,557,724 A | 9/1996 | Sampat et al. | 395/157 |
| 5,559,796 A | 9/1996 | Edem et al. | 370/60 |
| 5,559,967 A | 9/1996 | Oprescu et al. | 395/285 |
| 5,566,174 A | 10/1996 | Sato et al. | 370/84 |
| 5,586,264 A | 12/1996 | Belknap et al. | 395/200.08 |
| 5,594,732 A | 1/1997 | Bell et al. | 370/401 |
| 5,594,734 A | 1/1997 | Worsley et al. | 370/395 |
| 5,602,853 A | 2/1997 | Ben-Michael et al. | 370/474 |
| 5,603,058 A | 2/1997 | Belknap et al. | 395/855 |
| 5,606,559 A * | 2/1997 | Badger et al. | 370/395.7 |
| 5,615,382 A | 3/1997 | Gavin et al. | 395/800 |
| 5,617,419 A | 4/1997 | Christensen et al. | 370/471 |
| 5,619,646 A | 4/1997 | Hoch et al. | 395/200.01 |
| 5,632,016 A | 5/1997 | Hoch et al. | 395/200.02 |
| 5,634,034 A | 5/1997 | Foster | 395/474 |
| 5,640,392 A * | 6/1997 | Hayashi | 370/465 |
| 5,640,592 A | 6/1997 | Rao | 710/5 |
| 5,646,941 A | 7/1997 | Nishimura et al. | 370/389 |
| 5,647,057 A | 7/1997 | Roden et al. | 395/275 |
| 5,652,584 A | 7/1997 | Yoon | 341/89 |
| 5,655,138 A | 8/1997 | Kikinis | 395/808 |
| 5,659,780 A | 8/1997 | Wu | 395/800.19 |
| 5,664,124 A | 9/1997 | Katz et al. | 395/309 |
| 5,668,948 A | 9/1997 | Belknap et al. | 395/200.61 |
| 5,673,425 A | 9/1997 | Iwashita | 395/568 |
| 5,682,493 A | 10/1997 | Yung et al. | 395/393 |
| 5,684,954 A | 11/1997 | Kaiserswerth et al. | 395/200.2 |
| 5,687,174 A | 11/1997 | Edem et al. | 370/446 |
| 5,687,316 A | 11/1997 | Graziano et al. | 395/200.2 |
| 5,689,244 A | 11/1997 | Iijima et al. | 340/825.07 |
| 5,689,727 A | 11/1997 | Bonke et al. | 395/840 |
| 5,692,211 A | 11/1997 | Gulick et al. | 395/800 |
| 5,694,555 A | 12/1997 | Moriss et al. | 395/280 |
| 5,696,924 A | 12/1997 | Robertson et al. | 395/412 |
| 5,701,302 A | 12/1997 | Geiger | 370/521 |
| 5,704,052 A | 12/1997 | Wu et al. | 395/380 |
| 5,706,439 A | 1/1998 | Parker | 395/200.17 |
| 5,708,779 A | 1/1998 | Graziano et al. | 395/200.8 |
| 5,710,773 A | 1/1998 | Shiga | 370/512 |
| 5,719,942 A | 2/1998 | Aldred et al. | 380/49 |
| 5,751,951 A * | 5/1998 | Osborne et al. | 709/250 |
| 5,752,076 A | 5/1998 | Munson | 395/825 |
| 5,758,075 A | 5/1998 | Graziano et al. | 395/200.8 |
| 5,761,430 A | 6/1998 | Gross et al. | 395/200.55 |
| 5,761,457 A | 6/1998 | Gulick | 395/308 |
| 5,761,464 A * | 6/1998 | Hopkins | 710/310 |
| 5,774,683 A | 6/1998 | Gulick | 395/309 |
| 5,781,599 A | 7/1998 | Shiga | 375/376 |
| 5,784,712 A | 7/1998 | Byers et al. | 711/219 |
| 5,787,298 A | 7/1998 | Broedner et al. | 395/750.05 |
| 5,790,743 A | 8/1998 | Sugiyama et al. | 386/52 |
| 5,793,953 A | 8/1998 | Yeung et al. | 395/200.8 |
| 5,809,249 A | 9/1998 | Julyan | 395/200.53 |
| 5,812,883 A | 9/1998 | Rao | 395/8.94 |
| 5,815,678 A * | 9/1998 | Hoffman et al. | 710/305 |
| 5,826,041 A | 10/1998 | Ogus | 395/250 |
| 5,828,416 A | 10/1998 | Ryan | 348/512 |
| 5,828,903 A | 10/1998 | Sethuram et al. | 395/898 |
| 5,832,245 A | 11/1998 | Gulick | 395/309 |
| 5,835,726 A | 11/1998 | Shwed et al. | 709/229 |
| 5,835,793 A | 11/1998 | Li et al. | 395/898 |
| 5,848,253 A | 12/1998 | Walsh et al. | 395/309 |
| 5,872,569 A | 2/1999 | Salgado et al. | 345/349 |
| 5,872,983 A | 2/1999 | Walsh et al. | 395/750.01 |
| 5,875,312 A | 2/1999 | Walsh et al. | 395/309 |
| 5,884,103 A | 3/1999 | Terho et al. | 710/72 |
| 5,887,145 A | 3/1999 | Harari et al. | 395/282 |
| 5,915,019 A | 6/1999 | Ginter et al. | 380/4 |
| 5,930,480 A | 7/1999 | Staats | 395/200 |
| 5,938,752 A | 8/1999 | Leung et al. | 710/126 |
| 5,946,298 A | 8/1999 | Okuyama | 370/232 |
| 5,970,236 A | 10/1999 | Galloway et al. | 395/500.4 |
| 5,987,126 A | 11/1999 | Okuyama et al. | 380/5 |
| 5,991,520 A | 11/1999 | Smyers et al. | 395/280 |
| 6,005,565 A | 12/1999 | Legall et al. | 345/327 |
| 6,085,270 A | 7/2000 | Gulick | 710/100 |
| 6,122,279 A | 9/2000 | Milway et al. | 370/395 |
| 6,205,538 B1 | 3/2001 | Yung | 712/201 |
| 6,233,637 B1 | 5/2001 | Smyers et al. | 710/129 |
| 6,243,783 B1 | 6/2001 | Smyers et al. | 710/129 |
| 6,266,727 B1 | 7/2001 | Smyers et al. | 710/105 |
| 6,272,499 B1 * | 8/2001 | Wooten | 707/102 |
| 6,519,268 B1 | 2/2003 | Smyers | 370/536 |
| 6,584,099 B1 | 6/2003 | Sato et al. | 370/162 |
| 6,587,910 B2 | 7/2003 | Smyers et al. | 710/306 |
| 6,631,435 B1 | 10/2003 | Lym et al. | 710/305 |

| | | | |
|---|---|---|---|
| 6,901,474 B2 | 5/2005 | Lym et al. | 710/305 |
| 2005/0097245 A1 | 5/2005 | Lym et al. | 710/52 |

FOREIGN PATENT DOCUMENTS

| | | |
|---|---|---|
| EP | 0 428 111 A2 | 5/1991 |
| EP | 0 499 394 A1 | 8/1992 |
| EP | 0 578 013 A1 | 1/1994 |
| EP | 0 588 046 A1 | 3/1994 |
| EP | 0 651 329 A2 | 5/1995 |
| EP | 0 696 853 A2 | 2/1996 |
| EP | 0 632 391 B1 | 11/1999 |
| GB | 2 275 852 | 9/1994 |
| JP | 63-129449 | 6/1988 |
| JP | 4-318649 | 11/1992 |
| JP | 6-30035 | 2/1994 |
| JP | 6-161932 | 6/1994 |
| JP | 6-326968 | 11/1994 |
| JP | 7-182260 | 7/1995 |
| JP | 7-222263 | 8/1995 |
| JP | 7-327287 | 12/1995 |
| JP | 8-32644 | 2/1996 |
| WO | WO 92/05487 | 2/1992 |

OTHER PUBLICATIONS

"The Programmable Protocol VLSI Engine (PROVE)," A.S. Krishnakumar, W.C. Fischer, and Krishan Sabnani, IEEE Transactions on Communications, Aug. 1994, New York, pp. 2630-2642.

"A Bus on a Diet-The Serial Bus Alternative. An Introduction to the P1394 High Performance Serial Bus," Michael Teener, CompCon92, Feb. 1992, pp. 316-321.

"1394 200 Mb/s PHYsical Layer Transceiver," IBM Microelectronics, Product Data Sheet and Application Notes, Version 1.4, Mar. 14, 1996.

"The IEEE-1394 High Speed Serial Bus," R.H.J. Bloks, Philips Journal of Research, vol. 50., No. 1/2, pp. 209-216, 1996.

"IEEE 1394-1995 Triple Cable Transceiver/Arbiter," Texas Instruments TSB21LV03, Product Review, Revision 0.99, Mar. 19, 1996.

"P1394 Standard for A High Performance Serial Bus," IEEE, 1995.

"Data link driver program design for the IBM token ring network PC adapter," Gee-Swee Poo and Wilson Ang. Computer Communications, vol. 12, No. 5, pp. 266-272, Oct. 1989.

"Fiber Channel(FCS)/ATM interworking: A design solution" A. Anzaloni et al., Ericsson Fatme R&D Division, Rome, I, Globecom '93, vol. 2, pp. 1127-1133, Nov. 29, 1993.

"The SerialSoft IEEE 1394 Developer Toolkit," Toolkit Tk-01, Release 2, Skipstone, Inc.

"(Part 1 of 3) Local Area Network Protocol for Autonomous Control of Attached Devices," Software Patent Institute Database of Software Technologies, IBM, Jul. 1990.

"(Part 1 of 4) Architecture for High Performance Transparent Bridges," Software Patent Institute Database of Software Technologies, IBM, Jul. 1992.

"Access to High-Speed LAN via Wireless Media," Software Patent Institute Database of Software Technologies, IBM, Apr. 1993.

"Asynchronous Transfer Mode," Julia L. Heeter, Dec. 12, 1995.

"Data Exchange Adapter for Micro Channel/370," Software Patent Institute Database of Software Technologies, Oct. 1991.

"IEEE 1394, The Cable Connection to Complete the Digital Revolution," Daniel Moore.

"PC Intern 4 Systemprogrammierung," Michael Tischer, pp. 162-181, Data Becker GmbH, 1994, Dusseldorf, Germany.

"Digital Interface for Consumer Audio/Video Equipment—Part 5: SDL-DVCR Data Transmission," International Electrotechnical Commision, FORM 9 (IEC), Jan. 2, 1997.

* cited by examiner

APPLICATION PROGRAMMING INTERFACE FOR DATA TRANSFER AND BUS MANAGEMENT OVER A BUS STRUCTURE

RELATED APPLICATIONS

This Patent Application claims priority under 35 U.S.C. §119(e) of the co-pending U.S. provisional application Ser. No. 60/208,825 filed on Jun. 2, 2000 and entitled "APPLICATION PROGRAMMING INTERFACE FOR DATA TRANSFER AND BUS MANAGEMENT OVER A BUS STRUCTURE." The provisional application Ser. No. 60/208,825 filed on Jun. 2, 2000 and entitled "APPLICATION PROGRAMMING INTERFACE FOR DATA TRANSFER AND BUS MANAGEMENT OVER A BUS STRUCTURE," is also hereby incorporated by reference.

This Patent Application is a continuation application of U.S. patent application Ser. No. 10/607,071, filed on Jun. 25, 2003 now U.S. Pat. No. 6,901,474, and entitled "Application Programming Interface For Data Transfer And Bus Management Over A Bus Structure," which is a continuation application of U.S. patent application Ser. No. 09/607,134, filed on Jun. 29, 2000, and entitled "Application Programming Interface For Data Transfer And Bus Management Over A Bus Structure," now issued as U.S. Pat. No. 6,631,435, which is a continuation-in-part of U.S. patent application Ser. No. 09/337,057, filed on Jun. 21, 1999, and entitled "Application Programming Interface For Managing And Automating Data Transfer Operations Between Applications Over A Bus Structure," now issued as U.S. Pat. No. 6,243,783, which is a continuation of Ser. No. 08/594,651, filed Feb. 2, 1996, U.S. Pat. No. 5,991,520, issued on Nov. 23, 1999, and entitled "Application Programming Interface For Managing And Automating Data Transfer Operations Between Applications Over A Bus Structure," The application Ser. No. 09/607,134, filed on Jun. 29, 2000, and entitled "Application Programming Interface For Data Transfer And Bus Management Over A Bus Structure," the application Ser. No. 09/337,057, filed on Jun. 21, 1999, and entitled "Application Programming Interface For Managing And Automating Data Transfer Operations Between Applications Over A Bus Structure" now issued as U.S. Pat. No. 6,243,783, and the U.S. Pat. No. 5,991,520, issued on Nov. 23, 1999, and entitled "Application Programming Interface For Managing And Automating Data Transfer Operations Between Applications Over A Bus Structure" are all hereby incorporated by reference.

FIELD OF THE INVENTION

The present invention relates to the field of providing an interface for applications to communicate over a bus structure. More particularly, the present invention relates to the field of controlling bus management and data transfer operations between applications over a bus structure in both asynchronous and isochronous formats.

BACKGROUND OF THE INVENTION

The IEEE 1394-1995 standard, "1394 Standard For A High Performance Serial Bus," is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. An example of an ideal application for the transfer of data isochronously would be from a video recorder to a television set. The video recorder records images and sounds and saves the data in discrete chunks or packets. The video recorder then transfers each packet, representing the image and sound recorded over a limited time period, during that time period, for display by the television set. The IEEE 1394 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394 standard provides a high-speed serial bus for interconnecting digital devices thereby providing a universal I/O connection. The IEEE 1394 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394 standard is very thin in size compared to other bulkier cables used to connect such devices. Devices can be added and removed from an IEEE 1394 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

The IEEE 1394 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394 cable. The physical layer 16 also provides arbitration to ensure that all devices coupled to the IEEE 1394 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

An application programming interface (API) for applications using the IEEE 1394 standard serial bus has been developed by Skipstone for enabling the application to use the IEEE 1394 bus for data transfers. With their API, Skipstone includes a manual entitled "The SerialSoft IEEE 1394 Developer Toolkit," available from Skipstone, Inc., 3925 West Braker Lane, #425, Austin, Tex. 78759. Skipstone defines their API as a collection of programming calls to be used by the application to manage data being written to and obtained from a device over an IEEE 1394 bus. To initialize an isochronous transfer, several asynchronous data transfers may be required to configure the applications and to determine the specific channel which will be used for transmission of the data. Once the channel has been determined, buffers are used at the transmitting application to store the data before it is sent and at the receiving application to store the data before it is processed. In a transmitting application, the Skipstone API actively manages the transfer of data from the appropriate portion of the appropriate buffer onto the bus structure, during the appropriate time period. In a receiving application, the Skipstone API actively manages the reception of data from the bus structure, storing the data in the appropriate portion of the appropriate buffer and the processing of the data in the appropriate time period.

During asynchronous data transfers, the Skipstone API actively manages the required transactions to complete the data transfer. During an asynchronous incoming write transaction, the application provides a buffer to the API, mapped to a certain area of the 1394 bus address space. As write transactions arrive at the API, their data is written to the buffer. During an asynchronous incoming read transaction the application is responsible for making sure that the buffer contains useful information. The 1394 bus driver then reads the data from the buffer at the requested address when the read transaction arrives. For both write and read transactions, the Skipstone API actively manages and generates each necessary transaction. For example, if a block of data is being transferred to the application, of a size requiring multiple transactions, the Skipstone API requires the application to describe each 1394 transaction necessary to complete the transfer of the block of data. This consumes significant overhead by the processor of the application as well as the full attention of the API during an asynchronous data transfer operation.

The Skipstone API supports isochronous data transfer operations in a similar way. Specifically, the application must describe each isochronous packet to the Skipstone API. The Skipstone API then transmits each packet at the proper time. This requires significant processor overhead and thereby prohibits efficient processing of the isochronous data by the application.

A block diagram of an exemplary IEEE 1394-1995 serial bus network including a computer system and a video camera is illustrated in FIG. 7. The computer system 200 includes an associated display 202 and is coupled to the video camera 204 by the IEEE 1394-1995 serial bus cable 206. Video data and associated data are sent between the video camera 204 and the computer 200 over the IEEE 1394-1995 serial bus cable 206.

A block diagram of the internal components of the computer system 200 is illustrated in FIG. 8. The computer system 200 includes a central processor unit (CPU) 244, a main memory 230, a video memory 246, a mass storage device 232 and an IEEE 1394-1995 interface circuit 228, all coupled together by a conventional bidirectional system bus 234. The interface circuit 228 includes the physical interface circuit 242 for sending and receiving communications on the IEEE 1394-1995 serial bus. The physical interface circuit 242 is coupled to the camera 204 over the IEEE 1394-1995 serial bus cable 206. The system bus 234 contains an address bus for addressing any portion of the memory 230 and 246. The system bus 234 also includes a data bus for transferring data between and among the CPU 244, the main memory 230, the video memory 246, the mass storage device 232 and the interface circuit 228.

The computer system 200 is also coupled to a number of peripheral input and output devices including the keyboard 238, the mouse 240 and the associated display 202. The keyboard 238 is coupled to the CPU 244 for allowing a user to input data and control commands into the computer system 200. A conventional mouse 240 is coupled to the keyboard 238 for manipulating graphic images on the display 202 as a cursor control device.

A port of the video memory 246 is coupled to a video multiplex and shifter circuit 248, which in turn is coupled to a video amplifier 250. The video amplifier 250 drives the display 202. The video multiplex and shifter circuitry 248 and the video amplifier 250 convert pixel data stored in the video memory 246 to raster signals suitable for use by the display 202.

IEC-61883 is a ratified international standard for the transport of audio/video command requests and responses. This standard uses the concept of plugs and plug control registers to manage and control the attributes of isochronous data flows. It should be noted that plugs do not physically exist on an audio/video device, but a plug is used to establish an analogy with existing audio/video devices where each flow of information is routed through a physical plug.

An isochronous data flow flows from one transmitting device, such as the video camera 204, to one or more receiving devices, such as the computer system 200, by transmitting isochronous packets on an isochronous channel of the IEEE 1394-1995 serial bus. Each isochronous data flow is transmitted to an isochronous channel through one output plug on the transmitting device and is received from that isochronous channel through one input plug on the receiving device.

The transmission of an isochronous data flow through an output plug is controlled by an output plug control register (oPCR) and an output master plug register (oMPR) located on the transmitting device. The output master plug register controls all attributes that are common to all isochronous data flows transmitted by the corresponding transmitting device. The output plug control register controls all attributes of the corresponding isochronous data flow that are independent from attributes of other isochronous data flows transmitted by the transmitting device.

The reception of an isochronous data flow through an input plug is controlled by an input plug control register (iPCR) and an input master plug register (iMPR) located on the receiving device. The input master plug register controls all attributes that are common to all isochronous data flows received by the receiving device. The input plug control register controls all attributes of the corresponding isochronous data flow that are independent from attributes of other isochronous data flows received by the receiving device.

An isochronous data flow can be controlled by any device connected to the IEEE 1394-1995 bus by modifying the corresponding plug control registers. Plug control registers can be modified through asynchronous transactions on the IEEE 1394-1995 bus or by internal modifications if the plug control registers are located on the controlling device.

To transport isochronous data between two audio/video devices on the IEEE 1394-1995 bus, it is necessary for an application to connect an output plug on the transmitting device to an input plug on the receiving device using an isochronous channel. The relationship between one input plug, one output plug and one isochronous channel is called a point-to-point connection. A point-to-point connection can only be broken by the application that established it. An application can also just start the transmission or reception of an isochronous data flow on its own device by connecting one of its output or input plugs respectively to an isochronous channel. The relationship between one output plug and one isochronous channel is called a broadcast-out connection. The relationship between one input plug and one isochronous channel is called a broadcast-in connection. Broadcast-out and broadcast-in connections are collectively called broadcast connections. A broadcast connection can be established only by the device on which the plug is located, but it can be broken by any device.

A plug has four possible states. These states are idle, ready, active and suspended. A plug is either on-line or off-line. Only a plug that is on-line is capable of transmitting or receiving an isochronous data flow. A plug will be off-line, for example, if it relies on resources that are temporarily unpowered or otherwise unavailable. A plug to which no connections exist is referred to as unconnected. A plug to which one or more connections exist is referred to as connected. A plug which is connected and on-line is in the active state. Only an active plug shall transmit or receive an isochronous data flow except in the case of a bus reset where the isochronous data flow is resumed immediately after the bus-reset.

A diagram of the software layers implemented within an IEEE 1394-1995 capable computer system 200 is illustrated in FIG. 9. The application layer 280 includes at least one application 286. The driver layer 282 includes the 1394 Protocol driver 288, the 1394 Bus Class driver 290 and the 1394 Port driver 292. The 1394 Protocol driver 288 performs commands that allow the application to communicate with other devices or applications across the IEEE 1394-1995 serial bus, such as the video camera 204. The 1394 Bus Class driver 290 is responsible for communications sent and received over the IEEE 1394-1995 serial bus. The 1394 Port driver 292 is a hardware interface driver. The hardware layer 284 includes the 1394 PCI Interface module 294 which provides the interface between the IEEE 1394-1995 serial bus and the system bus 234 within the computer system 200. The 1394 PCI Interface module 294 is coupled to the physical interface 296 of the video camera 204 by the IEEE 1394-1995 serial bus.

Such a stack of software layers as illustrated in FIG. 9 is currently provided by Microsoft within the Windows™ 98 operating system. The application programming interface (API) provided within this current implementation included within the Windows™ operating system provides no feedback to an application relating to activities that occur on a plug. For example, if another device on the IEEE 1394-1995 serial bus changes the plug's connection or the isochronous data flow for a plug, these state changes are not reported by this API to the upper layer software which is using the plug, causing the upper layer software to fall into an unknown working state. This API also does not allow upper layer software clients to explicitly establish connections between other devices on the IEEE 1394-1995 serial bus. This API will also not allow a client application to create the actual connection and manage the type of connection between the PC and the external device.

What is needed is an API that provides automated generation of transactions necessary to complete a data transfer, without requiring supervision by the API and the processor of an application. What is further needed is an API which implements isochronous transfer features of the IEEE 1394 standard bus structure very efficiently, permitting a high degree of hardware automation, if needed by the application.

SUMMARY OF THE INVENTION

In a first embodiment, an applications programming interface implements and manages isochronous and asynchronous data transfer operations between an application and a bus structure. During an asynchronous transfer the API includes the ability to transfer any amount of data between one or more local data buffers within the application and a range of addresses over the bus structure using one or more asynchronous transactions. An automatic transaction generator may be used to automatically generate the transactions necessary to complete the data transfer without direct processor control or supervision by the applications programming interface. The API also includes the ability to transfer data between the application and another node on the bus structure isochronously over a dedicated channel. During an isochronous data transfer, a buffer management scheme is used to manage a linked list of data buffer descriptors provided by the application. The linked list of buffer descriptors is maintained by the API to ensure the uninterrupted flow of the continuous stream of isochronous data. This linked descriptor list can form a circular list of buffers and include a forward pointer to the next buffer in the list and a backward pointer to the previous buffer in the list for each buffer. The linked descriptor list may also form a linear list to which the application can append additional buffers or remove existing buffers from the list. During isochronous transfers of data, the API provides implementation of a resynchronization event in the stream of data allowing for resynchronization by the application to a specific point within the data. Implementation is also provided for a callback routine for each buffer in the list which calls the application at a predetermined point during the transfer of data.

In a preferred embodiment, an isochronous applications programming interface (API) implements and manages isochronous data transfer and receive operations between an application and a bus structure. The isochronous API presents a virtual representation of a plug, using a plug handle, in which multiple client applications can register to a given plug. Broadcast transmission operations are managed through an output plug to transmit data on a specified isochronous channel. Broadcast reception operations are managed through an input plug to receive data on a specified isochronous channel. Point-to-point transmission operations are managed through an output plug to transmit data to a specified input plug on a receiving device. Point-to-point reception operations are managed through an input plug to receive data from a specified output plug on a transmitting device. When receiving a request from a client application for an isochronous data transmission or reception, the isochronous API connects an appropriate plug, allocates the appropriate resources and manages the resources during the data transmission or reception. During a data transmission, the isochronous API attaches appropriate filled buffers to the output plug and when the data within the buffer is transmitted, detaches the buffer from the output plug. During a data reception, the isochronous API attaches appropriate buffers to be filled to the input plug and when the buffer is filled with received data, detaches the buffer from the input plug. The isochronous API also notifies a client application of any state changes on a connected plug through an event handle.

In one aspect of the present invention, an interface between an application and a bus structure for controlling isochronous data operations to and from the application over the bus structure includes means for allocating resources necessary for the isochronous data operation and means for controlling isochronous data flow between the application and the bus structure including managing buffers for the application utilized in the data operation. The resources include an isochronous channel and isochronous bandwidth. The isochronous data flow is from the application to the bus structure for transmission operations and from the bus structure to the application for reception operations. The bus structure preferably substantially complies with a version of the IEEE 1394 standard. The resources include a plug and the means for allocating resources connects the plug to the application. The means for controlling communicates with the application regarding changes in state of the plug. The interface provides a representation of the plug to the application. The isochronous data flow is from the application to the bus structure through an output plug for transmission operations and from the bus structure to the application through an input plug for reception operations. During a transmission operation, the means for controlling attaches filled buffers to the output-plug and detaches buffers from the output plug after data within the buffers has been transmitted on the bus structure. During a reception operation, the means for controlling attaches buffers to be filled to the input plug and detaches filled buffers from the input plug. The means for controlling triggers an event to inform the application regarding changes in state of the plug. Each of the buffers preferably include a callback routine which is activated to call the application at a point during a data transfer operation. Each of the buffers preferably include a resynchronization event which is activated to resynchronize the application to a point during a data transfer operation. The interface further includes means for monitoring for an exception condition including notifying the application when the exception condition occurs. The exception condition includes a condition within a group consisting of data out of sequence, receiving dummy packets, change of data stream format and data becoming out of synchronization. The means for controlling further handles a data type through the plug. The data type is a selective one of raw data, DV data, MPEG data and audio data. The means for controlling handles the data type by adding header and appropriate extension information.

In another aspect of the present invention, a node configured to couple to a bus structure includes one or more applications, a transaction layer to control transactions between the applications and remote nodes coupled to the bus structure and an isochronous interface layer coupled to communicate with the one or more applications and the transaction layer to provide an interface to the one or more applications to control isochronous data operations to and from the one or more applications over the bus structure, wherein the isochronous interface layer allocates resources necessary for the data operations and controls the isochronous data flow between the one or more applications and the bus structure including managing buffers for the application utilized in the data operation. The resources include a plug and the isochronous interface layer connects the plug to the application. The isochronous interface layer provides a representation of the plug to the application. The isochronous interface layer communicates with the application regarding changes in state of the plug. The isochronous interface layer triggers an event to inform the application regarding changes in state of the plug. The resources include an isochronous channel and isochronous bandwidth. The isochronous data flow is from the application to the bus structure through an output plug for transmission operations and from the bus structure to the application through an input plug for reception operations. During a transmission operation, the isochronous interface layer provides capability to attach filled buffers to the output plug and detach buffers from the output plug after data within the buffers has been transmitted on the bus structure. During a reception operation, the isochronous interface layer attaches buffers to be filled to the input plug and detaches filled buffers from the input plug. The bus structure preferably substantially complies with a version of the IEEE 1394 standard. Each of the buffers preferably include a callback routine which is activated to call the application at a point during a data transfer operation. Each of the buffers preferably include a resynchronization event which is activated to resynchronize the application to a point during a data transfer operation. The isochronous interface further monitors for an exception condition including notifying the application when the exception condition occurs. The exception condition includes a condition within a group consisting of data out of sequence, receiving dummy packets, change of data stream format and data becoming out of synchronization. The isochronous interface layer further handles a data type through the plug. The data type is a selective one of raw data, DV data, MPEG data and audio data. The isochronous interface layer handles the data type by adding header and appropriate extension information.

In yet another aspect of the present invention, a method of providing an interface to an application and managing isochronous data transfer operations between the application and a bus structure includes receiving a request for a data transfer operation from the application, allocating necessary resources for the data transfer operation and managing the necessary resources for the data transfer operation, including managing buffers for the application utilized in the data operation. The method further includes connecting an appropriate plug for the data transfer operation. The resources include an isochronous channel and isochronous bandwidth. The resources include a plug. The method further includes providing a representation of the plug to the application. The method further includes communicating with the application regarding state changes of the plug. The method further includes triggering an event to inform the application regarding state changes of the plug. Data flow for the data transfer operation is from the application to the bus structure through an output plug for transmission operations and from the bus structure to the application through an input plug for reception operations. The method further includes attaching filled buffers to the output plug and detaching buffers from the output plug after data within the buffers has been transmitted on the bus structure, during transmission operations. The method further includes attaching buffers to be filled to the input plug and detaching filled buffers from the input plug, during reception operations. The bus structure preferably substantially complies with a version of the IEEE 1394 standard. Each of the buffers preferably include a callback routine which is activated to call the application at a point during a data transfer operation. Each of the buffers preferably include a resynchronization event which is activated to resynchronize the application to a point during a data transfer operation. The method further includes monitoring for an exception condition including notifying the application when the exception condition occurs. The exception condition includes a condition within a group consisting of data out of sequence, receiving dummy packets, change of data stream format and data becoming out of synchronization. The method further includes handling a data type through the plug. The data type is a selective one of raw data, DV data, MPEG data and audio data. Handling the data type through the plug includes adding header and appropriate extension information.

In still yet another aspect of the present invention, a method of providing an interface to an application resident within a node on a bus structure includes receiving a request for a data transfer operation from the application, connecting an appropriate plug for the data transfer operation, allocating necessary resources for the data transfer operation, managing the necessary resources for the data transfer operation, including managing buffers for the application utilized in the data operation and informing the application of any state changes within the plug. Informing the application of any state changes within the plug includes triggering an event to inform the application of the state changes within the plug. The resources include an isochronous channel and isochronous bandwidth. Data flow for the data transfer operation is from the application to the bus structure through an output plug for transmission operations and from the bus structure to the application through an input plug for reception operations. The method further includes attaching filled buffers to the output plug and detaching buffers from the output plug after data within the buffers has been transmitted on the bus structure, during transmission operations. The method further includes attaching buffers to be filled to the input plug and detaching filled buffers from the input plug, during reception operations. The bus structure preferably substantially complies with a version of the IEEE 1394 standard. Each of the buffers preferably include a callback routine which is activated to call the application at a point during a data transfer operation. Each of the buffers preferably include a resynchronization event which is activated to resynchronize the application to a point during a data transfer operation. The method further includes monitoring for an exception condition and notifying the application when the exception condition occurs. The exception condition includes a condition within a group consisting of data out of sequence, receiving dummy packets, change of data stream format and data becoming out of synchronization. The method further includes handling a data type through the plug. The data type is a selective one of raw data, DV data, MPEG data and audio data. Handling the data type through the plug includes adding header and appropriate extension information.

In yet another aspect of the present invention, a bus structure includes one or more remote nodes each including at least one remote application and a local node including one or more local applications, a transaction layer to control transactions between the local applications and remote nodes coupled to the bus structure and an isochronous interface layer coupled to communicate with the one or more local applications and the transaction layer to provide an interface to the one or more local applications to control isochronous data operations to and from the one or more local applications over the bus structure, wherein the isochronous interface layer allocates resources necessary for the data operations, including connecting an appropriate plug to the application, and controls the isochronous data flow between the one or more local applications and the bus structure including managing buffers for the application utilized in the data operation by attaching buffers to and detaching buffers from the plug. The resources include an isochronous channel and isochronous bandwidth. The isochronous data flow is from the application to the bus structure through an output plug for transmission operations and from the bus structure to the application through an input plug for reception operations. During a transmission operation, the isochronous interface layer attaches filled buffers to the output plug and detaches buffers from the output plug after data within the buffers has been transmitted on the bus structure. During a reception operation, the isochronous interface layer attaches buffers to be filled to the input plug and detaches filled buffers from the input plug. The isochronous interface layer also communicates with the one or more local applications regarding state changes in the plug. The isochronous interface layer also triggers an event to inform the one or more local applications regarding state changes in the plug. The bus structure preferably substantially complies with a version of the IEEE 1394 standard. Each of the buffers preferably include a callback routine which is activated to call the application at a point during a data transfer operation. Each of the buffers preferably include a resynchronization event which is activated to resynchronize the application to a point during a data transfer operation. The isochronous interface further monitors for an exception condition including notifying the application when the exception condition occurs. The exception condition includes a condition within a group consisting of data out of sequence, receiving dummy packets, change of data stream format and data becoming out of synchronization. The isochronous interface layer further handles a data type through the plug. The data type is a selective one of raw data, DV data, MPEG data and audio data. The isochronous interface layer handles the data type by adding header and appropriate extension information.

In another aspect of the present invention, a node coupled to a bus structure which substantially complies with a version of the IEEE 1394 standard includes one or more local applications, a transaction layer to control transactions between the applications and remote nodes coupled to the bus structure and an isochronous interface layer coupled to communicate with the one or more applications and the transaction layer to provide an interface to the one or more applications to control isochronous data operations to and from the one or more applications over the bus structure, wherein the isochronous interface layer allocates resources necessary for the data operations, including connecting an appropriate plug to the application and allocating necessary channel and bandwidth, and controls the isochronous data flow between the one or more applications and the bus structure including managing buffers for the application utilized in the data operation, by attaching buffers to and detaching buffers from the plug. The isochronous data flow is from the application to the bus structure through an output plug for transmission operations and from the bus structure to the application through an input plug for reception operations. During a transmission operation, the isochronous interface layer attaches filled buffers to the output plug and detaches buffers from the output plug after data within the buffers has been transmitted on the bus structure. During a reception operation, the isochronous interface layer attaches buffers to be filled to the input plug and detaches filled buffers from the input plug. The isochronous interface layer also communicates with the one or more applications regarding state changes in the plug. The isochronous interface layer also triggers an event to inform the one or more applications regarding state changes in the plug. Each of the buffers preferably include a callback routine which is activated to call the application at a point during a data transfer operation. Each of the buffers preferably include a resynchronization event which is activated to resynchronize the application to a point during a data transfer operation. The isochronous interface further monitors for an exception condition including notifying the application when the exception condition occurs. The exception condition includes a condition within a group consisting of data out of sequence, receiving dummy packets, change of data stream format and data becoming out of synchronization. The isochronous interface layer further handles a data type through the plug. The data type is a selective one of raw data, DV data, MPEG data and audio data. The isochronous interface layer handles the data type by adding header and appropriate extension information.

In yet another aspect of the present invention, an interface between an application and a bus structure to control isochronous data operations to and from the application over the bus structure includes a control system configured to allocate resources necessary for the isochronous data operation and a buffer system configured to control isochronous data flow between the application and the bus structure including managing buffers for the application utilized in the data operation. The resources include an isochronous channel and isochronous bandwidth. The isochronous data flow is from the application to the bus structure for transmission operations and from the bus structure to the application for reception operations. The bus structure substantially complies with a version of the IEEE 1394 standard. The resources include a plug and the control system connects the plug to the application. The buffer system communicates with the application regarding changes in state of the plug. The interface provides a representation of the plug to the application. The isochronous data flow is from the application to the bus structure through an output plug for transmission operations and from the bus structure to the application through an input plug for reception operations. During a transmission operation, the buffer system attaches filled buffers to the output plug and detaches buffers from the output plug after data within the buffers has been transmitted on the bus structure. During a reception operation, the buffer system attaches buffers to be filled to the input plug and detaches filled buffers from the input plug. The buffer system triggers an event to inform the application regarding changes in state of the plug. Each of the buffers include a callback routine which is activated to call the application at a point during a data transfer operation. Each of the buffers include a resynchronization event which is activated to resynchronize the application to a point during a data transfer operation. The interface further includes a monitoring circuit configured to determine when an exception condition occurs and notify the application when the exception condition occurs. The exception condition includes a condition within a group consisting of data out of sequence, receiving dummy packets, change of data stream format and data becoming out of synchronization. The buffer system further handles a data type through the plug. The data type is a selective one of raw data, DV data, MPEG data and audio data. The buffer system handles the data type by adding header and appropriate extension information.

In still yet another aspect of the present invention, a method of providing an interface to an application, managing isochronous data transfer operations between the application and a bus structure and monitoring for an exception includes receiving a request for a data transfer operation from the application, allocating necessary resources for the data transfer operation, managing the necessary resources for the data transfer operation, including managing buffers for the application utilized in the data operation, determining if an exception condition occurs and notifying the application when the exception condition occurs. The exception condition includes a condition within a group consisting of data out of sequence, receiving dummy packets, change of data stream format and data becoming out of synchronization. The method further includes connecting an appropriate plug for the data transfer operation. The resources include an isochronous channel and isochronous bandwidth. The resources include a plug. The method further includes providing a representation of the plug to the application. The method further includes communicating with the application regarding state changes of the plug. Data flow for the data transfer operation is from the application to the bus structure through an output plug for transmission operations and from the bus structure to the application through an input plug for reception operations. The method further includes attaching filled buffers to the output plug and detaching buffers from the output plug after data within the buffers has been transmitted on the bus structure, during transmission operations. The method further includes attaching buffers to be filled to the input plug and detaching filled buffers from the input plug, during reception operations. The bus structure substantially complies with a version of the IEEE 1394 standard. Each of the buffers include a callback routine which is activated to call the application at a point during a data transfer operation. Each of the buffers include a resynchronization event which is activated to resynchronize the application to a point during a data transfer operation. The method further includes triggering an event to inform the application regarding changes of the plug.

DETAILED DESCRIPTION OF THE PREFERRED EMBODIMENT

Figure 3:
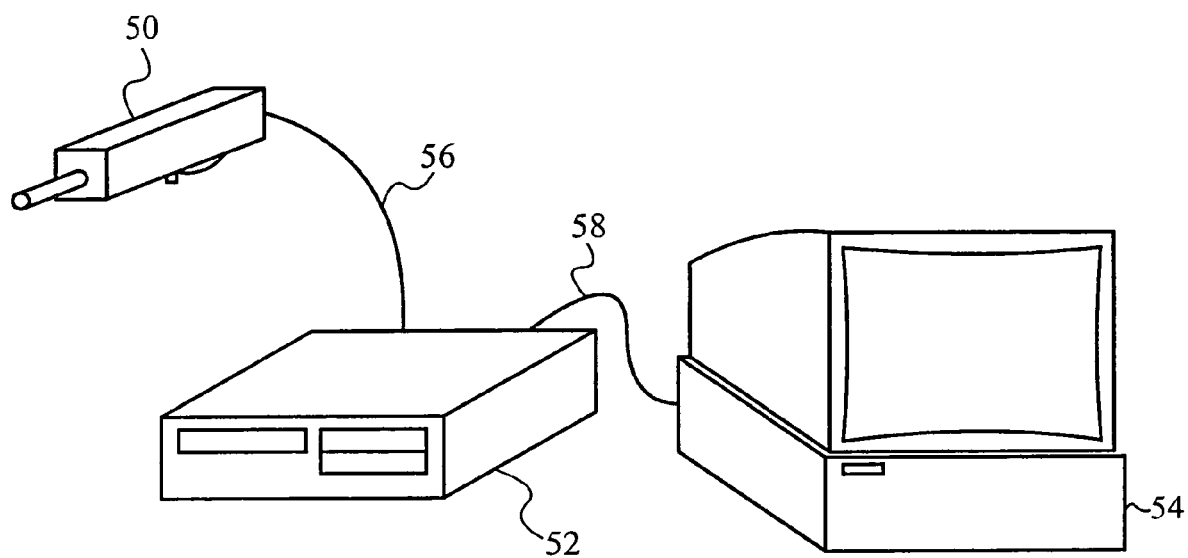
FIG. 3 illustrates a system including a video camera 50, a video cassette recorder 52 and a computer 54 connected together by the input/output (I/O) busses 56 and 58.

FIG. 3 illustrates a system including a video camera 50, a video cassette recorder 52 and a computer 54 connected together by the input/output (I/O) busses 56 and 58. The I/O bus 56 couples the video camera 50 to the video cassette recorder 52, allowing the video camera 50 to send data to the video cassette recorder 52 for recording. The I/O bus 58 couples the video cassette recorder 52 to the computer 54, allowing the video cassette recorder 52 to send data to the computer 54 for display.

An applications programming interface (API) according to the present invention could be implemented within any one or all of the connected subsystems including the video camera 50, the video cassette recorder 52 or the computer 54, for controlling data transfer operations communicated across the bus structures 56 and 58. In the first embodiment of the present invention the bus structures 56 and 58 are preferably IEEE 1394-1995 standard cables.

Figure 4:
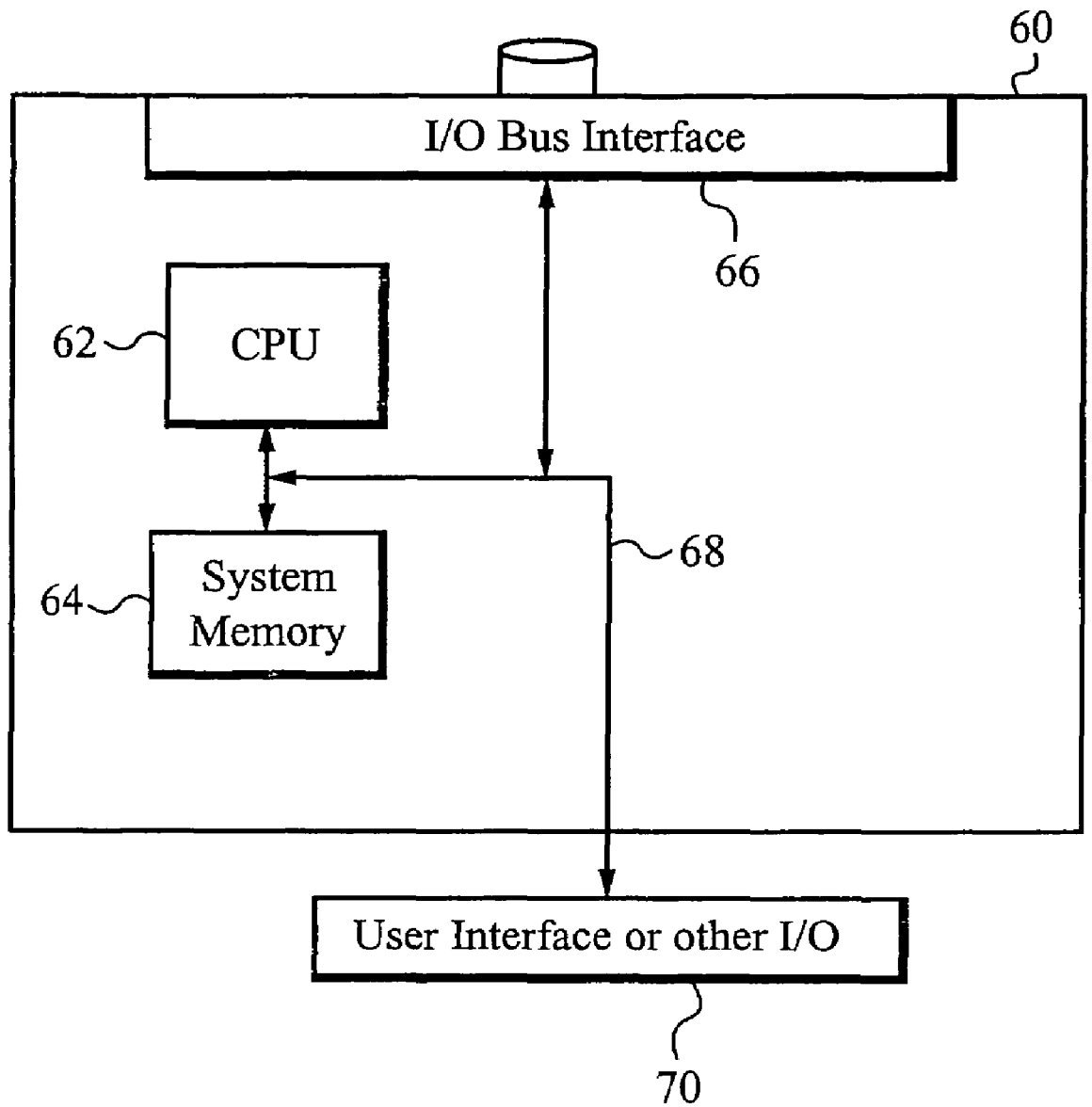
FIG. 4 illustrates a block diagram of a hardware system resident in each system for implementing the applications programming interface of the present invention.

A block diagram of a hardware system resident in each system for implementing the applications programming interface of the present invention is illustrated in FIG. 4. In the hardware system illustrated in FIG. 4, a printed circuit board 60 is coupled to a user interface 70. The printed circuit board 60 includes a central processing unit (CPU) 62 coupled to system memory 64 and to an I/O bus interface 66 by the system bus 68. The user interface 70 is also coupled to the system bus 68. The user interface 70 is subsystem specific, but can include a keyboard, display or other I/O devices for communicating with a user of the subsystem.

Each of the subsystems including the video camera 50, the video cassette recorder 52 and the computer 54, in order to implement the applications programming interface of the present invention, will include a hardware system such as the system illustrated in FIG. 4. The CPU 62 within each of these devices is used to execute the application program instructions. The API of the present invention will then manage both isochronous and asynchronous data transfer operations between the resident subsystem and one of the other subsystems over an appropriate one of the busses 56 or 58.

An applications programming interface according to a first embodiment of the present invention implements isochronous and asynchronous data transfers to and from an application over a bus structure. An application as used herein will refer to either an application or a device driver. The bus structure over which the data transfer operations are completed is preferably an IEEE 1394-1995 standard bus structure. However, as will be apparent to those skilled in the art, the applications programming interface of the present invention will also be applicable for use in managing data transfers over other types of bus structures. The applications programming interface of the first embodiment includes the ability to transfer any amount of data between a local data buffer provided by the application and a range of addresses over the bus structure using one or more asynchronous transactions. When an asynchronous transfer of a block of data is initiated, the applications programming interface sends a command to an automatic transaction generator. The automatic transaction generator then automatically generates the read or write transactions necessary to transfer the complete block of data asynchronously without direct processor control or requiring supervision by the applications programming interface.

The applications programming interface of the first embodiment also includes the ability to transfer data between the application and another node on the bus structure isochronously over a dedicated channel. During an isochronous data transfer, a buffer management scheme is used to manage data buffers within the application. The application may use one, more than one or a linked list of buffers depending on the type and amount of data to be transferred. A linked list of buffer descriptors that point to the buffers is maintained by the API to ensure the uninterrupted flow of the continuous stream of isochronous data. This linked descriptor list may implement a linear or a circular list of buffers and includes a forward pointer to the descriptor for the next buffer in the list and a backward pointer to the descriptor for the previous buffer in the list for each buffer. When a linear list is implemented, the application can dynamically append buffers to the list or remove existing buffers from the list, as necessary, for the processing of the data.

During an isochronous transfer of data, the applications programming interface of the present invention provides implementation of a resynchronization event in the stream of data allowing for resynchronization to a specific point within the data. Implementation is also provided for a callback routine for each buffer which calls the application at a predetermined specific point during the data transfer operation. Both the resynchronization event and the callback routine are supported by the IEEE 1394 standard.

The applications programming interface of the present invention also includes the ability to perform bus management operations, as necessary, over the bus structure. Such bus management operations include allocating and deallocating isochronous channel numbers, as necessary, and allocating and deallocating isochronous bandwidth. If the bus structure is an IEEE 1394 standard bus structure, then the applications programming interface also performs other bus management operations as required by the IEEE 1394 standard.

Figure 1:
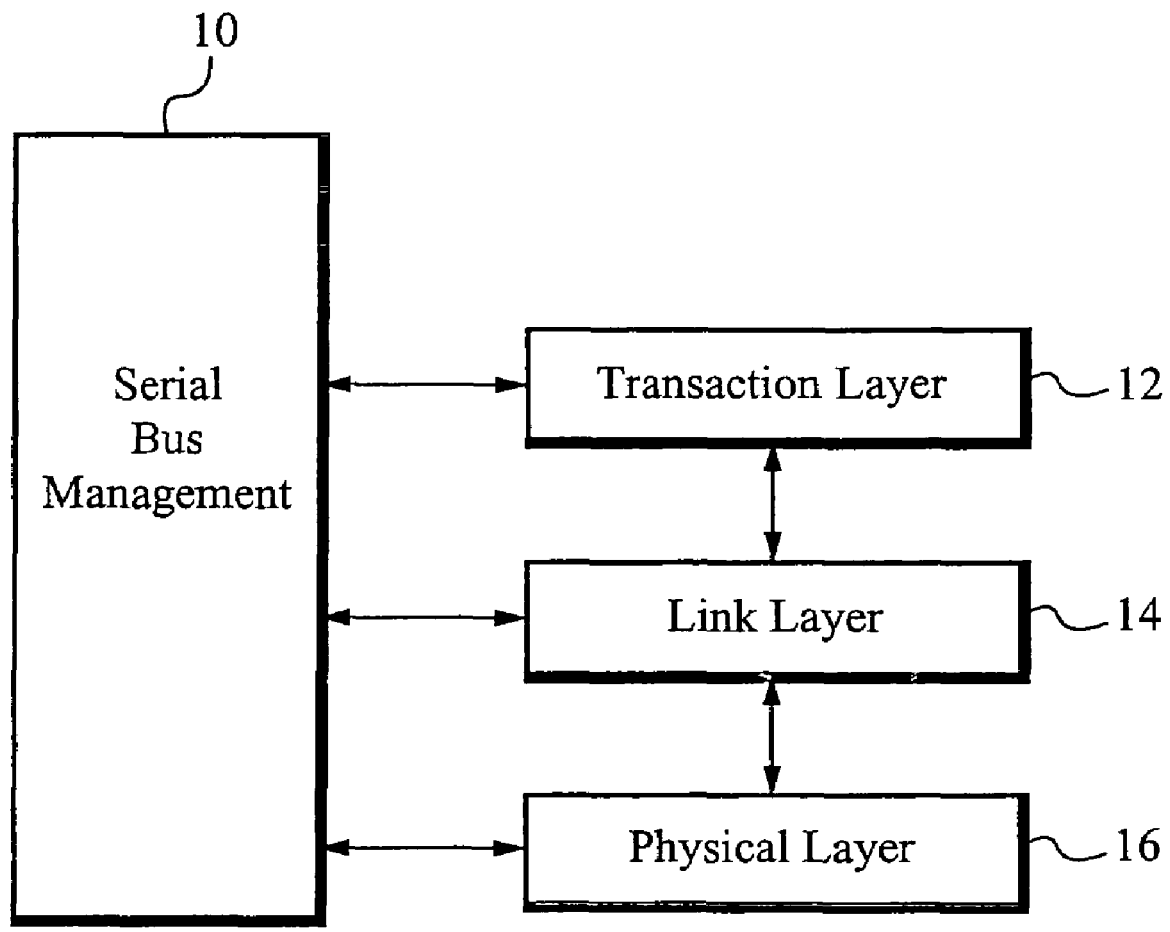
FIG. 1 illustrates a protocol defined by the IEEE 1394 standard.
Figure 2:
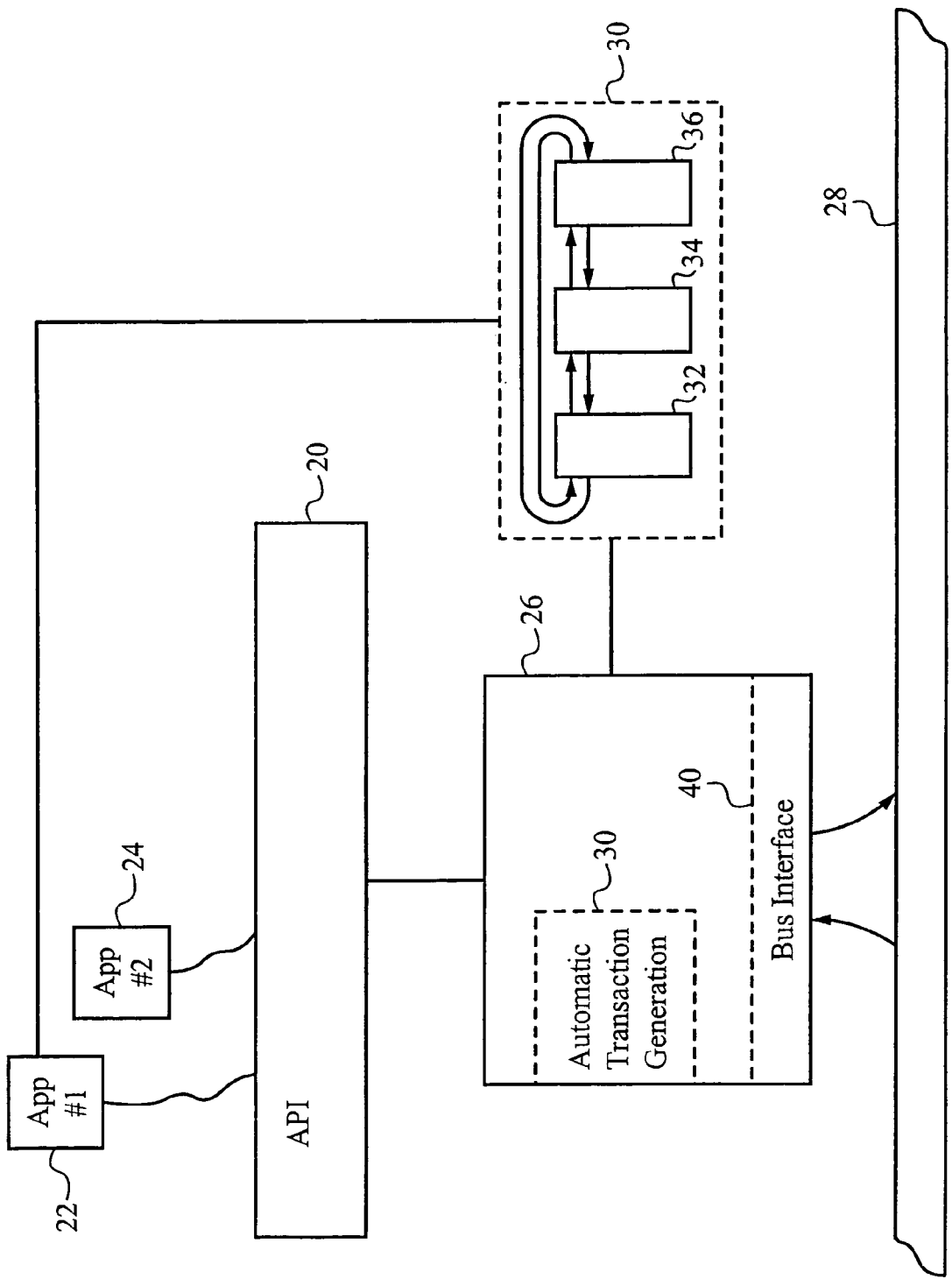
FIG. 2 illustrates a block diagram schematic of an applications programming interface within a system including a bus structure.

A block diagram schematic of an applications programming interface of the first embodiment, according to the present invention, within a system including a bus structure is illustrated in FIG. 2. The API 20 serves as an interface between the applications 22 and 24 and the bus structure 28, managing the transfer of data between the bus structure 28 and the applications 22 and 24. As illustrated in FIG. 2, a single API 20 may serve as an interface between multiple applications and the bus structure 28. For example, within the computer system 54, illustrated in FIG. 3, a single API 20 could serve as an interface between one or more applications being run by the computer system 54.

A hardware and physical interface 26 is included between the API 20 and the bus structure 28. The hardware and physical interface 26 includes an automatic transaction generator 38 for automatically generating the necessary transactions for completion of an asynchronous data transfer between one of the applications 22 or 24 and another node on the bus structure 28. The hardware and physical interface 26 also includes a bus interface 40 for monitoring and managing the flow of data to and from the bus structure 28. The hardware and physical interface 26 is shown coupled to a set of memory buffers 30, as controlled by the API 20. The set of memory buffers 30 includes the memory buffers 32, 34 and 36. As will be described below, the memory buffers 32, 34 and 36 are dedicated to the API 20 by the application 22 for use in sustaining isochronous data transfers to and from the application 22.

Isochronous Data Transfers

To initialize an isochronous data transfer operation an application first requests an isochronous channel from the API 20. The application may either request a specific channel number or any currently available channel number. The API 20 then obtains a channel for the isochronous transfer per the requirements of the IEEE 1394 standard. The IEEE 1394 standard supports a six bit channel number which is broadcast with a stream of data across the bus structure 28. Once a channel is allocated for an isochronous data transfer between an application and another node on the bus structure 28, no other nodes may use that specific channel number. After a channel is allocated, data buffers must be assigned by the application to the API 20 to be used for the data transfer. The API 20 allows the application to assign one, more than one or a list of data buffers to use for receiving or transmitting the isochronous stream of data. Each buffer assigned to the API 20 may be contiguous or fragmented and logical or physical. The list of data buffers may be circular or linear. If a linear list of data buffers is assigned to the API 20 the application 22 can add additional buffers or remove buffers from the list as necessary to process the data.

Figure 5:
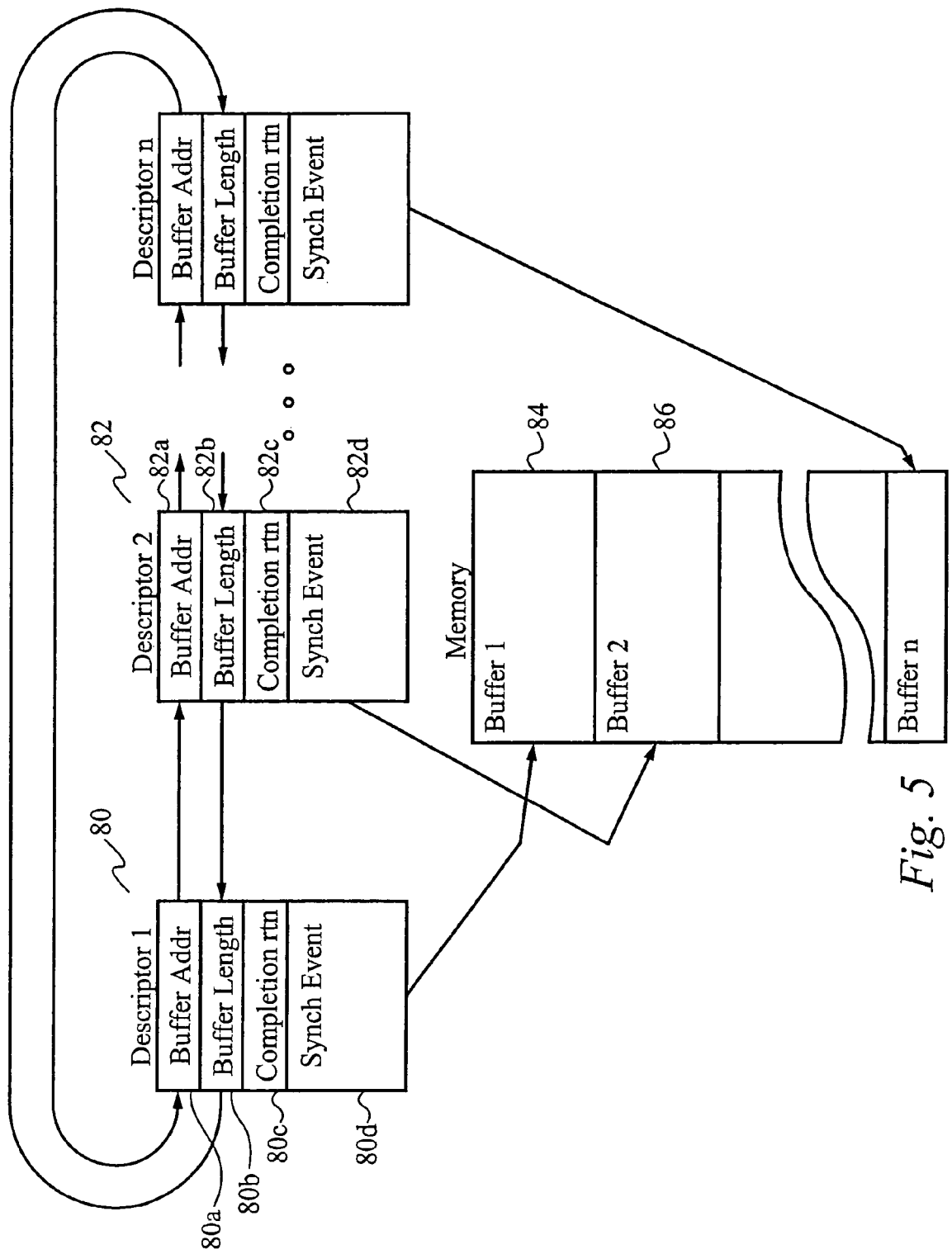
FIG. 5 illustrates a list of buffer descriptors corresponding to buffers assigned to an API 20 by an application.

In the system illustrated in FIG. 2, the application 22 has assigned three buffers 30, including the buffers 32, 34 and 36 to the API 20 for isochronous data transfers. The application has also assigned a linked list of three buffer descriptors to the API, one for each of the buffers 32, 34 and 36. The API 20 maintains a buffer descriptor for each buffer within the linked list and manages the flow of the isochronous data between the application, the assigned buffers and the bus structure 28. Within the list of descriptors managed by the API 20, each buffer is represented by a buffer descriptor, including a forward pointer to the descriptor for the next buffer in the list and a backward pointer to the descriptor for the previous buffer in the list. A list of buffer descriptors corresponding to buffers assigned to an API 20 by an application is illustrated in FIG. 5. Each of the buffer descriptors 1-*n* correspond to a memory buffer 1-*n*. Specifically, the buffer descriptor 80 corresponds to the memory buffer 84 and the buffer descriptor 82 corresponds to the memory buffer 86.

The buffer descriptors each include an address and length of the corresponding buffer. The buffer descriptor also includes a callback completion routine to call after the buffer has been filled or emptied, depending on the direction of the current data transfer operation. The buffer descriptors further include an optional synchronization event field which is programmed by the application and is how the buffer is synchronized to a specific event or time. Specifically, the buffer descriptor 80 corresponding to the memory buffer 84, includes an address 80*a* and a length 80*b* for the memory buffer 84. A completion routine 80*c* and a synchronization event 80*d* are also included, if necessary.

This use of buffer descriptors and memory buffers allows great flexibility to an application using the API of the present invention, since the descriptors, buffers, completion routines and synchronization events are all set up by the application according to its specific needs. As an example, for an application that is running in a digital video camera transferring data isochronously to a digital video monitor, data is loaded in memory buffers, for which the API maintains buffer descriptors. The API then manages the transfer of each packet of data from the buffers to the video monitor. The video camera is able to implement a 2× compression feature in the vertical dimension by having pairs of descriptors point to the same memory buffer. That is, the descriptors 1 and 2 will point to the memory buffer 1, the descriptors 3 and 4 will point to the memory buffer 2, and so on. A completion routine in the second descriptor of each pair notifies the video monitor that data in the memory buffer is ready to be read. This means that as the video camera outputs first and second scan line data, the second scan line data overwrites the first scan line data in the memory buffer with the second scan line data. The video monitor does not read the memory buffer until after the second scan line is written so the monitor never sees the first scan line data. In this manner, every other scan line is skipped.

The descriptors allow the list to be circular in nature and thereby maintain the continuous stream of data to or from the buffers 32, 34 and 36. During an isochronous data transfer from the application 22 to another node along the bus structure 28, the application 22 fills the buffers 32, 34 and 36, in turn, with the data. The API 20 then manages the transferring of the data from the appropriate buffer to the bus structure 28 during an appropriate time period. The bus interface 40 within the hardware and physical interface 26 controls transferring the data from the buffers 32, 34 and 36 onto the bus structure 28. During an isochronous data transfer from another node along the bus structure 28 to the application 22, the API 20 manages transferring the data from the bus structure 28, through the bus interface 40, to the appropriate buffer 32, 34 and 36. As one allocated buffer is filled up, the data is stored in the next buffer in the linked list. The application 22 then reads the data from the appropriate one of the buffers 32, 34 and 36 during the appropriate time period. Once the application 22 has finished reading the data from a buffer, the buffer is provided back to the API 20 and the application 22 processes the data from the next buffer.

The buffer descriptors will also implement a linear list of buffers which allows the application to assign buffers to or remove buffers from the API 20, as necessary to complete a data transfer operation. For example, during an isochronous receive operation, as the application is finished processing each buffer it can then reassign it to the API for receiving more data. Correspondingly, if additional buffers are necessary to complete a data transfer operation, the application can assign more buffers to the API.

The API 20 will execute a resynchronization event and/or a callback routine during the transfer of isochronous data if requested by the application 22. A resynchronization event allows for resynchronization by the application to a predetermined specific point in time within the data during the transfer. Because the data is being transferred isochronously, this resynchronization event will also synchronize the application to an appropriate point in time relative to the data flow. The transfer of video data provides an ideal example for the implementation of a resynchronization event. During the transfer of video data from an application such as a video recorder, the data is transferred in blocks representing the data necessary to display one horizontal line on a monitor or television. After the display of each horizontal line, the monitor must reset itself to be ready to display the next horizontal line. A resynchronization event could be employed by the monitor at the end of the data for each horizontal line, allowing the monitor to resynchronize itself to the beginning of the next horizontal line.

In the first embodiment of the API of the present invention an isochronous operation may be synchronized or scheduled to be performed immediately, at a specific bus time, when a specific value appears in the isochronous data block packet header, or when isochronous data appears on a specific channel of the bus for start operations or ends on a specific channel of the bus for stop operations.

Each buffer assigned to the API 20 can have a resynchronization event and a callback routine. A callback routine could be employed during the transfer of video data at the end of the transfer of a block of data representing a frame. A monitor or television groups horizontal lines into a frame and at the end of each frame resets itself to the top of the screen to be ready for the beginning of the next frame. A callback routine could be used at the end of the stream of data representing each frame. Such a scheme would allow a buffer to be filled with the data representing a video frame from a source coupled to the bus structure 28. After the data representing the video frame has been transferred, the callback routine can be used to notify the application that the data representing the next frame has been transferred and is available for processing. The application could then process the data for this frame of data while the data for the next frame is being loaded into the next buffer.

Figure 6:
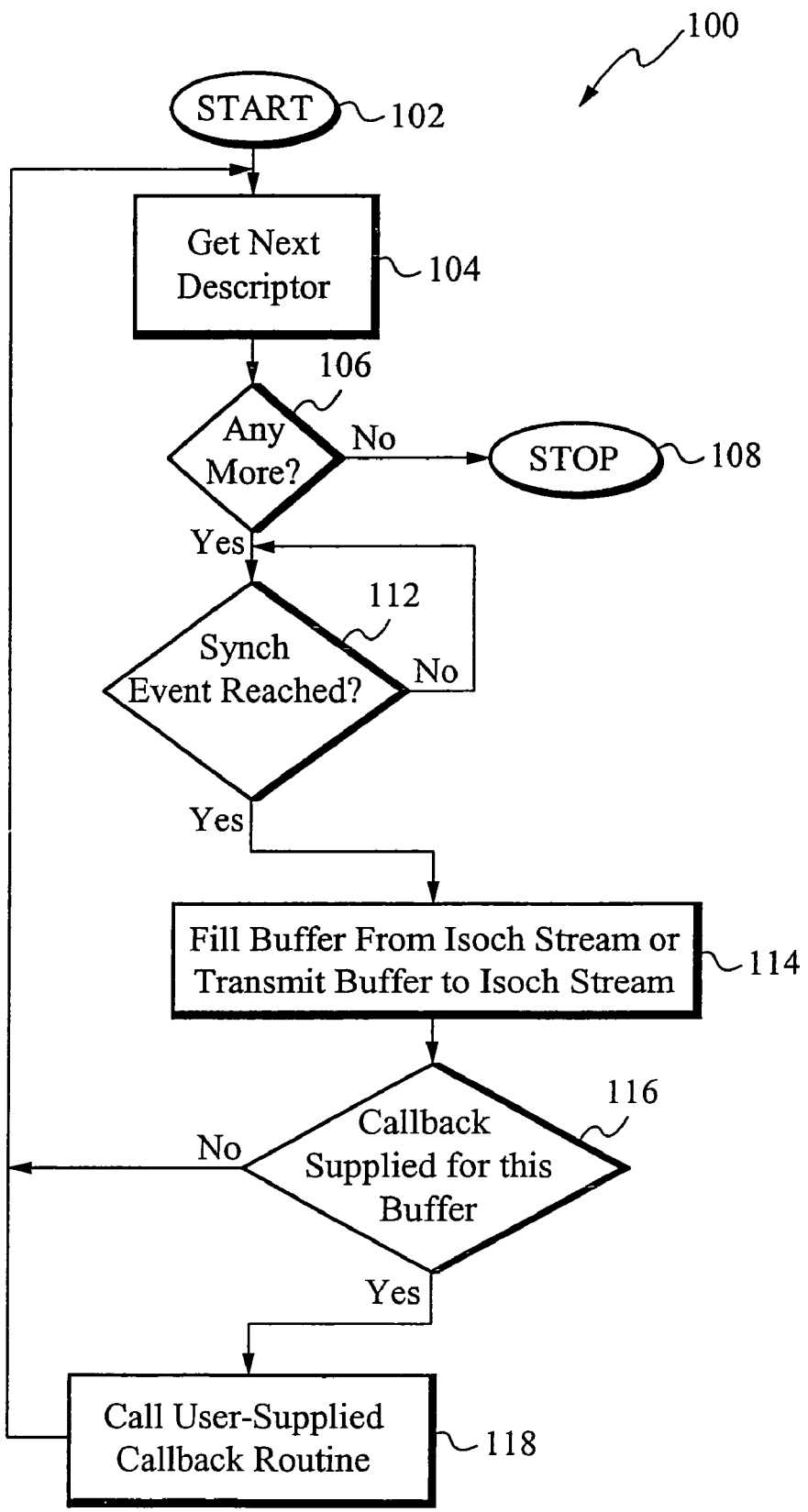
FIG. 6 illustrates a flow chart illustrating API buffer processing for isochronous send and receive operations.

A flow chart illustrating API buffer processing for isochronous send and receive operations is shown in FIG. 6. It is assumed that at the start 102 of an isochronous receive operation that the application has set up the buffers/descriptors, completion routine calls and synchronization events. The flowchart 100 is entered at step 102 for each isochronous stream that requires processing in the bus system. The API 20 keeps track of a current descriptor for processing the incoming data. In other words, the API maintains a pointer to the next buffer, and location within the next buffer where data can be stored.

At step 104 the next buffer descriptor is obtained from the linked list. At step 106 a check is made to determine if any more descriptors are included within the linked list. If there are no more descriptors in the linked list then the processing is stopped at the step 108. If there are additional descriptors then the routine moves to the step 112 where it waits until the synchronization event for the current buffer is reached. Once the synchronization event is reached, then at the step 114 the current buffer is either filled with the incoming data for a receive operation or the data from the buffer is transmitted for a send operation. After the buffer has been processed, then at the step 116 it is determined if a callback routine was included for this buffer. If a callback routine was included, then, at the step 118 the callback routine is called. Otherwise, the routine goes back to the step 104 and obtains the next descriptor. Whether a callback routine is provided or not, the API and hardware subsystem 26 assure that the next buffer descriptor is obtained such that no isochronous data is lost.

The steps of the flowchart 100 may be performed by a CPU and related subsystems such as found in a typical personal computer (PC), embedded processing system, etc. as discussed above in connection with FIGS. 3 and 4. In general, the steps of flowcharts presented in this specification may be implemented in any suitable programming language such as "C", PASCAL, FORTRAN, BASIC, assembly language, etc., or in a combination of such languages. Any suitable computer programming technique may be used for a software design to implement the steps, such as procedural or object oriented programming, parallel or distributed processing, interrupt driven or polled event processing, etc. Steps may be modified, added to, or taken away from, those shown in the flowcharts while still achieving the method steps and apparatus elements described in this specification and recited in the claims. The processing in a single step may be broken into two or more steps. Also, in some embodiments, two or more steps may be accomplished at the same time, or their tasks interleaved. The sequencing, or routing, of the steps may also be changed. Each flowchart is but one instance of a primitive example of the logic used to achieve a function in the embodiments of the present invention recited herein.

For purposes of discussion, the cumulative steps of a flowchart are referred to as constituting a single "routine," or program, although they may be implemented in two or more routines, programs, processes, etc. Flowchart steps may also be distributed among processors residing in the same or different devices.

As an example of an isochronous data transfer operation, if the application 22 is a video monitor which is receiving data isochronously from a video recorder at a node coupled to the bus structure 28, the API 20 will manage the flow of data from the bus structure to the buffers 32, 34 and 36, each represented by a buffer descriptor in the linked list. A first buffer 32 is filled with the data received from the video recorder. When the first buffer 32 is filled, it is processed and displayed by the video monitor 22 while the next buffer 34 in the linked list is filled. If the first buffer 32 included a callback routine at the end of the data for a frame, then the callback routine could be used to notify the video monitor 22 that it could process the data in the first buffer 32, representing the first frame. When the video monitor 22 is finished processing the data within the first buffer 32 it can then provide the buffer 32 back to the API 20 for storing additional data received from the bus structure 28.

If the application 22 is a video recorder transmitting isochronous data to another node coupled to the bus structure, then the application loads the buffers 32, 34 and 36, in turn, with data. The API 20 will then manage the transmission of the data from the buffers 32, 34 and 36 onto the bus structure 28 with the appropriate channel number at the appropriate time. In this manner the API 20 of the present invention manages isochronous data transfers to and from an application 22.

Asynchronous Data Transfers

To execute an asynchronous data transfer operation between an application 24 and another node coupled to the bus structure 28, the API 20 defines essentially a direct memory access (DMA) model, utilizing a level of hardware automation to automatically generate the requests necessary to complete the transfer and allowing the application and the API 20 to perform other functions while the data transfer operation is being completed. The API 20 provides a memory-mapped interface to the application for asynchronous data transfers. To initiate an asynchronous data transfer, an application 24 transmits a descriptor to the API 20 including an address of a buffer within the application's address space, a starting address in the address space of the bus structure at which the transfer is to take place, a length of the block of data to be transferred and a code representing whether the transfer is to be a read or write operation. The API 20 provides the necessary data to the hardware automatic transfer generator 38 which then generates the one or more transactions necessary to complete the transfer of the entire block of data across the bus structure 28. The automatic transfer generator 38 then generates the necessary read or write transactions to complete the transfer of data between the buffer assigned by the application 24 and the appropriate addresses across the bus structure 28. This automation does not require the attention of the API 20 or the application 24 to complete an asynchronous data transfer operation. While in the first embodiment of the present invention the automatic transaction generator 38 is preferably implemented in hardware, it should be apparent to those skilled in the art that the automatic transaction generator could also be implemented in software within the API 20. If the application does not require this level of hardware automation, the API 20 can also generate the transactions necessary to complete a data transfer operation, without using the automatic transaction generator 38.

As is known to those skilled in the art each read or write transaction can only transfer a certain amount of data depending on the system and the capabilities of the bus structure 28. Therefore, to transfer a block of data it may be necessary to generate multiple read or write transactions. In contrast to the systems of the prior art, the API 20 of the present invention sends a single command to the automatic transaction generator block 38. The automatic transaction generator block 38 then generates the read or write transactions necessary to transfer the complete block of data over the bus structure 28, without requiring further attention by the API 20. This allows the system to be more efficient, as the API 20 and the application 24 can perform other tasks while the transfer is taking place. Because the transfer is asynchronous, once the transfer of the entire block of data is complete, the API 20 will notify the application 24.

As discussed above, in the first embodiment of the present invention, the bus structure 28 is preferably an IEEE 1394 standard bus structure. For asynchronous data transfers the bus structure 28 therefore provides a 64 bit address space. Within the descriptor provided to the automatic transaction generator 38, the remote address at which the data transfer is to take place is specified by a 64 bit address.

To initiate an asynchronous read operation, the application 24 transmits a descriptor to the API 20 including the address of the buffer within the application's address space to which the data is to be transferred, a 64 bit starting address in the address space of the bus structure 28 from which the data is to be read, the length of the block of data to be transferred and a code representing that the transfer is a read operation. The API 20 then transmits the required information to the automatic transaction generator 38. The automatic transaction generator 38 then generates the necessary read commands to transfer the data to the application's buffer from the proper node on the bus structure 28. The application is responsible for ensuring that the specified buffer is available before the read transactions are generated. The data is then read in response to the transactions generated by the automatic transaction generator 38, in a known manner.

To initiate an asynchronous write operation, the application 24 transmits a descriptor to the API 20 including the address of the buffer within the application's address space from which the data is to be transferred, a 64 bit starting address in the address space of the bus structure 28 to which the data is to be written, the length of the block of data to be transferred and a code representing that the transfer is a write operation. The API 20 then transmits the required information to the automatic transaction generator 38. The automatic transaction generator 38 then generates the necessary write commands to transfer the data to the proper node on the bus structure 28 from the application's buffer. The data is then transferred from the application's buffer in response to the transactions generated by the automatic transaction generator 38 in a known manner. When the buffer is transferred the application 24 is notified.

API Conventions and Bus Management Operations

An application calls a routine in the API 20 either synchronously or asynchronously. If an application calls a routine synchronously, then at the time that the routine returns to the application, the API has completed the requested operation or the API returns a completion status indicating that the chosen request could not be completed. Alternatively, if an application calls a routine asynchronously, then the requested action is most likely not complete at the time that the routine returns control to the client. In order to call a routine asynchronously, the application provides a completion callback routine. The API may call this completion routine before returning from the original call. However, in most cases the API completes the requested operation after returning from the original call that initiated the operation, then calls the application's completion routine to indicate that the operation is done.

Before using any of the services provided by the API, an application must first initialize the API. Each application must initialize the API separately. An application initializes the API by calling an ActivateSonyAPI subroutine. This subroutine establishes a connection between the API and the application. When calling the ActivateSonyAPI, the application may specify indication routines which the API calls when a bus reset or other bus event occurs. The ActivateSonyAPI subroutine returns a value to the application which the application then uses on subsequent calls to the routines of the API.

Applications which expect a large number of indications during the course of their operation may call the AddIndBuffers routine in order to pass additional indication buffers to the API for its exclusive use. The client can first call the CountIndBuffers routine in order to check the number of buffers that the API currently owns. Prior to deactivating the API, the application may release the indication buffers previously given to the API by calling a RelIndBuffers routine.

When an application is finished using the API, it calls a DeactivateSonyAPI routine. This routine breaks the connection between the application and the API and releases any indication buffers or other resources in use by the API on behalf of the application. Note that the API may not be able to disassociate from a given application immediately if some of the application's buffers are currently in use by the API. During the time that the API is active for a given application, that application has access to all of the services that the API provides.

After initializing the API, an application may perform various IEEE 1394 bus management functions, as defined in section 8 of the IEEE 1394 standard, and described below. An application may allocate and deallocate isochronous channel numbers from the currently active isochronous resource manager using the MGMTAllocateChannel and MGMTDeAllocateChannel routines, respectively. Using these applications, the application may request to allocate a specific channel number, if it is available. Alternatively, an application may request to allocate any currently available channel number. These API routines follow the requirements of the IEEE 1394 standard with regard to allocating and deallocating isochronous channel numbers. When using isochronous channel numbers, the application is responsible for following any other requirements which may apply in the IEEE 1394 standard or any other governing protocol document.

An application may allocate and deallocate isochronous bandwidth from the currently active isochronous resource manager using the MGMTAllocateBandwidth and MGMTDeAllocateBandwidth routines, respectively. These API routines follow the requirements of the IEEE 1394 standard with regard to allocating and deallocating isochronous bandwidth. When using these routines, the application is responsible for calculating the correct amount of isochronous bandwidth needed and allocating exactly that much. The application is also responsible for following any applicable rules as documented in the IEEE 1394 standard and any other governing protocol documents, with regard to allocating, deallocating or owning any isochronous bandwidth.

When an application deactivates the API, the API does not attempt to deallocate any bus resources that the application previously allocated. This permits the application to relinquish ownership of these resources easily, as required in the IEC AV protocols standard. However, this places complete responsibility on the application to follow the governing protocols when allocating and deallocating isochronous bus resources.

An application may retrieve the current topology map and speed map information from the active bus manager, if present, and any other available bus information using the MGMTBusInfo routine. This routine retrieves the most current information from the bus manager, whether or not the node on which the application is running is the active bus manager. Note that this routine will fail if there is no currently active bus manager. Section 8 of the IEEE 1394 standard defines the format of the topology map and speed map, and the conditions under which a bus manager exists or does not exist.

After initializing the API, the application may call the ASYNDataRequest routine to initiate asynchronous data transfer requests over the IEEE 1394 serial bus. The application may use this routine to initiate any asynchronous transaction that is defined in the IEEE 1394 standard, including data block read or write requests, quadlet read or write requests or any lock request. When the application calls the ASYNDataRequest routine, the routine passes a descriptor for a buffer in the application's address space, a starting address in the 64 bit IEEE 1394 address space, a data transfer length and a transaction code. The ASYNDataRequest routine then generates one or more IEEE 1394 transactions to satisfy the request. When the API finishes the requested data transfer operation, or if it encounters an error, the API returns to the application or calls the application's callback routine, depending on whether the application called this routine synchronously or asynchronously.

In order to perform a lock transaction over the IEEE 1394 serial bus, the application calls the ASYNDataRequest routine and passes an argument value, a data value, and a lock operation code. The API generates the requested lock operation and returns to the application or calls the application's callback routine, as determined by the type of call, e.g., synchronously or asynchronously.

After initializing the API, the application may source or sink a channel of isochronous data on the IEEE 1394 serial bus. Before transferring isochronous data, the application must first open an isochronous port using the ISOCHOpen routine. When calling this routine, the application specifies the direction and other information about the stream of isochronous data that the application intends to transfer. The ISOCHOpen routine determines if the necessary system resources are available then returns to the application. When this routine completes successfully, the application then has all necessary system resources reserved for its exclusive use to transfer a stream of isochronous data.

When an application talks or listens on an isochronous channel, the source or destination of the isochronous data in the host system is one or more data buffers owned by the application and described in a data structure. The application passes these buffers to the API by calling the ISOCHAttach routine. This routine "attaches" the application buffers to the isochronous stream in preparation for transferring application data into or out of these buffers. If the application wishes to reclaim its buffers before the API has finished with them, the application may call the ISOCHDetach routine, specifying those buffers that the application wishes to reclaim.

The API defined buffer descriptor which the application uses to describe its isochronous data buffers permits the application to specify one, more than one, or a list of data buffers to use for receiving or transmitting isochronous data. Each buffer may be contiguous or fragmented, logical or physical and the application may specify callback routines on a buffer by buffer basis. This permits extremely flexible buffer handling in the API on behalf of the application, thereby supporting a wide range of application requirements.

When the application has opened an isochronous port and has attached buffers to this port, then the application may control its stream of isochronous data. It does this by calling the ISOCHControl routine. This routine permits the application to start or stop an isochronous stream into or out of the application buffers. When calling this routine, the application may specify an event on which to start or stop the stream, e.g., immediately, on a particular isochronous cycle or other event. When the application is finished transferring a stream of isochronous data, it releases the system resources associated with the open port by calling the ISOCHClose routine.

The ActivateSonyAPI and DeactivateSonyApi routines provide the initialization mechanism which makes the IEEE 1394 specific services provided by the API available to the calling application. The ActivateSonyAPI routine establishes a connection to the services provided by the API. The DeactivateSonyAPI routine removes the specified connection to the services provided by the API. The result of an activation is a valid activateReq structure. The calling application passes a pointer to this structure as part of all subsequent calls to the API. As part of activating the API for an application, the application may provide indication routines which the API uses to inform the caller that something has happened on the associated IEEE 1394 bus, such as a bus reset or request indication from a remote node. The result of deactivation is that the indication routines, if any, which were registered at activation time are de-registered. Following deactivation, the caller may not use any of the API services, unless the API is first reactivated.

The following function activates the API for further operations:

STATUS ActivateSonyAPI(ActivateReqPtr activateReq);

This routine takes one parameter and returns a status value. The caller fills in the activateReq data structure, as defined below, and passes a pointer to the ActivateSonyAPI routine. After this routine returns with a GOOD status, the caller saves the resulting activateReq data structure. This data structure represents the connection between the application and the API. In order to identify this connection, the caller passes a pointer to the activateReq data structure on subsequent calls to the API. The possible status return values are GOOD, signalling that the API is now activated and the activateReq data structure is valid to use for further operations, PENDING, signalling that the API has accepted the request, but is not active at this time, and UNDEFINEDERROR, signalling that an unexpected error was encountered while attempting to activate the API and that the API is not activated. After a PENDING value is returned, the API calls the AsyncCompletion routine when the activation request is complete. At that time the request status field will contain the completion status for the activate request.

The single parameter contains the address of an activatReq data structure. This data structure provides information necessary to activate the API, as defined in Table I below:

TABLE I

```
typedef struct ActivateReq {
    void            (*BusResetHandler)(BusResetPtr);    /* Bus Reset
                                                            Handler */
    STATUS (*IndicationHandler)(IndicationPtr);         /* Indication
                                                            Handler */
    void *RefPtr;                                        / * for use by
                                                            above routines */
```

TABLE I-continued

```
void            *SonyAPIPrivate;                      /* the cookie */
void (*AsyncCompletion)(struct ActivateReq *req);     /* completion
                                                         routine */
void *UserPtr;         /* for use by completion routine*/
STATUS Status;                                        /* completion
                                                         status */
} ActivateReq, *ActivateReqPtr;
```

When the BusResetHandler filed is not equal to null, it contains the address of the routine to call upon receiving a bus reset event. When a bus reset occurs on the IEEE 1394 bus, the API calls the BusResetHandler routine, passing the address of a data structure containing bus reset information. When the IndicationHandler field is not equal to null, it contains the address of the routine to call upon the occurrence of an indication that is not handled by the API. When the API receives a request subaction from a remote node, it calls the IndicationHandler routine, passing the address of a data structure which describes the request. The API fills in the SonyAPIPrivate field as part of the activation process. The API uses the value in this field on subsequent calls. The calling application shall not modify the value in this field. When the AsyncCompletion field is not equal to null, it contains the address of the routine to call when the API is active and available for use by the invoking application. Note that the calling application may specify a completion routine whether the request is asynchronous or synchronous. The UserPtr field is available for use by the calling application's completion routine. The API does not modify this field. The Status field contains the status of the activation request.

The following function terminates the instantiation of the API represented by request:

status DeactivateSonyAPI(ActivateReqPtr request);

The possible status return values for this function are GOOD, signalling that the API is now deactivated and the activateReq data structure is invalid to use for further operations, INVALIDCONNECTION, PENDING, signalling that the API has accepted the deactivate request, but is still active at this time, and UNDEFINEDERROR, signalling that an unexpected error was encountered while attempting to deactivate the API and that the API may be active. After a PENDING value is returned, the API calls the AsyncCompletion routine when the deactivation request is complete. At that time, the request status field will contain the completion status for the activate request.

The single parameter contains the address of the activateReq data structure used to activate the API previously. The section above defines this data structure and describes its fields. Note that when deactivating the caller must use the same data structure that was used to activate the API previously. The caller may modify the values in the AsyncCompletion field and the UserPtr field. The caller should not modify any other field in the activateReq data structure following the initial call to the ActivateSonyAPI routine and prior to the call to the DeactivateSonyAPI routine. In addition to deactivating the API for a specific application, this routine also releases any indication buffers that the application previously passed to the API. If there are outstanding indication buffers owned by the application and the application attempts to call this routine synchronously, this routine will return an error. If this happens, the application may call this routine again specifying a completion routine. The API will complete the deactivate request and call the application's indication routine when all of the application's indication buffers have been released.

The API calls the indication handling routines, BusResetHandler and IndicationHandler, asynchronously, and they may have limited system services available to them. Depending on the environment and possibly some other circumstances, the API may call these routines at interrupt level. In the BusResetHandler routine, the handler is passed a pointer to bus reset information. In the IndicationHandler routine, the handler is passed a pointer to indication information. The application passes the address of one or both of these indication routines to the API at the time that it activates the API. The application may provide either one of these handlers, both handlers or no handler routines at all.

The bus reset handling routine has the following calling convention:

void BusResetHandler(BusResetBlockPtr busResetBlock);

The busResetBlock data structure contains the address of a data structure which describes the bus reset event, as defined in Table II below.

TABLE II

```
typedef struct {
    ActivatereqPtr   activateReq;     /* the session */
    QUADLET          generation;      /* bus generation */
    QUADLET          numNodes;        /* number of nodes on the bus */
    TopologyMapPtr   topology;        /* bus topology */
... other?
} BusResetBlock, *BusResetBlockPtr;
```

The API calls the bus reset handling routine any time that a bus reset occurs on the IEEE 1394 bus while the API is active for the application that provided the bus reset handler routine. When a cluster of resets occurs due to the physical nature of bus connection and disconnection, the handler will be called once. The handler will not be re-entered, but may be called several times in succession. As the result of the bus reset, all asynchronous transactions which were pending at the time of the bus reset will be completed with an error status. Isochronous traffic will resume per the IEEE 1394 specification, and may produce indications during the execution of the bus reset handler.

The asynchronous transaction request indication routine has the following calling convention:

void IndicationHandler(IndicationBlockPtr indicationBlockPtr)

The IndicationBlockPtr data structure contains the address of an indication block, defined in Table III below.

TABLE III

```
typedef struct {
    ActivateReqPtr   activateReq;                 /* the session */
    LocalBufferPtr   indicationBuf;   /* the info */
} IndicationBlock, *IndicationBlockPtr;
```

The API calls the indication routine when it receives an asynchronous request subaction that is not handled by either the API itself, or by the IEEE 1394 interface hardware. For each such event, the API calls the indication routine of each application, beginning with the first application to activate the API and provide an indication handler. Each indication handler returns a value to the API to indicate whether or not it handled the indication. When the API receives a status from an indication routine indicating that it handled the indication, then the API does not call any other indication routines for this indication.

The API does handle some request subactions itself. For these transactions, the API does not call any indication handler routine. The API passes all IEEE 1394 transaction information that caused the indication and the additional information necessary for the indication handler routine to generate a response subaction through the API.

The application may contribute buffers to the Indication Handler. This facility allows the application to expand the default set of indication buffers in order to accommodate application specific requirements. A larger set of indication buffers allows more outstanding indications without causing a busy ack signal at the IEEE 1394 interface. The application is not guaranteed to receive a buffer belonging to it when it receives an indication from the API. Furthermore, the API may pass an application indication buffer to another application, if necessary, when reporting an indication.

The Current Indication Buffer Count function returns the total count of indication buffers in the indication buffer pool. The returned value is the current count of indication buffers.

The Add Indication Buffers function contributes buffers to the indication buffer pool. Buffer elements are described as a LocalBuffer. The caller of this function cedes ownership of the storage represented by this request to the API and must regain ownership prior to disposing of the storage.

STATUS AddIndBuffers(ActivateReqPtr context, BufMgmtBlockPtr bufBlock);

The possible status return values for an AddIndBuffers function are GOOD, signalling that the API has accepted the request and will complete it at a later time, INVALIDCONNECTION, PENDING, signalling that the API has accepted the request, UNSUPPORTEDOP, signalling that the buffers cannot be added on this platform, and UNDEFINEDERROR, signalling that an unexpected error was encountered while attempting to honor the request, even though some data may have been transferred. When a pending value is returned the API calls the AsyncCompletion completion routine when the request is complete. At that time, the status field of the BufMgmtBlock will contain the completion status for the request.

The first parameter of an AddIndBuffers function contains the address of a valid ActivateReq data structure. The second parameter contains the address of a BufMgmtBlock data structure. This data structure describes the buffers, as defined in Table IV below.

TABLE IV

```
typedef struct BufMgmtBlock {
    BMIdata APIprivate;           /* API private */
    LocalBufferPtr buffs;         /* the buffers to contribute */
    void (*AsyncCompletion) (struct BufMgmtBlock *req);
                                  /*completion routine*/
    void *UserPtr;                /*for use by the completion routine*/
    STATUS    Status;             /*completion status for operation*/
} BufMgmtBlock, *BufMgmtBlockPtr;
```

The APIprivate field includes private data for management of the request. The LocalBufferPtr field contains descriptors for the buffer(s) to contribute. These buffers can be of any size. The API may use none, part or all of the contributed buffers at its discretion. When the AsyncCompletion field is not equal to null, it contains the address of the routine to call upon completing the operation. The UserPtr field is available for use by the calling completion routine. The API does not modify this field. The Status field contains the status of the requested data transfer operation. The Status field contains status "pending" until the asynchronous operation is completed. When the completion routine is invoked, the Status field will contain completion status.

The Release Indication Buffers function returns previously added indication buffers to the invoker. Buffer elements are described as a LocalBuffer. The invoker of this function may specify a subset of the buffers added by an AddIndBuffers function request. When all of the requested buffers are released, the completion routine is invoked.

STATUS RelIndBuffers(ActivateReqPtr context, BufMgmt BlockPtr bufBlock);

The possible status return values for a RelIndBuffers function are PENDING, signalling that the API has accepted the request and will complete it at a later time, INVALIDCONNECTION, UNSUPPORTEDOP, signalling that buffers cannot be added on this platform, and UNDEFINEDERROR, signalling that an unexpected error was encountered while attempting to honor the request, even though some data may have been transferred.

The first parameter of a Release Indication Buffer contains the address of a valid activateReq data structure. The second parameter contains the address of a BufMgmtPtr data structure. This data structure describes the buffers, as defined above. When the application requests the API to release a buffer, it must describe that buffer using the same description as when the buffer was first given to the API.

The Bus Management routines perform IEEE 1394 bus management functions. These functions include allocating and deallocating isochronous bus resources and retrieving information about the topology or configuration of the IEEE 1394 bus.

The MGMTAllocateChannel routine uses the protocols defined in section 8 of the IEEE 1394 standard to allocate a single isochronous channel number. The MGMTAllocate Channel routine calling convention is as follows:

status MGMTAllocatChannel (ActivateReqPtr context, MGMTAllocateChBlockPTr allocateChBlock);

The possible status return values for a MGMTAllocateChannel routine are GOOD, signalling that the channel was successfully allocated, INVALIDCONNECTION, signalling that the context parameter does not contain the address of a currently active connection to the API, PENDING, signalling that the API has accepted the request, CHUNAVAILABLE, signalling that the requested channel number is currently not available, and UNDEFINEDERROR, signalling that an unexpected error was encountered. If a pending value was returned the API calls the MGMTCompletion routine when the allocation request is complete and at that time, the status field will contain the completion status for this request.

The first calling parameter of a MGMTAllocateChannel routine is the address of an active ActivateReq data structure. The second parameter contains the address of a data structure as defined in Table V below.

TABLE V

```
typedef struct MGMTAllocateChBlock {
    QUADLET channel;          /* channel number to allocate,
                                 or all ones */
    QUADLET allocateCh;       /* actual channel number allocated*/
    OCTLET chAvailable;       /* bit mask of available channel
                                 numbers */
    void (*MGMTCompletion) (struct MGMTAllocateChBlock *req);
                                 /* client completion routine */
    void *UserPtr;            / *for use by the completion routine */
    STATUS Status;            / *completion status */
} MGMTAllocateChBlock, *MGMTAllocateChBlockPtr
```

The channel field contains the channel number to allocate. If the channel number is in the range of 0 to 63, inclusive, then the routine attempts to allocate the specified channel number. If the channel number is equal to all ones, then the routine chooses a channel number to allocate. If the channel field contains any other value, then the routine fills in the chAvailable field and returns the chUnavailable status. Note that this can be used to determine the current value of the channels available bit mask from the currently active Isochronous Resource Manager. The allocatedCh field is filled with the actual allocated channel number, or all ones if a channel was not allocated as a result of calling this routine. The chAvailable field is filled with the current value of the channels_available CSR at the Isochronous Resource Manager. Note that the value in the CSR may change at any time, so the value in this field is only a snapshot and may be different on subsequent calls. If the value in the MGMTCompletion field is not equal to NULL, then this field contains the address of the routine to call upon completion. The UserPtr field is available for use by the application's completion routine. The API does not modify this field. The Status field contains the completion status for this call. If the application calls this routine asynchronously, this field contains PENDING status until the completion routine is called.

The MGMTAllocateBandwidth routine uses the protocols defined in section 8 of the IEEE 1394 standard to allocate isochronous bandwidth. The MGMTAllocateBandwidth routine's calling convention is as follows:

status MGMTAllocateBandwidth (ActivateReqPtr context, MGMTAllocateChBlockPtr allocateChBlock);

The possible status return values of the MGMTAllocateBandwidth routine are GOOD, signalling that the bandwidth was successfully allocated, INVALIDCONNECTION, signalling that the context parameter does not contain the address of a currently active connection to the API, PENDING, signalling that the API has accepted the request, BWUNAVAILABLE, signalling that the requested bandwidth is currently not available, and UNDEFINEDERROR, signalling that an unexpected error was encountered. If a pending value was returned the API calls the MGMTCompletion routine when the allocation request is complete and at that time, the status field will contain the completion status for this request.

The first calling parameter of a MGMTAllocateBandwidth routine is the address of an active ActivateReq data structure. The second parameter contains the address of a data structure as defined in Table VI below.

TABLE VI

```
typedef struct MGMTAllocateBWBlock {
    QUADLET bandwidth;        /*bandwidth to allocate, or all ones*/
    QUADLET bwAvailable   /*actual value of BWAvailable register
                                    in IRM*/
    void (*MGMTCompletion)
    (struct MGMTAllocateBWBlock *req);
                                    /*client completion routine*/
    void *UserPtr;             /*for use by the completion routine*/
    STATUS Status;             /*completion status*/
} MGMTAllocateBWBlock, *MGMTAllocateBWBlockPtr;
```

The bandwidth field contains the amount of bandwidth to allocate. If this number is equal to all ones, then the routine fills in the bwAvailable field and returns the BWUNAVAILABLE status. Note that this can be used to determine the current value of the bwavailable field from the currently active Isochronous Resource Manager. The bwAvailable field is filled with the current value of the bandwidth/available CSR at the Isochronous Resource Manager. Note that the value in the CSR may change at any time, so the value in this field is only a snapshot and may be different on subsequent calls. If the value in the MGMTCompletion field is not equal to NULL, then it contains the address of the routine to call upon completion. The UserPtr field is available for use by the application's completion routine. The API does not modify this field. The Status field contains the completion status for this call. If the application calls this routine asynchronously, this field contains PENDING status until the completion routine is called.

The MGMTDeAllocateChannel routine uses the protocols defined in section 8 of the IEEE 1394 standard to deallocate a single isochronous channel number. The MGMTDeAllocate Channel routine's calling convention is as follows:

status MGMTDeAllocateChannel (ActivateReqPtr context, MGMTAllocateChBlockPtr allocateChBlock);

The routine takes two parameters and returns a status value. The possible status return values for the MGMTDeAllocate Channel are GOOD, signalling that the channel was successfully deallocated, INVALIDCONNECTION, signalling that the context parameter does not contain the address of a currently active connection to the API, PENDING, signalling that the API has accepted the request, CHUNAVAILABLE, signalling that the requested channel number was not allocated, and UNDEFINEDERROR, signalling that an unexpected error was encountered. If a pending value was returned the API calls the MGMTCompletion routine when the allocation request is complete and at that time, the status field will contain the completion status for this request.

The first calling parameter of a MGMTDeAllocateChannel routine is the address of an active ActivateReq data structure. The second parameter contains the address of a MGMTAllocateChBlock data structure. This routine deallocates the channel specified in the channel field of that data structure and fills in the chAvailable field with the current value of the channels_available bit mask from the currently active isochronous resource manager.

The MGMTDeAllocateBandwidth routine uses the protocols defined in section 8 of the IEEE 1394 standard to deallocate isochronous bandwidth. The MGMTDeAllocateBandwidth routine's calling convention is as follows:

status MGMTDeAllocateBandwidth (ActivateReqPtr context, MGMTAllocateChBlockPtr allocateChBlock);

The routine takes two parameters and returns a status value. The possible status return values for a MGMTDeAllocateBandwidth routine are GOOD, signalling that the bandwidth was successfully deallocated, INVALIDCONNECTION, signalling that the context parameter does not contain the address of a currently active connection to the API, PENDING, signalling that the API has accepted the request, BWUNAVAILABLE, signalling that completing this request would cause the bandwidth_available register in the isochronous resource manager to become invalid and no action was taken, and UNDEFINEDERROR, signalling that an unexpected error was encountered. If a pending value was returned the API calls the MGMTCompletion routine when the allocation request is complete and at that time, the status field will contain the completion status for this request.

The first calling parameter of a MGMTDeAllocateBandwidth routine is the address of an active ActivateReq data structure. The second parameter contains the address of a MGMTAllocateBWBlock data structure. This routine deallocates the bandwidth contained in the bandwidth field and fills in the bwAvailable field with the current value of the bandwidth_available register in the currently active isochronous resource manager.

The MGMTBusInfo routine returns information about the node on which the application is running and the connected IEEE 1394 bus. Such information includes the current setting of the PHY gap count, the number of nodes on the connected IEEE 1394 bus, a pointer to the bus topology map and a pointer to the bus speed map, as defined in the IEEE 1394 standard.

The ASYNDataRequest routine generates one or more IEEE 1394 asynchronous read or write transactions in order to transfer data between the application's data buffer and a linear range of addresses in the 64 bit IEEE 1394 address space. The ASYNDataRequest routine has the following calling convention:

STATUS ASYNDataRequest (ActivateReqPtr request, asyncTransportPtr xfrBlock);

The possible status return values for an ASYNDataRequest routine are GOOD, signalling that the API has successfully completed the data transfer request, PENDING, signalling that the API has accepted the request and will complete it at a later time, INVALIDOPCODE, signalling that there is an unknown code in the flags.opCode field, INVALIDCONNECTION, signalling that the activateReqPtr field does not represent an active connection, and UNDEFINEDERROR, signalling that an unexpected error was encountered while attempting to honor the request even though some data may have been transferred.

The first parameter of an ASYNDataRequest routine contains the address of a valid activateReq data structure. The second parameter contains the address of an asyncTransport data structure. This data structure describes the requested data transfer operation, as defined in Table VII below.

set to zero, instructs the routine to transfer data to an incrementing range of IEEE 1394 addresses, beginning with the address contained in the remoteBufPtr field. The BlockSize field contains the maximum size, in bytes, to use for all block read or write request subactions. A value of zero means to use the maximum request size for the chosen bus speed. The APPLBufPtr field contains the descriptor for the application data buffer. The RemoteBufPtr field contains the 64 bit address of the data buffer in a remote IEEE 1394 node. The Length field contains the number of bytes to transfer which may be less than or equal to the length of the application data buffer. When the AsyncCompletion field is not equal to null, it contains the address of the routine to call upon completing the data transfer. The UserPtr field is available for use by the calling application's completion routine and is not modified by the API. The Status field contains the status of the requested data transfer operation. This field contains status "pending" until the asynchronous operation is complete. When the completion routine is invoked, this field will contain completion status.

The ASYNLockRequest routine generates one lock transaction on the IEEE 1394 bus. The ASYNLockRequest routine has the following calling convention:

STATUS ASYNLockRequest (ActivateReqPtr request, AsyncLockBlockPtr lockBlock);

The possible status return values for an ASYNLockRequest routine are GOOD, signalling that the API has successfully performed the lock transaction and the results are contained in the AsyncLockBlock, PENDING, signalling that the API has accepted the request and will complete it at a later time, INVALIDOPCODE, signalling that there is an unknown code

TABLE VII

```
typedef struct AsyncTransport {
    ASYdata APIprivate;                          /* API private */
    OPTION          OPCode       :4;   /*defines the operation to perform*/
    OPTION          BusSpeed     :4;   /*bus speed to use for xfr*/
    OPTION          NonIncr      :1;   /*do not increment remote addr*/
    BUFSIZE         BlockSize          /*for block read or write requests -
                                         size to use for all block requests
                                         0 means use max for bus speed*/
    LocalBuffer   ApplBufPtr;           /*buf descr for application data*/
    RemoteAddr    RemoteBufPtr;      /*64 bit address on IEEE 1394 bus*/
    BUFSIZE       Length;            /*number of bytes to transfer*/
    void (*AsyncCompletion)  (struct AsyncTransport* req);   /*cmpl routine*/
    void *UserPtr;                     /*for use by the completion routine*/
    STATUS        Status;            /*completion status for operation*/
} AsyncTransport, *AsyncTransportPtr;
enum OpCodes {
/*asynch data transfer operations */
    BLOCKWRITE ,                 /*transfer data using block write requests*/
    BLOCKREAD,        /*transfer data using block read requests*/
    QUADLETWRITE ,       /*transfer data using QUADLET write transactions*/
    QUADLETREAD ,        /*transfer data using QUADLET read transactions*/
/*lock transactions*/
    MASKSWAP ,                    /*mask swap lock operation*/
    COMPARESWAP ,                 /*compare swap lock operation*/
    FETCHADD ,                    /*fetch and add lock operation*/
    LITTLEADD ,       /*little endian fetch/add lock operation*/
    BOUNDEDADD ,                  /*bounded add lock operation*/
    WRAPADD                       /*wrap add lock operation*/
};
```

The ASYdata field includes private data for management of the request. The OpCode field contains a code describing the requested operation which must be one of the values defined in the asyncOpCodes enum. The NonIncr field when set to one, instructs the routine to transfer all data to the same IEEE 1394 address contained in the remoteBufPtr field and when in the OpCode field of the AsyncLockBlock data structure, INVALIDCONNECTION, signalling that the activateReqPtr field does not represent an active connection, and UNDEFINEDERROR, signalling that an unexpected error was encountered while attempting to honor the request even though some data may have been transferred.

The first parameter of an ASYNLockRequest routine contains the address of a valid activateReq data structure. The second parameter contains the address of an AsyncLockBlock data structure. This data structure describes the requested data transfer operation, as defined in Table VIII below.

TABLE VIII

```
typedef struct AsyncLockBlock {
    ASYdata    APIprivate;                /* API private */
    OPTION     OPCode          :4;        /*defines the operation
                                            to perform*/
    OPTION     BusSpeed        :4;        /*bus speed to use for xfr*/
    struct {
        union {
            QUADLET   Arg32;
            OCTLET    Arg64;
        } arg;                            /* 32 or 64 bit lock
                                            argument */
        union {
            QUADLET   Data32;
            OCTLET    Data64;
        } data;                           /* 32 or 64 bit lock data */
    } ArgData;
    RemoteAddr remoteBufPtr;              /*64 bit address on IEEE
                                            1394 bus*/
    void (*AsyncCompletion) (struct AsyncLockBlock *req);
                                          /*completion routine*/
    void *UserPtr;                        /*for use by the completion
                                            routine*/
    STATUS     Status;                    /*completion status for
                                            operation*/
} AsyncLockBlock, *AsyncLockBlockPtr;
```

The APIPrivate field contains private data for management of the request. The OpCode field contains a code describing the requested operation and must contain one of the values defined in the asyncOpCodes enum. The ArgData struct field contains the argument and data for this lock transaction. The remoteBufPtr field contains the 64 bit destination address on the IEEE 1394 bus. When the AsyncCompletion field is not equal to null, it contains the address of the routine to call upon completing the lock transaction. The UserPtr field is available for use by the calling application's completion routine and is not modified by the API. The Status field contains the status of the requested data transfer operation. This field contains status "pending" until the asynchronous operation is complete. When the completion routine is invoked, this field will contain completion status.

The Isochronous Resource Management routines allocate and deallocate system resources needed to transfer isochronous data over the IEEE 1394 interface into or out of application data buffers. Allocation and deallocation is necessary to avoid conflicts among multiple potential applications of isochronous data in the system. Whenever isochronous data flows over the IEEE 1394 bus, there is an entity on the IEEE 1394 bus which owns the necessary bus resources, namely channel numbers and bandwidth. Each application which uses isochronous data has its own set of rules for who must allocate and deallocate these resources and when. The bus management routines in the API of the first embodiment permit an application to allocate these resources according to the requirements of the IEEE 1394 standard. Note that the routines in this section do not allocate IEEE 1394 bus resources; these routines only allocate system level resources necessary to transfer isochronous data into or out of application data buffers. These resources include a DMA channel and the system resources to sustain it, such as the low level interrupt handler and dispatcher.

The ISOCHOpen routine opens and initializes an isochronous port. An isochronous port is a collection of hardware and software resources in the local node on which the application of the API and the API are running. This collection of resources constitutes everything in the local node which is needed to transfer a single stream of isochronous data into or out of the node. This collection of resources does not include the IEEE 1394 bus resources which the application must allocate separately, according to the bus management rules defined in section 8 of the IEEE 1394 standard, and the governing application rules and requirements. The routines which enable an application of the API to allocate and deallocate IEEE 1394 bus resources have been described above.

The port open routine has the following calling convention:

status ISOCHOpen (ActivateReqPtr connectionPtr, ISOCHOpenBlockPtr openBlock);

The first parameter of the port open routine contains the address of a valid activateReq data structure. The second parameter contains the address of an ISOCHOpenBlock data structure. Upon successful completion of this routine, the application uses this ISOCHOpenBlock data structure to reference this opened isochronous port on future calls to the API which affect this port.

The possible status return values for a port open routine are GOOD, signalling that an open request was completed successfully, PENDING, signalling that the API has accepted the request and will complete it at a later time, NORESOURCES, signalling that an isochronous port or other necessary resource is not currently available and the request is denied, INVALIDREQUEST, signalling that the requested bus speed is not supported, INVALIDCONNECTION, signalling that the ActivateReqPtr field does not represent an active API connection, and UNDEFINEDERROR, signalling that the request could not be honored, but the error could not be identified.

The calling parameter of a port open routine contains the address of an ISOCHOpenBlock data structure. This data structure describes the request, as defined in Table IX below.

TABLE IX

```
typedef struct {
    ISOlink APIprivate;                   /* API private */
    OPTION     Direction       :2;        /*source/sink*/
    OPTION     BusSpeed        :4;        /*requested bus speed*/
    void (*AsyncCompletion))struct ISOCHOpenBlock* req);   /*compl
                                                             routine*/
    void *UserPtr;                        /*for use by the completion
                                            routine*/
    STATUS     Status;                    /*completion status for
                                            operation*/
} ISOCHOpenBlock, *ISOCHOpenBlockPtr;
enum Direction {
    INPUT ,                               /*specifies input to application
                                            to data buffer*/
    OUTPUT                                /*specifies output from application
                                            data buffer*/
};
```

The direction field indicates the direction of the isochronous data transfer. When the AsyncCompletion field is not equal to null, it contains the address of the routine to call upon completion. The UserPtr field is available for use by the calling application's completion routine and is not modified by the API. The Status field contains the status of the requested data transfer operation. This field contains status "pending" until the asynchronous data transfer operation is complete. When the completion routine is invoked, this field will contain completion status. When the application is finished with the isochronous port, it passes the isochPortPtr to the ISOCHClose routine.

The ISOCHClose routine closes an isochronous port that was previously opened using the ISOCHOpen routine. This routine has the following calling convention:

STATUS ISOCHClose (ActivateReqPtr connectionPtr, ISOCHOpenBlockPtr openBlock);

This routine takes a single parameter and returns a status value. This routine executes asynchronously, and invokes the completion routine defined in the ISOCHOpenBlock upon completion. The possible status return values of an ISOCH-Close routine are GOOD, signalling that the operation was completed successfully, PENDING, signalling that the API has accepted the request and will complete it at a later time, INVALIDCONNECTION, signalling that the connectionPtr does not represent an active API connection or openBlock does not represent a currently open isochronous port, and UNDEFINEDERROR, signalling that the request could not be honored, but the error could not be identified.

The first calling parameter of ISOCHClose routine is the address of a valid activateReq data structure. The second calling parameter is the address of the ISOCHOpenBlock used to open the port with the ISOCHOpen routine.

The isochronous data control routine controls a stream of isochronous data into or out of application data buffers. For applications which listen to isochronous data, these control routines only affect the flow of isochronous data into the system; they do not affect the isochronous data on the IEEE 1394 bus itself. For applications that transmit isochronous data from application data buffers, these control routines also affect the flow of isochronous data on the IEEE 1394 bus.

The ISOCHControl routine has the following calling convention:

STATUS ISOCHControl (ISOCHOpenBlockPtr opensBlockPtr, ISOCHCtlBlockPtr ctlReqPtr);

The possible status return values of an ISOCHControl routine are GOOD, signalling that the operation was completed successfully, INVALIDCONNECTION, signalling that the openBlock field does not represent an active isochronous port, PENDING, signalling that the operation is currently pending, INVALIDOPCODE, signalling that the opCode field of the ISOCHControlBlock contained an illegal value, UNSUPPORTEDOP, signalling that the operation is not supported due to a limitation of the IEEE 1394 interface hardware or a limitation of the software or operating environment, and UNDEFINEDERROR, signalling that the operation could not be performed, but the error could not be identified. If a pending value is returned, at the time the callback routine is called, the status field in the ISOCHControlBlock will contain the completion status of the control request.

The first parameter of an ISOCHControl routine contains the address of a valid ISOCHOpenBlock data structure. The second parameter contains the address of an ISOCHCtlBlock data structure. This data structure describes the requested control operation, as defined in Table X below.

TABLE X

| typedef struct ISOCHCtlBlock { | | |
|---|---|---|
| ISOlink APIPrivate; | | /* API private */ |
| OPTION IsoOpCode | :4; | /*operation to perform*/ |
| OPTION IsoEvent | :4; | /*trigger event for start/stop*/ |
| OPTION Sy | :4; | /*sy field value, if needed*/ |
| OPTION Tag | :2; | /*tag value to use when starting*/ |
| OPTION Channel | :6; | /*channel value to use when starting*/ |

TABLE X-continued

| BusTime Time; | /*specifies when an event should occur*/ |
|---|---|
| void (*AsyncCompletion)(struct ISOCHCtlBlock *req); | /*completion routine*/ |
| void *UserPtr; | /*for use by the completion routine*/ |
| STATUS Status | /*completion status for operation*/ |
| } ISOCHCtlBlock, *ISOCHCtlBlockPtr; | |

The APIPrivate field contains private storage used by the API to manage this request. The IsoOpCode field contains a value from the IsoOpCode enum which describes the requested control operation. The IsoEvent field specifies the trigger event on which to perform the requested operation. If the IsoEvent field contains the value "SYFIELD," the Sy field contains the value in the sy field that will cause the isochronous channel to start or stop. If the IsoOpCode field contains the value "START," the value from the Tag field is used for the tag value in the isochronous data block packet header. If the IsoOpCode field contains the value "START," the value from the Channel field is used for the channel value in the isochronous data block packet header. If the IsoEvent field contains the value "TIME," the Time field contains the bus time on which the requested action is to take place. When the AysncCompletion field is not equal to null, it contains the address of the routine to call upon completion of the data transfer. The UserPtr field is available for use by the calling application's completion routine. The API does not modify this field. The Status field contains the status of the requested data transfer operation. This field contains status "pending" until the asynchronous data transfer operation is complete. When the completion routine is invoked, this field will contain completion status.

The isochronous attach routine passes application data buffer descriptors to the API software. The application may call this routine at any time to make buffers available to the IEEE 1394 interface hardware and the associated low layers of software. The calling 1b convention for this routine is as follows:

status ISOCHAttach(ISOCHOpenBlockPtr openBlock, ISOCHAppendBlockPtr append);

The possible status return values for an isochronous attach routine are GOOD, signalling that the operation was completed and the application data buffers are accepted, INVALIDCONNECTION, signalling that the openBlock field does not represent an active isochronous port, UNSUPPORTEDOP, signalling that the resynchronization event specified in a buffer descriptor is not supported which may be due to hardware implementation, software implementation or other system environment limitation, INVALIDREQUEST, signalling that an attempt to append a circular list of application data buffers while isochronous data is flowing, or to append new buffers to an existing circular list while isochronous data is flowing, and UNDEFINEDERROR, signalling that the operation could not be completed, but an actual error could not be identified.

The first parameter of an ISOCHAttach routine contains the address of a valid ISOCHOpenBlock data structure. The second parameter contains the address of an ISOCHAppendBlock data structure. This data structure describes the application data buffer list as defined in Table XI below.

TABLE XI

```
typedef struct ISOCHAppendBlock {
    ISOlink APIPrivate;              /* API private */
    isochBufferPtr    IsochBuffList; /*start of list of isoch
                                       buffers*/
    void (*AsyncCompletion) (struct ISOCHAppendBlock *req);
                                     /*completion routine*/
    void *UserPtr;                   /*for use by the completion
                                       routine*/
    STATUS status;                   /*completion status for
                                       operation*/
} ISOCHAppendBlock, *ISOCHAppendBlockPtr;
```

The APIPrivate field contains private storage used by the API to manage the request. The IsochBuffList field contains the address of the first isochronous buffer of a list to append to the specified port. If the current buffer list or the buffer list to append is circular then the operation can only be performed when the port is stopped and the append operation will replace any previously appended buffers. A non-circular list of buffers may be appended to an existing non-circular list of buffers at any time. When the AsyncCompletion field is not equal to null, it contains the address of the routine to call upon completion. The UserPtr field is available for use by the calling application's completion routine and is not modified by the API. The Status field contains the status of the requested operation. This field contains status "PENDING" until the asynchronous data operation is complete. When the completion routine is invoked, this field will contain completion status.

The IsochBuffList field contains the address of an isochBuffer. The isochBuffer data structure describes a single application data buffer. Typically, isochBuffer data structures exist in a doubly linked list. This data structure is defined in Table XII below.

TABLE XII

```
typedef struct isochBuffer {
    struct isochBuffer *Next;        /*ptr to next block*/
    struct isochBuffer *Previous;    /*ptr to prev. Block*/
    OPTION Circular         :1;      /*list is circular*/
    OPTION ResynchEvent     :4;      /*optional resynch event*/
    OPTION Sy               :4;      /*sy field value*/
    busTime Time;                    /*used with resynch event*/
    localBufPtr ApplBufPtr;          /*ptr to application data*/
    void (*IsochCompletion)(struct isochBuffer *buf);
                                     /*completion routine*/
    void *UserPtr                    /*for use by the
                                       completion routine*/
} isochBuffer, *isochBufferPtr;
```

The Next field contains the address of the next buffer in the list. The Previous field contains the address of the previous buffer in the list. The Circular field indicates that the complete set of buffers is circular. The ResynchEvent field contains an optional resynchronization event. A value of IMMEDIATE in this field indicates no resynchronization. When the ResynchEvent field contains a value of "SYFIELD," the Sy field contains the sy value to pause for before transferring data into or out of this application data buffer. When the ResynchEvent field contains a value of "TIME," the Time field contains the bus time to wait for before transferring data into or out of this application data buffer. The ApplBufPtr field contains the address of the application data buffer. This address may be logical, physical, scattered or contiguous, depending on the capabilities of the operating environment. The IsochCompletion field contains the address of the completion routine. If the value in this field is not null, then this routine is called when data transfer for this buffer is complete. The UserPtr field is available for use by the calling application's completion routine and is not modified by the API.

The ISOCHDetach routine retrieves application data buffers from the API and returns ownership to the application. The application may call this routine at any time to detach buffers from the IEEE 1394 interface hardware and the associated low layers of software. The requested buffers are detached when the completion routine is invoked. The calling convention for this routine is as follows:
    status ISOCHDetach(ISOCHOpenBlockPtr openBlock,
        ISOCHAppendBlockPtr unhook);

The possible status return values of an ISOCHDetach routine are GOOD, signalling that the operation was completed and the application data buffers are now detached, PENDING, signalling that the operation is currently pending, INVALID-CONNECTION, signalling that the openBlock field does not represent an active isochronous port, INVALIDREQUEST, signalling that the buffers described in the ISOCHAppendBlock were not found, or they are not owned by the isochronous port described in the ISOCHOpenBlock structure, and UNDEFINEDERROR, signalling that the operation could not be completed, but an actual error could not be identified. If a pending value is returned, at the time the callback routine is called, the status field in the ISOCHAppendBlock will contain the completion status of the detach operation.

The first parameter of an ISOCHDetach routine contains the address of a valid ISOCHOpenBlock data structure. The second parameter contains the address of an ISOCHAppendBlock data structure. This data structure describes the application data buffer list as defined above.

The applications programming interface of the first embodiment of the present invention provides an interface to an application and allows the application to transfer data over a bus structure in both isochronous and asynchronous data formats. The applications programming interface of the first embodiment supports transferring asynchronous data over the bus structure 28 during an isochronous data transfer. While the isochronous data is being transferred over the bus structure 28, the asynchronous data can be used to fill in the gaps. The IEEE 1394 standard specifies a worst case jitter for the isochronous data, thereby specifying a bounded latency for a packet of isochronous data. The API 20 therefore ensures that the packets of isochronous data are transferred during their appropriate time period. However, in the gaps between the packets of isochronous data, asynchronous packets of data are transferred.

In contrast to systems of the prior art, the API of the first embodiment of the present invention is capable of automating the transfer of asynchronous data by controlling an automatic transaction generator 38 which automatically generates the transactions necessary to complete an asynchronous data transfer over the memory-mapped bus structure 28. During an isochronous data transfer, a linked list of buffer descriptors, each representing a corresponding buffer, is maintained for transferring the data to or from the application over the bus structure 28. Each buffer can include a callback routine and a resynchronization event.

Isochronous API

Figure 7:
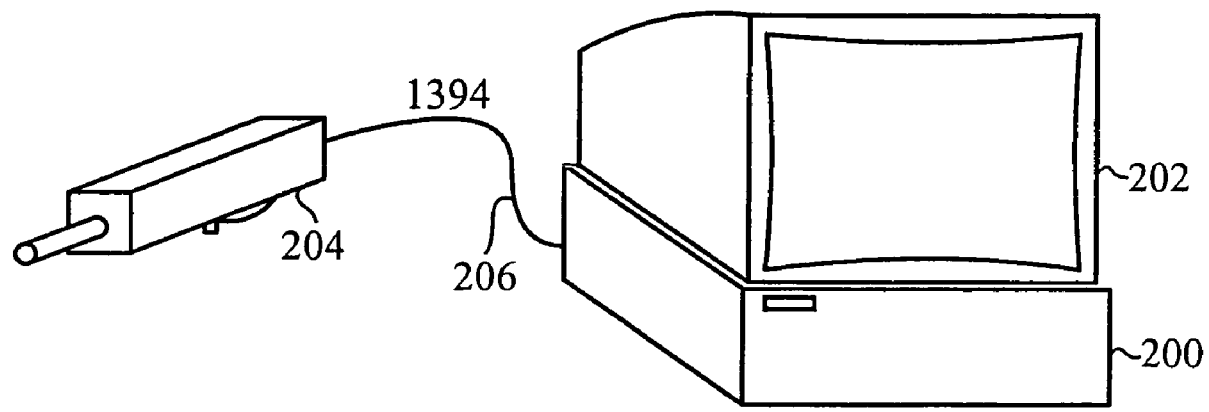
FIG. 7 illustrates a block diagram of an exemplary IEEE 1394-1995 serial bus network including a computer system and a video camera.

An isochronous applications programming interface (API) according to the preferred embodiment of the present invention is implemented within any device transmitting or receiving isochronous data, such as either the computer system 200 or the video camera 204 of FIG. 7. The isochronous API according to the preferred embodiment of the present invention presents a virtual representation of a plug, using a plug handle, in which multiple client applications can register to a given plug. Once the client application is registered with the representation of the plug, the client application has an event handle that will signal the client application for any state changes that occur on the plug. The isochronous API also provides functions for the client application to establish the isochronous connection and the type of connection between devices on the bus. The isochronous API also manages data transfer operations through input and output plugs for client applications. When receiving a request from a client application for an isochronous data transmission or reception operation, the isochronous API connects an appropriate plug, allocates the appropriate resources and manages the resources during the operation.

Figure 8:
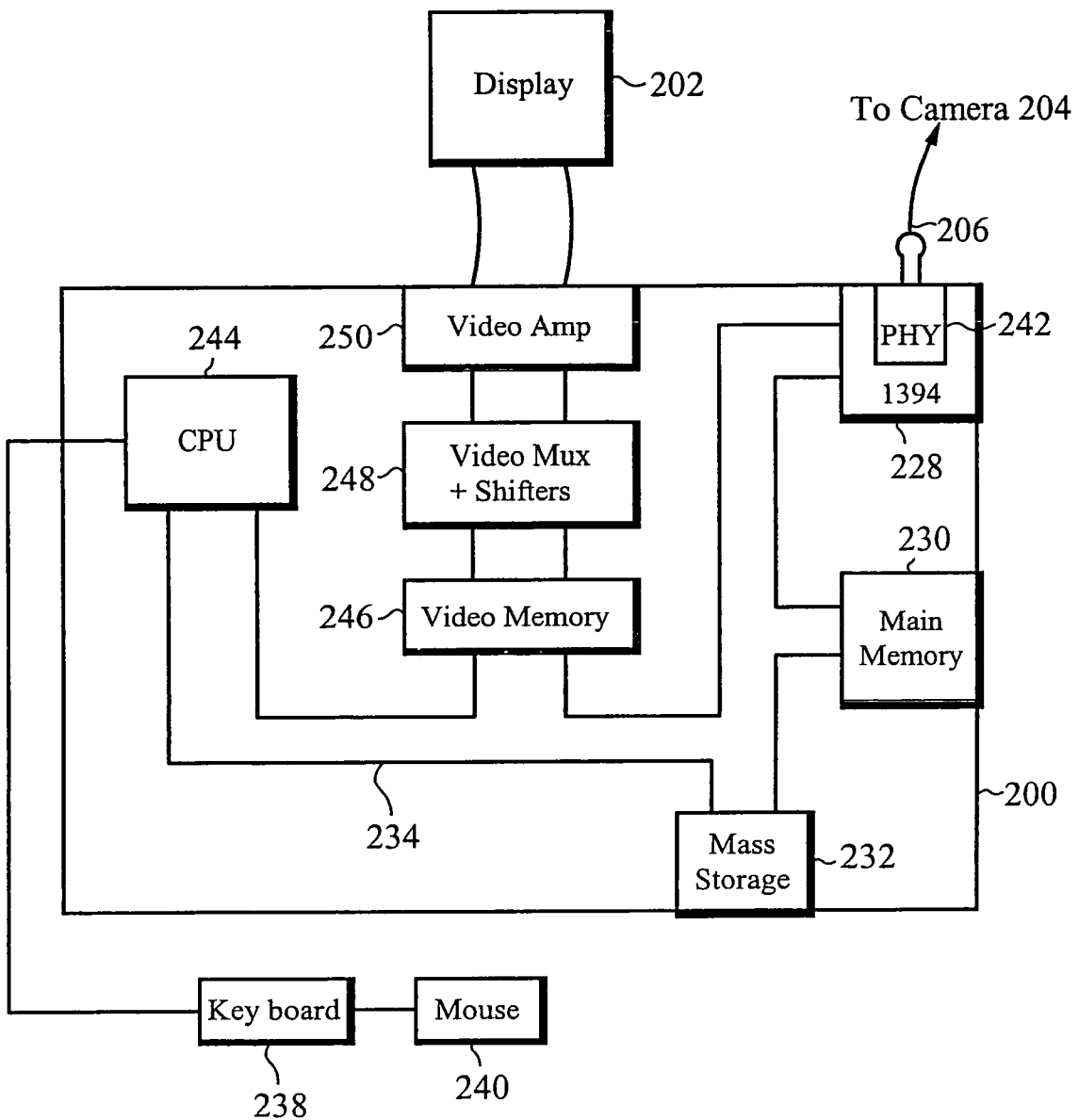
FIG. 8 illustrates a block diagram of the internal components of the computer system 200.
Figure 9:
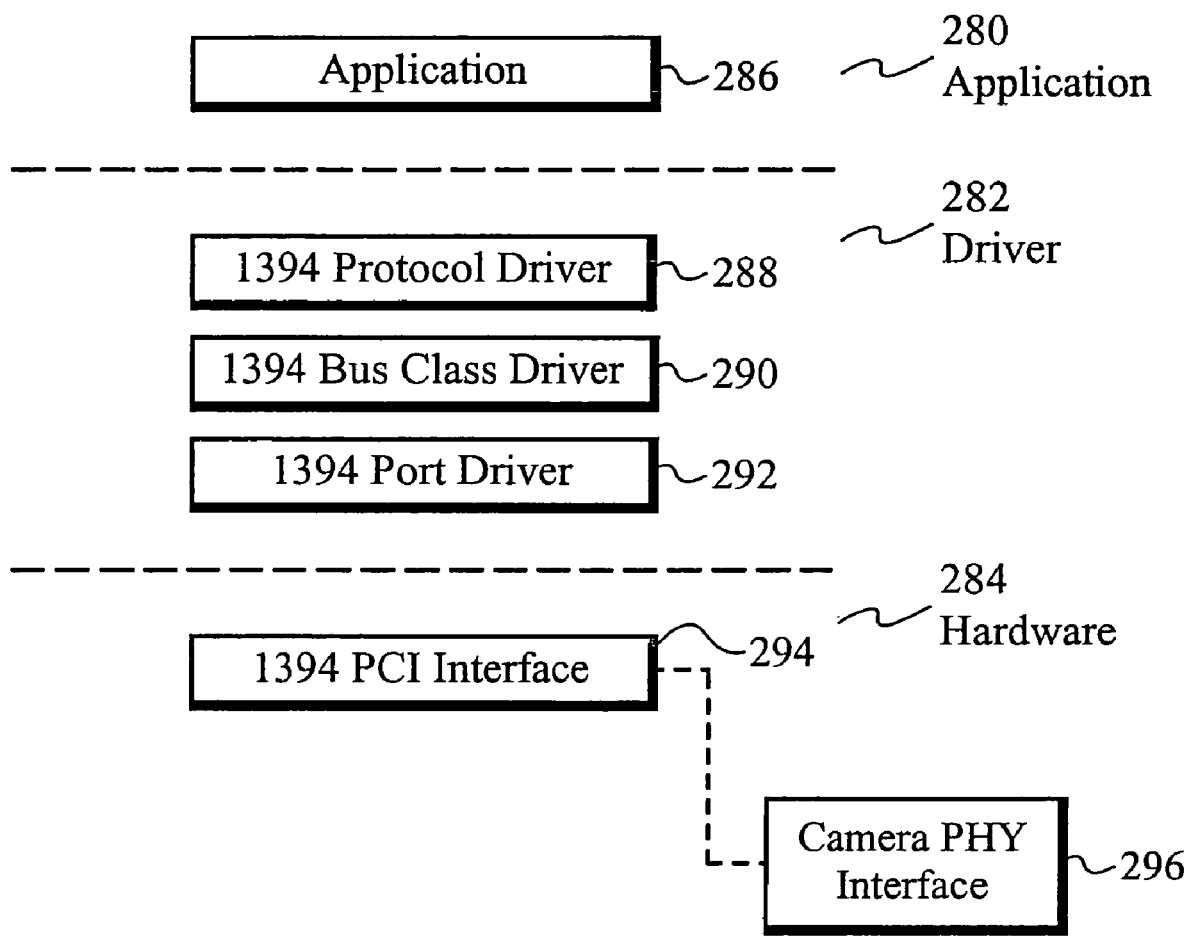
FIG. 9 illustrates a diagram of software layers currently implemented within a typical IEEE 1394-1995 capable computer system.
Figure 10:
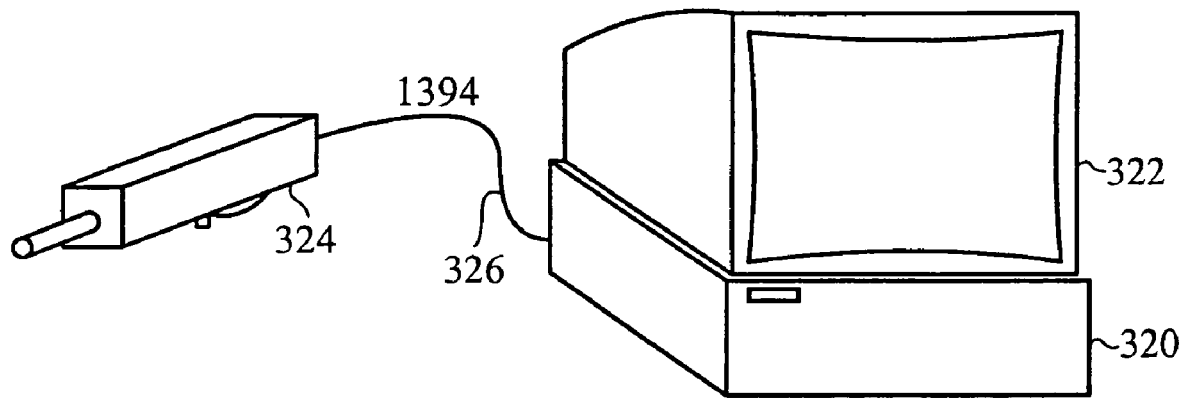
FIG. 10 illustrates an exemplary IEEE 1394-1995 serial bus network implementing the isochronous API of the present invention and including a computer system and a video camera.

An exemplary IEEE 1394-1995 serial bus network implementing the isochronous API of the present invention and including a computer system and a video camera is illustrated in FIG. 10. The computer system 320 includes an associated display 322 and is coupled to the video camera 324 by the IEEE 1394-1995 serial bus cable 326. Video data and associated data are sent between the video camera 324 and the computer system 320 over the IEEE 1394-1995 serial bus cable 326. The computer system 320 preferably includes the internal components and peripheral input and output devices as illustrated in FIG. 8 and implements the software layers, modules and drivers, as illustrated in FIG. 9.

Figure 11A:
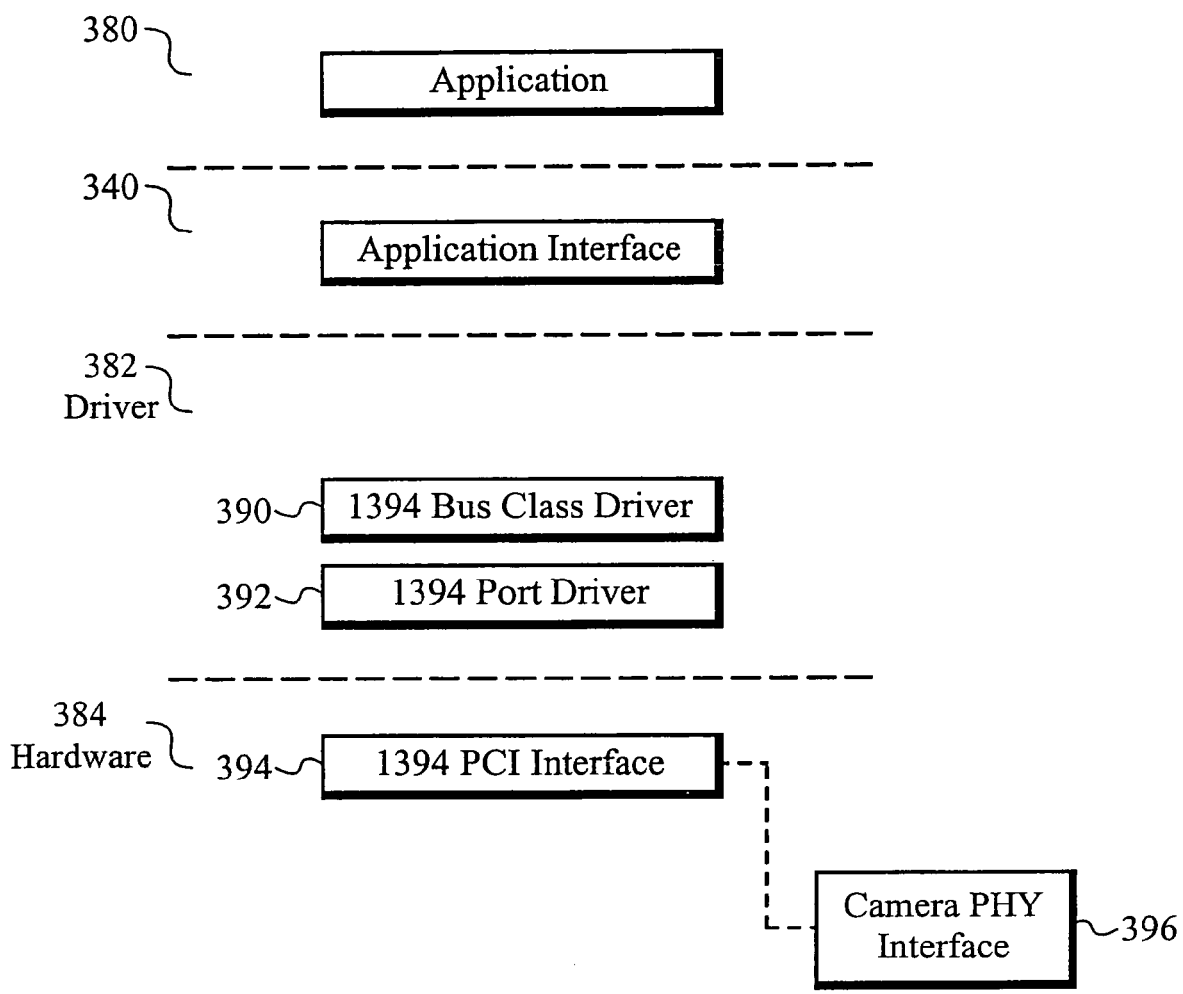
FIG. 11A illustrates a diagram of software layers included within a node or system implementing the isochronous API of the present invention on a personal computer.

The function of the isochronous API of the present invention is preferably implemented within a separate layer above the 1394 Bus Class driver 390, as illustrated in FIG. 11A, for personal computer based implementations, such as within the computer system 320. The diagram illustrated in FIG. 11 is similar to the diagram illustrated in FIG. 9, except that an additional isochronous API layer 340 is added between the 1394 Bus Class driver 390 and the application layer 380. Alternatively, the function of the isochronous API of the present invention is implemented within a separate layer which side-by-side with the 1394 Bus Class driver 390. The isochronous API layer 340 manages the virtual representation of both input and output plugs for the device. Using a plug handle, multiple client applications can register to a given plug. The isochronous API layer 340 associates client applications that register with a given plug with the virtual representation of the plug. Once the client application is registered with the virtual representation of the plug, the client application has an associated event handle. The isochronous API layer 340 signals the client application of any state changes that occur on the plug through this associated event handle. The isochronous API layer 340 also provides functions for the client application to establish the isochronous connection and the type of connection for transmission of isochronous data between devices on the bus.

A hardware and physical interface 384 is included between the isochronous API layer 340 of the present invention and the IEEE 1394-1995 serial bus. The hardware and physical interface includes a bus interface for monitoring and managing the flow of data to and from the IEEE 1394-1995 serial bus structure.

Figure 11B:
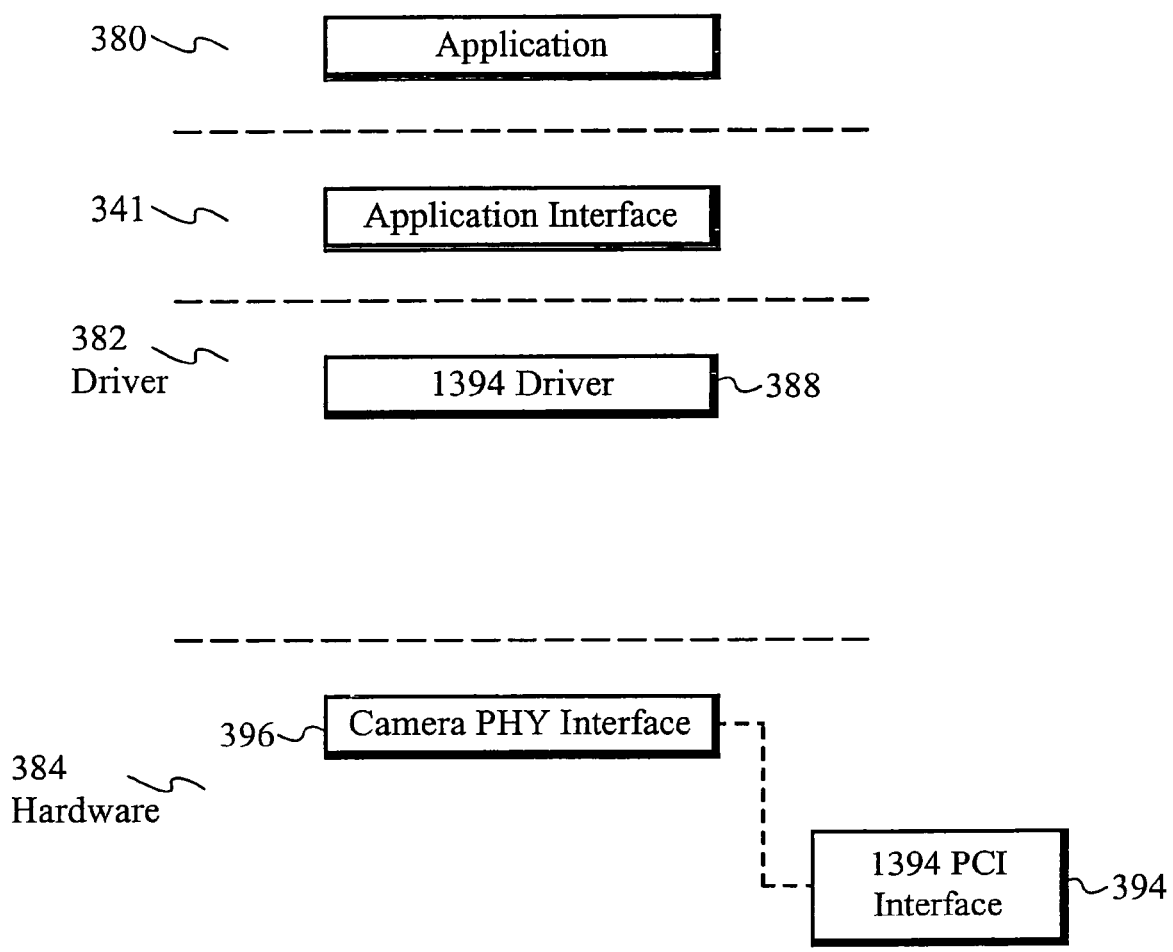
FIG. 11B illustrates a diagram of software layers included within a node or system implementing the isochronous API of the present invention within an embedded environment.

An implementation of the isochronous API of the present invention within an embedded environment, such as the video camera 324, is illustrated in FIG. 11B. In this embedded environment, the isochronous API layer 341 is added between the 1394 Driver 388 and the application layer 380. Again, in this embedded environment, the isochronous API layer 341 manages the virtual representation of both input and output plugs for the device. Using a plug handle, client applications can register to a given plug. The isochronous API layer 341 associates client applications that register with a given plug with the virtual representation of the plug. Once the client application is registered with the virtual representation of the plug, the client application has an associated event handle. The isochronous API layer 341 signals the client application of any state changes that occur on the plug through this associated event handle. The isochronous API layer 341 also provides functions for the client application to establish the isochronous connection and the type of connection for transmission of isochronous data between devices on the bus.

A hardware and physical interface 384 is included between the isochronous API layer 341 and the IEEE 1394-1995 serial bus. The hardware and physical interface includes a bus interface for monitoring and managing the flow of data to and from the IEEE 1394-1995 serial bus structure.

Isochronous API Usage

Broadcast Transmission

Figure 21:
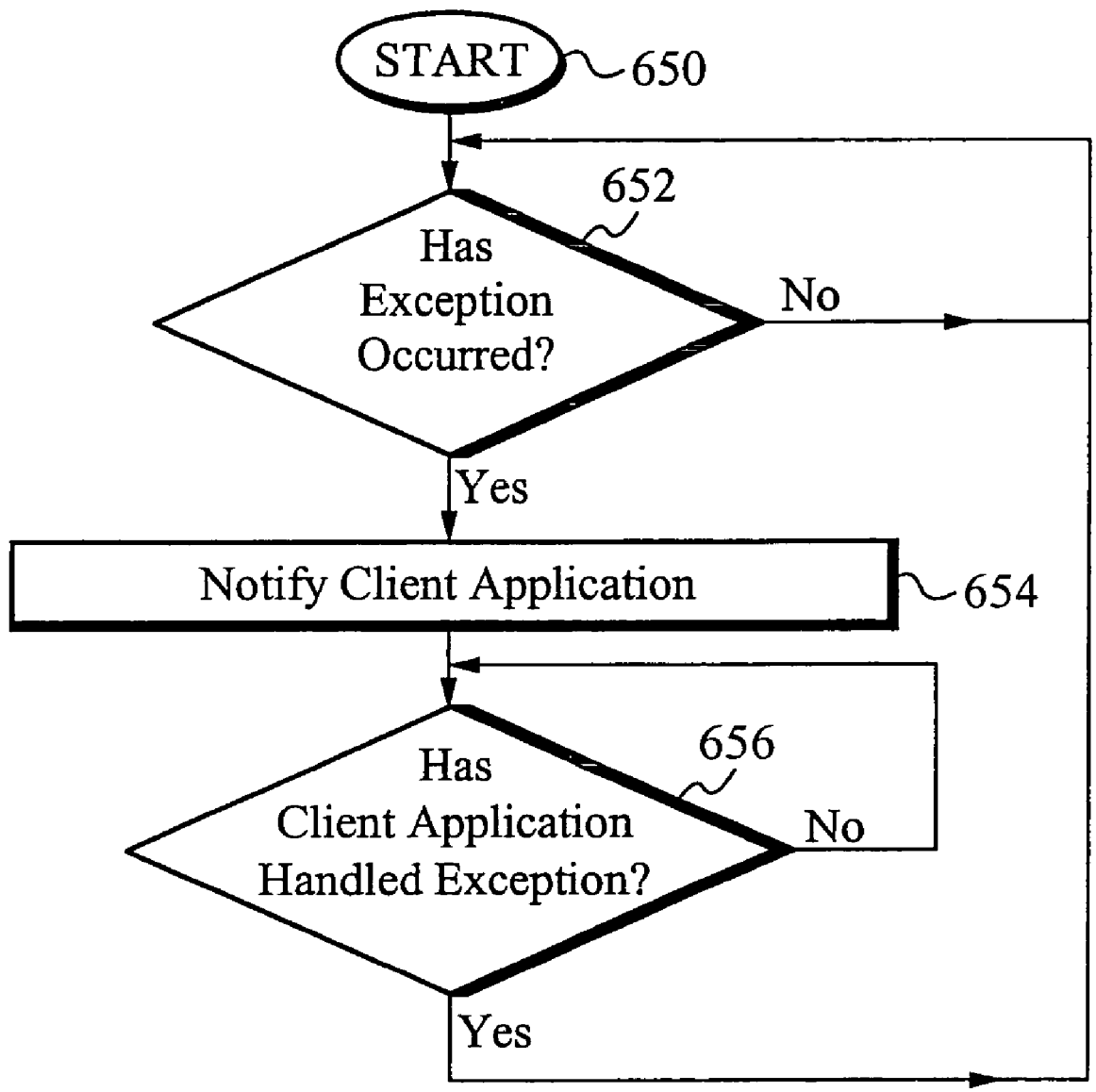
FIG. 21 illustrates a flowchart showing the exception handling process followed by the isochronous API of the present invention.

Utilizing the isochronous API of the present invention, an application begins a broadcast transmission on an output plug, by transmitting a request to the isochronous API for a broadcast transmission. The isochronous API then connects an output plug, allocates the appropriate resources and manages the resources during the isochronous transmission. If an exception occurs during a broadcast transmission, then the isochronous API notifies the client application of the exception and allows the client application to handle the situation that caused the exception. A flowchart illustrating the exception handling process implemented by the isochronous API is illustrated in FIG. 21. This exception handling process is preferably implemented by the isochronous API in parallel with the broadcast and point-to-point operations, described herein.

The exception handling process starts at the step 650 in the flowchart of FIG. 21. The isochronous API waits at the step 652 until an exception condition occurs. Once an exception condition occurs, the isochronous API then notifies the client application at the step 654, as will be discussed below. The isochronous API then waits at the step 656 until the client application handles the exception condition. Once the client application has handled the exception condition, the isochronous API then returns to the step 652 to wait until another exception occurs.

Figure 12:
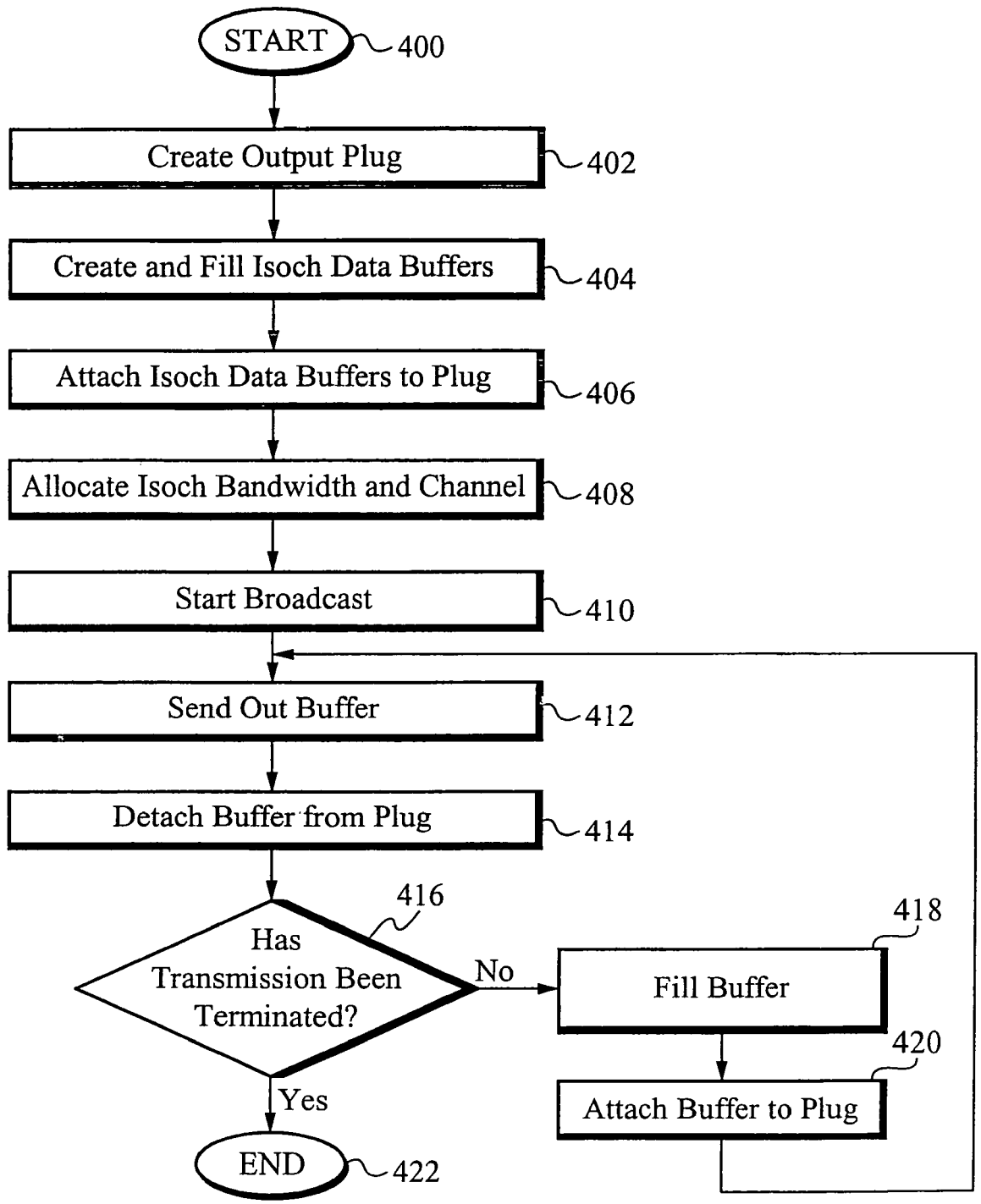
FIG. 12 illustrates a flowchart showing the process followed by the isochronous API in response to a broadcast transmission request from an application.

A flowchart illustrating the process followed by the isochronous API in response to a broadcast transmission request from an application is illustrated in FIG. 12. This broadcast transmission process starts at the step 400. At the step 402, the output plug is created by calling a function OpenIsochOutputPlug, as defined in Table XIII below.

TABLE XIII

| | | |
|---|---|---|
| STATUS OpenIsochOutputPlug ( in BYTE plugNumber, | | |
| | in | ISOCH_OUTPUT_PLUG_REG outputPlugData, |
| | in | BYTE dataFormat, |
| | in | EVENT plugEvent, |
| | out | PLUG_HANDLE *plugHandle ) |

Within the function OpenIsochOutputPlug, which is used to create an output plug, the parameter BYTE plugNumber represents the plug number of the local device. The parameter BYTE dataFormat represents the data format of the plug data and preferably supports raw data formats, DV data formats, MPEG data formats and audio data formats. For raw data returned in a buffer, the isochronous API is not required to do any work on the data. For DV and MPEG data, the isochronous API is required to perform some work to put the data in the appropriate format, because of header and other extension requirements. When DV and MPEG data is being output, the isochronous API of the present invention adds header and appropriate extension information to the data. When DV and MPEG data is being received as input data, the isochronous API of the present invention strips header and any other non-needed extension information from the data. The parameter EVENT plugEvent provides a handle to the plug event which signals any external driven changes that occur on the specified output plug. This event handle is monitored by the appropriate client application. The parameter ISOCH_OUTPUT_PLUG_REG outputPlugData represents the data structure with the plug configuration, as defined in Table XIV below.

TABLE XIV

```
typedef struct {
    BYTE channel;          /*specifies isoch channel*/
    BYTE dataRate:2;       /*speed capability*/
    BYTE overheadID:4;     /* isoch overhead ID*/
    BYTE payload:10;       /*maximum quadlets per packet*/
    BYTE pad;              /*data struct padding*/
} ISOCH_OUTPUT_PLUG_REG,
*PISOCH_OUTPUT_PLUG_REG;
```

Within the output plug data structure, the parameter BYTE channel specifies the isochronous channel on which the data is to be transmitted. If the parameter BYTE channel is set to the value USE_ANY_CHANNEL, the isochronous API will use the first free channel during transmission. For transmission on the broadcast channel, the parameter BYTE channel is set to the value USE_BROADCAST_CHANNEL. The parameter BYTE dataRate:2 specifies the speed capability of the broadcast transmission according to Table XV below:

TABLE XV

| DataRate Value | Speed Value |
|---|---|
| 0 | S100 |
| 1 | S200 |
| 2 | S400 |
| 3 | Reserved |

In this exemplary configuration, the parameter BYTE dataRate:2 specifies a speed capability of S400. The parameter BYTE overheadID:4 specifies the isochronous overhead ID and has values ranging from 0-15, as specified within the IEC-61883 standard. In this exemplary configuration, the parameter BYTE overheadID:4 specifies an isochronous overhead ID equal to 4 The parameter BYTE payload:10 specifies the maximum number of quadlets per packet for the broadcast transmission. A zero value within the parameter payload specifies a maximum number of quadlets equal to 1024. In this exemplary configuration, the parameter BYTE payload:10 specifies a maximum number of quadlets of 10.

An output parameter PLUG_HANDLE *plugHandle within the function OpenIsochOutputPlug is a handle to the opened plug and is used for other plug actions and to close the plug. A return value parameter STATUS returns a status value of success, specifying that the plug has been opened successfully, failed, specifying that the plug could not be opened, and invalid_parameter, specifying that the data passed in is not valid. The function OpenIsochOutputPlug opens a plug on which an isochronous stream is broadcast. A call to this function sets the online bit, allocates a resource, such as a DMA channel, for the plug, and while opened, if another device on the bus structure connects to the plug, the event that is passed in will be set. Until buffers are attached to the plug, dummy packets are broadcast from the plug.

After the output plug is created at the step 402, initial isochronous data buffers are then created and filled, at the step 404. After the buffers are created and filled, the isochronous data buffers are then attached to the plug, at the step 406, by calling the function AttachBufferToPlug, as defined in Table XVI below.

TABLE XVI

```
STATUS AttachBufferToPlug (
        in      PLUG_HANDLE plugHandle,
        in      PPLUG_BUFFER pPlugBuffers,
        in      UINT nBuffers )
```

Within the function AttachBufferToPlug, the parameter PLUG_HANDLE plugHandle represents the handle to the opened plug. The parameter UINT nBuffers represents a number of buffers attached to the plug. The parameter PPLUG_BUFFER pPlugBuffers represents an array of an associated data structure, as defined in Table XVII below.

TABLE XVII

```
typedef struct {
    BYTE *pBuffer;            /*specifies buffer containing data*/
    UINT bufferSize;          /*size of the buffer*/
    PPLUG_BUFFER_CBACK Callback;   /*callback called when
 buffer is filled, sent or when an exception condition has occurred*/
    PVOID parameter1;         /*first parameter passed through
                                callback*/
    PVOID parameter2;         /*second parameter passed through
                                callback*/
} PLUG_BUFFER, *PPLUG_BUFFER;
```

Within the plug buffer data structure, the parameter BYTE *pBuffer specifies the buffer containing data. The parameter UINT bufferSize represents the size of the buffer containing data and is preferably quadlet aligned. The parameter PVOID parameter1 is the first parameter passed through the callback. The parameter PVOID parameter2 is the second parameter passed through the callback.

The parameter PPLUG_BUFFER_CBACK Callback represents a callback that is called after the buffer has been sent, in a transmission operation, filled, in a reception operation, and when an exception condition occurs. A plug exception condition occurs when an error is encountered during an isochronous transfer. This callback allows the isochronous API to inform the client application of the exception error that has occurred. This plug buffer callback has a structure as defined in Table XVIII below.

TABLE XVIII

```
typedef void (*buffCback) ( PVOID param1, PVOID param2,
                PLUG_EXCEPTION exception)
    PVOID parameter1;
    PVOID parameter2;
    PLUG_EXCEPTION exception;
```

Within the plug buffer callback structure, the parameter PVOID parameter1 is the first parameter passed through the callback. The parameter PVOID parameter2 is the second parameter passed through the callback. The parameter PLUG_EXCEPTION exception represents the exception that occurred during the isochronous data transfer operation. The values of the parameter PLUG_EXCEPTION exception are defined in the plug exception structure as illustrated in Table XIX below.

TABLE XIX

```
typedef enum {
    NO_EXCEPTION,
    DATA_OUT_OF_SEQUENCE,
    RECEIVING_DUMMY_PACKETS_ONLY,
    STREAM_FORMAT_CHANGED,
    DATA_OUT_OF_SYNC,
} PLUG_EXCEPTION;
```

Within the plug exception structure, the parameter NO_EXCEPTION is a value which represents that no exception occurred and the isochronous data transfer operation was successful. The parameter DATA_OUT_OF_SEQUENCE is a value which represents that the data passed in or received is out of sequence, signalling that data has been lost. The parameter RECEIVING_DUMMY_PACKETS_ONLY is a value which represents that only dummy packets are now being revealed, signalling that the connection is still operational, but no real data is currently being transmitted. The parameter STREAM_FORMAT_CHANGED is a value which represents that the type of data being received has changed, such as if the audio sampling rate has changed or the video data stream has changed from high definition to standard definition. The parameter DATA_OUT_OF_SYNC is a value which represents that the data sent is not synchronized. This condition is detected when the timestamp in the CIP header of the packet is off and needs to be corrected.

The function AttachBufferToPlug is used to attach a series of one or more buffers to either an output plug, in the case of a broadcast, or an input plug, in the case of a reception. A return value parameter STATUS returns a status value of success, specifying that the buffers have been attached successfully, failed, specifying that the buffers could not be attached, invalid_plug_handle, specifying that the plug handle was not valid, and invalid_parameter, specifying that the parameter is not valid. If a callback is supplied, the callback is called when the buffer is either filled, in the receive case, or sent, in the transmit case and when an exception occurs during the isochronous data transmission. An exception condition occurs when issues with the isochronous data occur, as described above. If an exception does occur, preferably, after receiving notification of the exception condition, the client application handles the situation that caused the exception condition and recovers to continue the isochronous transfer operation.

After the isochronous data buffers are attached to the plug, at the step 406, the broadcast is then started by calling the function BroadcastTransmitOn, as defined in Table XX below, which allocates the appropriate isochronous bandwidth and channel, if necessary, at the step 408, and starts the broadcast, at the step 410, by incrementing the broadcast connection counter (BCC) of the output plug control register (oPCR) and informing the DMA to begin the isochronous transmission.

TABLE XX

| STATUS | BroadcastTransmitOn ( | in PLUG_HANDLE *plugHandle, |
| | | in BOOLEAN enableTakeOver ) |

Within the function BroadcastTransmitOn, the parameter PLUG_HANDLE plugHandle provides a handle to the opened output plug. The parameter BOOLEAN enableTakeOver allows the local device to take over the broadcast channel, if any other device is currently broadcasting. A return value parameter STATUS returns a status value of success, specifying that the operation was successful, failed, specifying that the operation was not successful, invalid_plug handle, specifying that the plug handle is not valid, and invalid_channel, specifying that the specified channel can not be used.

After the broadcast has been started at the step 410, the data within the next buffer attached to the plug is transmitted at the step 412, and the registered callback is called. The buffer is then detached from the plug at the step 414, by calling the function DetachBufferFromPlug, as defined in Table XXI below.

TABLE XXI

| STATUS | DetachBufferFromPlug ( |
| | in PLUG_HANDLE plugHandle, |
| | in PPLUG_BUFFER pplugBuffer ) |

Within the function DetachBufferFromPlug, the parameter PLUG_HANDLE plugHandle provides the handle to the opened plug. The parameter PPLUG_BUFFER pPlugBuffers represents a list of buffers to be detached from the plug. The parameter PPLUG_BUFFER pPlugBuffers has a data structure, as defined in Table XVII and discussed above. A return value parameter STATUS returns a status value of success, specifying that the buffers have been detached successfully, failed, specifying that the buffers could not be detached, invalid_plug_handle, specifying that the plug handle was not valid, and invalid_parameter, specifying that the parameter is not valid.

After the buffer is detached from the plug, at the step 414, it is then determined at the step 416, if the transmission has been terminated. It should be apparent to those skilled in the art that the transmission can be terminated anytime during the broadcast transmission process including in the middle of the transmission of a buffer. If the transmission has not been terminated, then the next buffer is filled, at the step 418, and attached to the plug, at the step 420, as described above. Once the buffer is filled and attached to the plug, the data within the buffer is then sent out, at the step 412. Otherwise, if the transmission has been terminated, then the process ends at the step 422.

Figure 13:
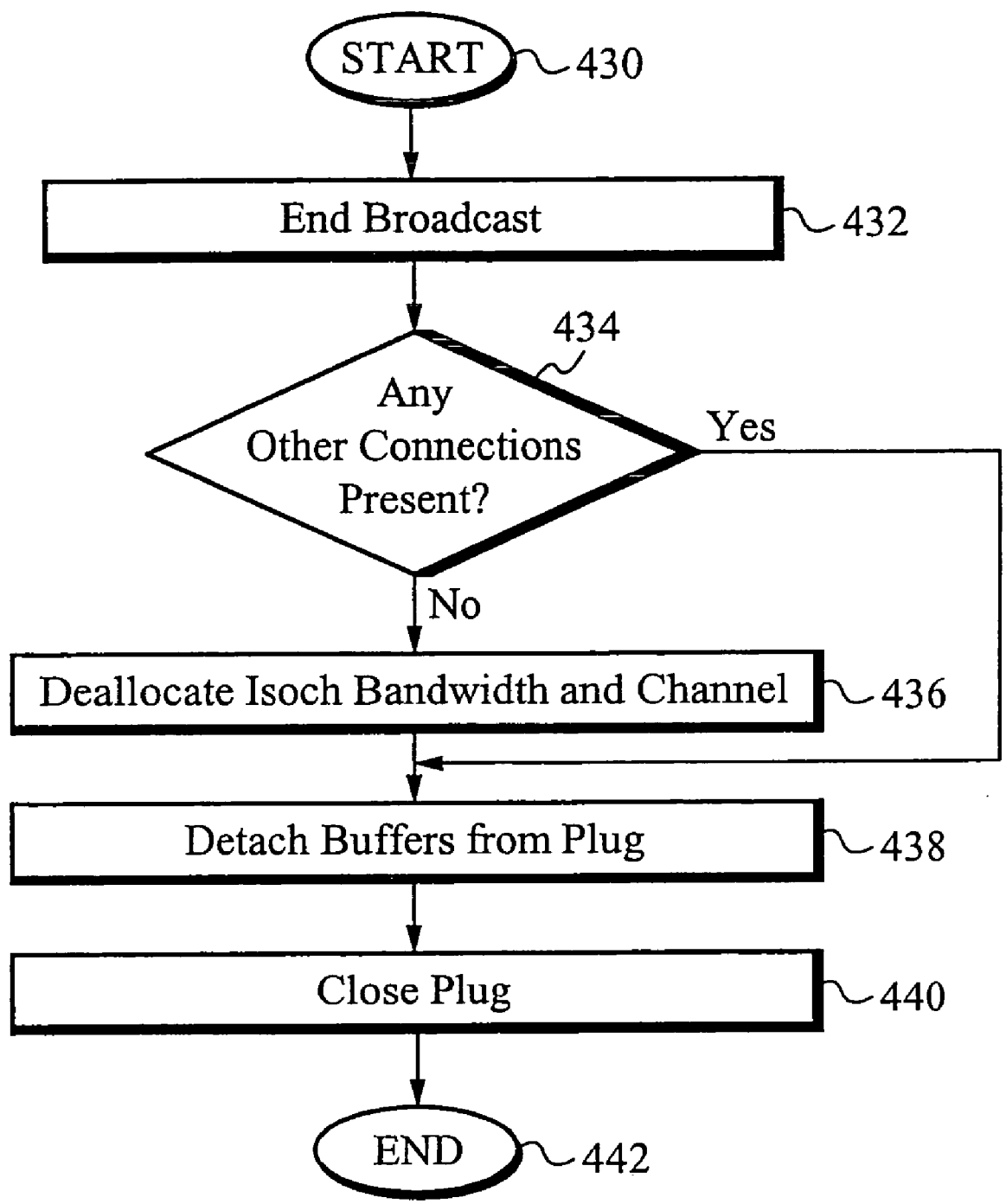
FIG. 13 illustrates a flowchart showing the process followed by the isochronous API in response to an end broadcast transmission request from an application.

Utilizing the isochronous API of the present invention, an application ends a broadcast transmission on an output plug, by transmitting a request to the isochronous API to end the broadcast transmission. The isochronous API then ends the broadcast, deallocates the appropriate resources, if no other connections are present, detaches buffers from the plug and closes the plug. A flowchart illustrating the process followed by the isochronous API in response to an end broadcast transmission request from an application is illustrated in FIG. 13. This end broadcast transmission process starts at the step 430. At the step 432, the broadcast is then ended by calling the function BroadcastTransmitOff, as defined in Table XXII below, which decrements the broadcast connection counter (BCC) on the output plug control register (oPCR), determines if any other connections are present at the step 434, and if no other connections are present, then deallocates the isochronous bandwidth and channel associated with the plug, at the step 436.

TABLE XXII

| STATUS | BroadcastTransmitOff ( | in PLUG_HANDLE *plugHandle ) |
|---|---|---|

Within the function BroadcastTransmitOff, the parameter PLUG_HANDLE *plugHandle provides a handle to the opened output plug. A return value parameter STATUS returns a status value of success, specifying that the operation was successful in ending the broadcast transmission, failed, specifying that the operation was not successful in ending the broadcast transmission, and invalid_plug_handle, specifying that the plug handle is not valid.

After it is determined that there are other connections present, at the step 434, or after the appropriate isochronous bandwidth and channel are deallocated, at the step 436, then, the buffers are detached from the plug, at the step 438, by calling the function DetachBufferFromPlug, as defined in Table XXI and discussed above. The plug is then closed at the step 440, by calling the function CloseIsochOutputPlug, as defined in Table XXIII below.

TABLE XXIII

| STATUS | CloseIsochOutputPlug ( in PLUG_HANDLE handle ) |
|---|---|

The function CloseIsochOutputPlug is used to close a plug. If no connections for the plug exist, then the DMA channel resource for the plug is deallocated and the plug is set to offline. Within the function CloseIsochOutputPlug, the parameter PLUG_HANDLE handle provides the handle of an opened plug. A return value parameter STATUS returns a status value of success, specifying that the plug was closed successfully, failed, specifying that the plug was not closed successfully, and invalid_plug_handle, specifying that the plug handle is not valid. After the broadcast transmission is turned off and the plug is closed, the process then ends at the step 442.

Figure 14:
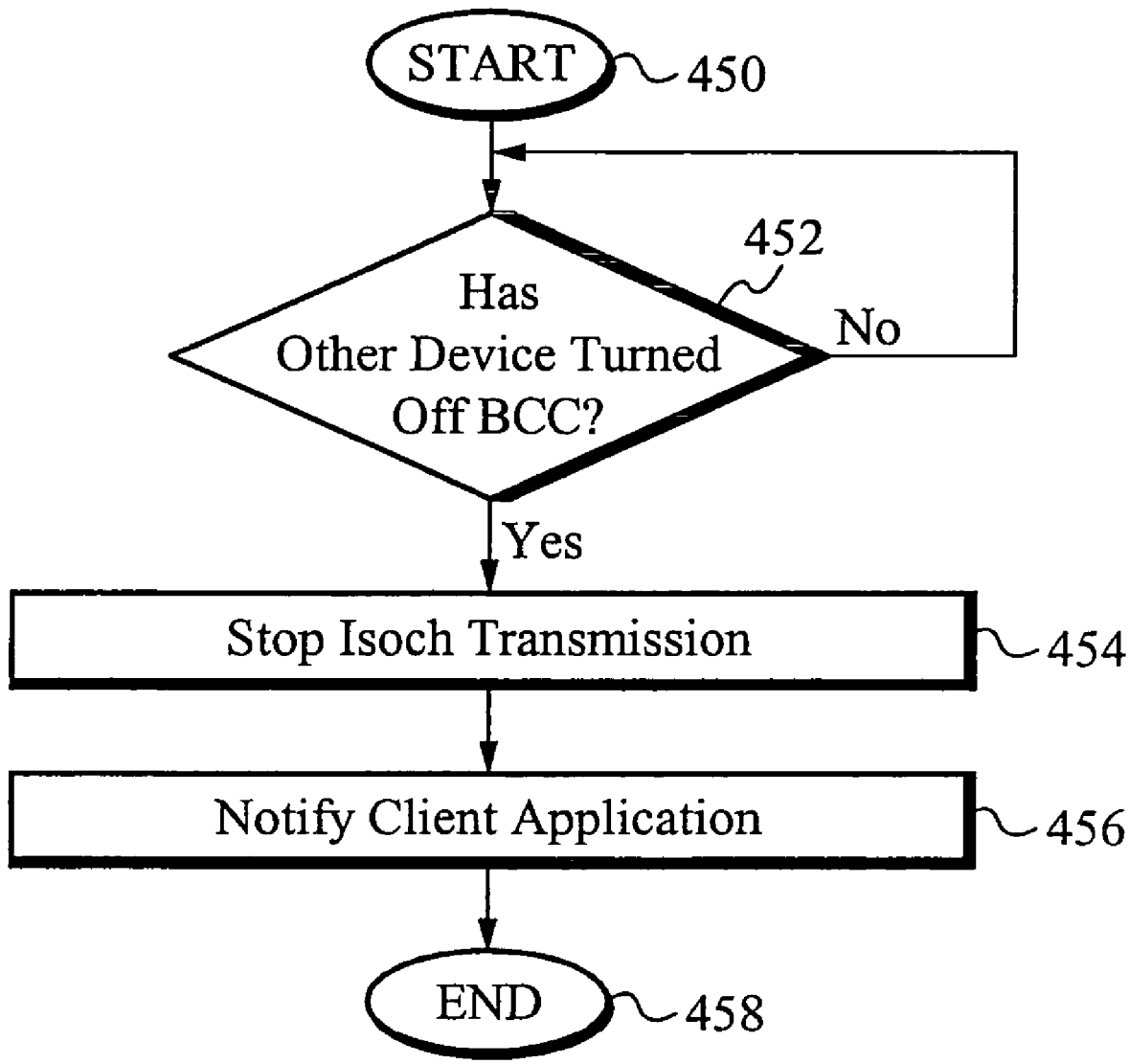
FIG. 14 illustrates a flowchart showing the process followed by the isochronous API when an ongoing broadcast transmission is interrupted by another device.

When an ongoing broadcast transmission through a plug being represented by the isochronous API of the present invention is interrupted by another device, the isochronous API of the present invention stops the isochronous broadcast transmission and notifies the appropriate client application. A flowchart illustrating the process followed by the isochronous API when an ongoing broadcast transmission is interrupted by another device is illustrated in FIG. 14. This interrupted broadcast transmission process starts at the step 450. At the step 452, it is determined if another device has turned off the broadcast connection counter (BCC) of the local device's output plug control register (oPCR) to interrupt an ongoing broadcast transmission. A device turns off the broadcast connection counter (BCC) of the local device's output plug control register (oPCR) to interrupt an ongoing broadcast transmission by decrementing the broadcast connection counter (BCC) from one to zero. When another device turns off the broadcast connection counter (BCC), then the isochronous API stops the isochronous transmission, at the step 454, if all of the flags within the output plug control register (oPCR) are reset. At the step 456, the isochronous API then notifies the client application associated with the broadcast transmission on the output plug, that the broadcast transmission has been interrupted by another device. The process then ends at the step 458. When receiving this notification, the client application can wait for an event freeing the broadcast channel and restart the broadcast transmission or just abort the broadcast transmission.

Utilizing the isochronous API of the present invention, an application can request that a broadcast transmission is started and if appropriate, that the broadcast transmission deprive another device's transmission. In response to this type of request, the isochronous API of the present invention then connects an output plug, allocates the appropriate resources, including interrupting an existing broadcast transmission on the channel by another device and manages the resources during the isochronous transmission. This process is the same as the process followed by the API in response to a broadcast transmission request from an application illustrated in FIG. 12 and discussed above, with the exception that when the function BroadcastTransmitOn is allocating the isochronous channel, it may have to interrupt an ongoing broadcast transmission to obtain the channel. If it is determined during the allocation of resources at the step 408 (FIG. 12) that the requested channel is being used for an ongoing broadcast transmission, the isochronous API then determines the broadcast channel base in order to determine the current transmission node for the channel. The isochronous API then reads the output plug control register (oPCR) of the transmission node. If the broadcast connection counter (BCC) is set and the point-to-point connection counter (PCC) is equal to zero, then the isochronous API resets the broadcast connection counter (BCC) of the transmission node to a value of zero, to interrupt the transmission. The broadcast connection counter (BCC) within the output plug control register (oPCR) of the local device is then set and the requested isochronous broadcast transmission is started, at the step 410.

Point-To-Point Transmission

Utilizing the isochronous API of the present invention, an application begins a point-to-point transmission on an output plug, by transmitting a request to the isochronous API to begin a point-to-point transmission. The isochronous API then connects an output plug, allocates the appropriate resources and manages the resources during the isochronous transmission to the input plug of the receiving device. If an exception condition occurs during a point-to-point transmission, then the isochronous API notifies the client application of the exception condition and allows the client application to handle the situation that caused the exception condition. The exception handling process is illustrated in FIG. 21, and discussed above.

Figure 15:
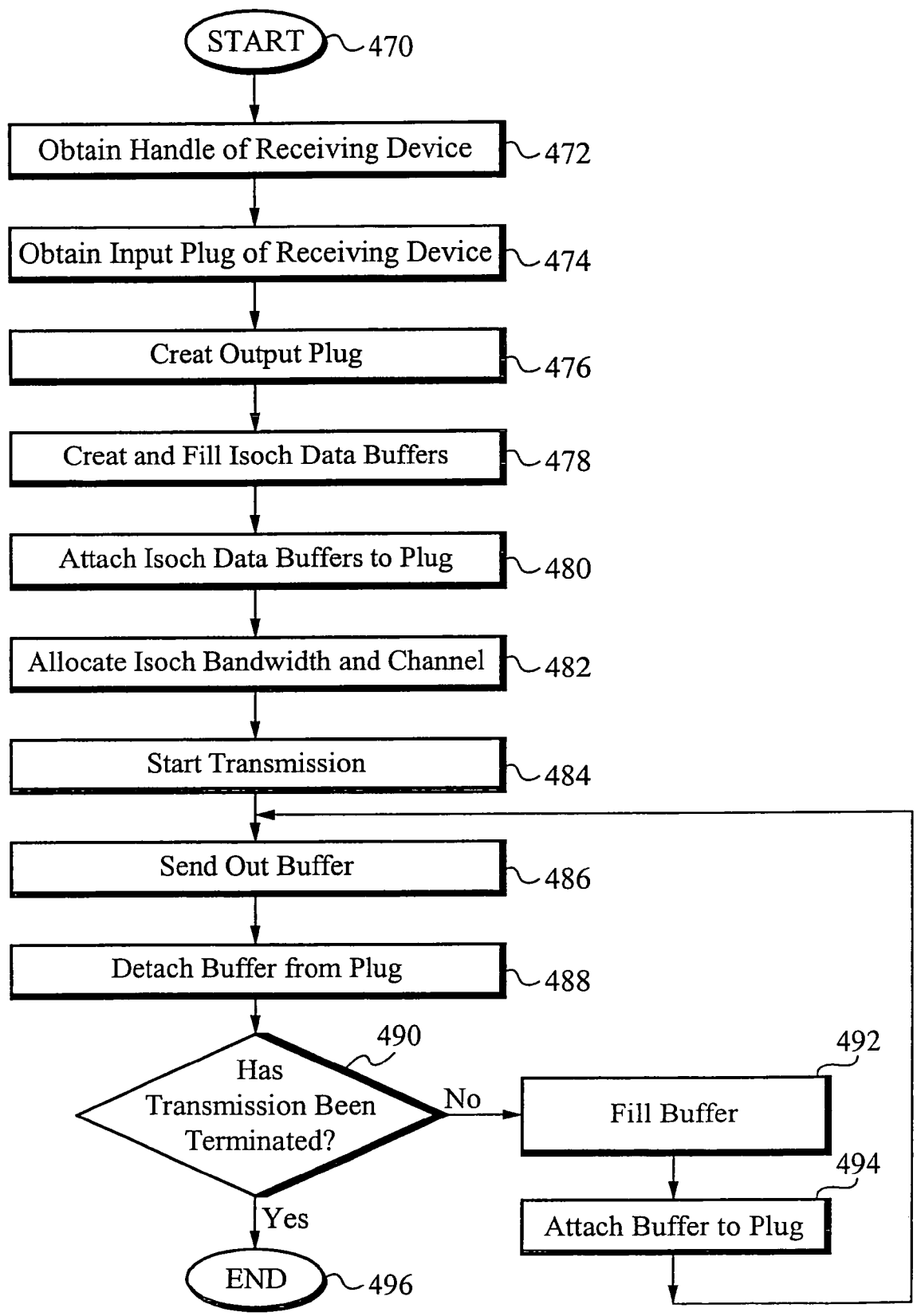
FIG. 15 illustrates a flowchart showing the process followed by the isochronous API in response to a point-to-point transmission request from an application.

A flowchart illustrating the process followed by the isochronous API in response to a point-to-point transmission request from an application is illustrated in FIG. 15. This point-to-point transmission process starts at the step 470. At the step 472, the handle of the receiving device is obtained by the isochronous API. Using the device handle, the isochronous API then obtains the input plug of the receiving device, at the step 474, using the function GetPlugNumber, as defined in Table XXIV below.

TABLE XXIV

| int | GetPlugNumber ( | in | DEV_61883_HANDLE devHandle, |
|---|---|---|---|
|  |  | in | PLUG_TYPE plugType ) |

The function GetPlugNumber returns an available plug number for the specified plug type on a given device. Within the function GetPlugNumber, the parameter DEV_61883_HANDLE devHandle specifies a handle to a particular IEC-61883 device. If the handle specifies the local device, then this parameter is set to a null value. The parameter PLUG_TYPE plugType specifies the plug type and has a format as defined in Table XXV below.

TABLE XXV

```
enum   PLUG_TYPE {
       ISOCH_INPUT_MASTER_PLUG,
       ISOCH_INPUT_CONTROL_PLUG,
       ISOCH_OUTPUT_MASTER_PLUG,
       ISOCH_OUTPUT_CONTROL_PLUG,
       ASYNC_CONN_INPUT_PLUG,
       ASYNC_CONN_OUTPUT_PLUG,
}
```

A return value returns an available plug number for the given device. No plug numbers are available if the returned plug number is equal to the value NO_PLUG_NUMBER_AVAILABLE.

At the step 476, the output plug is created by calling the function OpenIsochOutputPlug, as defined in Table XIII and discussed above. After the output plug is created at the step 476, initial isochronous data buffers are then created and filled, at the step 478. After the buffers are created and filled, the isochronous data buffers are then attached to the plug, at the step 480, by calling the function AttachBufferToPlug, as defined in Table XVI and discussed above.

After the isochronous data buffers are attached to the plug, at the step 480, the transmission is then started by calling the function PtoPTransmitOn, as defined in Table XXVI below, which allocates the appropriate isochronous bandwidth and channel, if necessary, at the step 482, and starts the transmission, at the step 484, by incrementing the point-to-point connection counter (PCC) of the output plug control register (oPCR) and informing the DMA to begin the isochronous transmission.

TABLE XXVI

| STATUS | PtoPTransmitOn ( | in | PLUG_HANDLE *plugHandle, |
|---|---|---|---|
| | | in | DEV_61883_HANDLE devHandle, |
| | | in | BYTE plugNumber ) |

The function PtoPTransmitOn allocates the isochronous bandwidth and channel, if no broadcast or point-to-point connections on the plug are present and then starts transmitting isochronous data to a designated device on a designated plug. Within the functionPtoPTransmitOn, the parameter PLUG_HANDLE *plugHandle provides a handle to the opened output plug. The parameter DEV_61883_HANDLE devHandle provides a handle to the IEC-61883 receiving device to which the local device is connecting. The parameter BYTE plugNumber provides the plug number of the input plug of the receiving device. A return value parameter STATUS returns a status value of success, specifying that the operation was successful, failed, specifying that the operation was not successful, invalid_plug_handle, specifying that the plug handle is not valid, invalid_device_handle, specifying that the device handle is not valid, and invalid_plug_number, specifying that the plug number is not valid.

After the transmission has been started at the step 484, the data within the next buffer attached to the plug is transmitted at the step 486, and the registered callback is called. The buffer is then detached from the plug at the step 488, by calling the function DetachBufferFromPlug, as defined in Table XXI and discussed above. After the buffer is detached from the plug, at the step 488, it is then determined at the step 490, if the transmission has been terminated. If the transmission has not been terminated, then the next buffer is filled, at the step 492, and attached to the plug, at the step 494, as described above. Once the buffer is filled and attached to the plug, the data within the buffer is then sent out, at the step 486. Otherwise, if the transmission has been terminated, then the process ends at the step 496. As described herein, the isochronous API of the present invention utilizes a buffer management scheme to attach and detach buffers during the transmission and reception of data. Alternatively as should be apparent to those skilled in the art, any other appropriate buffer management scheme can be used to transmit and receive data, including a circular buffer scheme.

Figure 16:
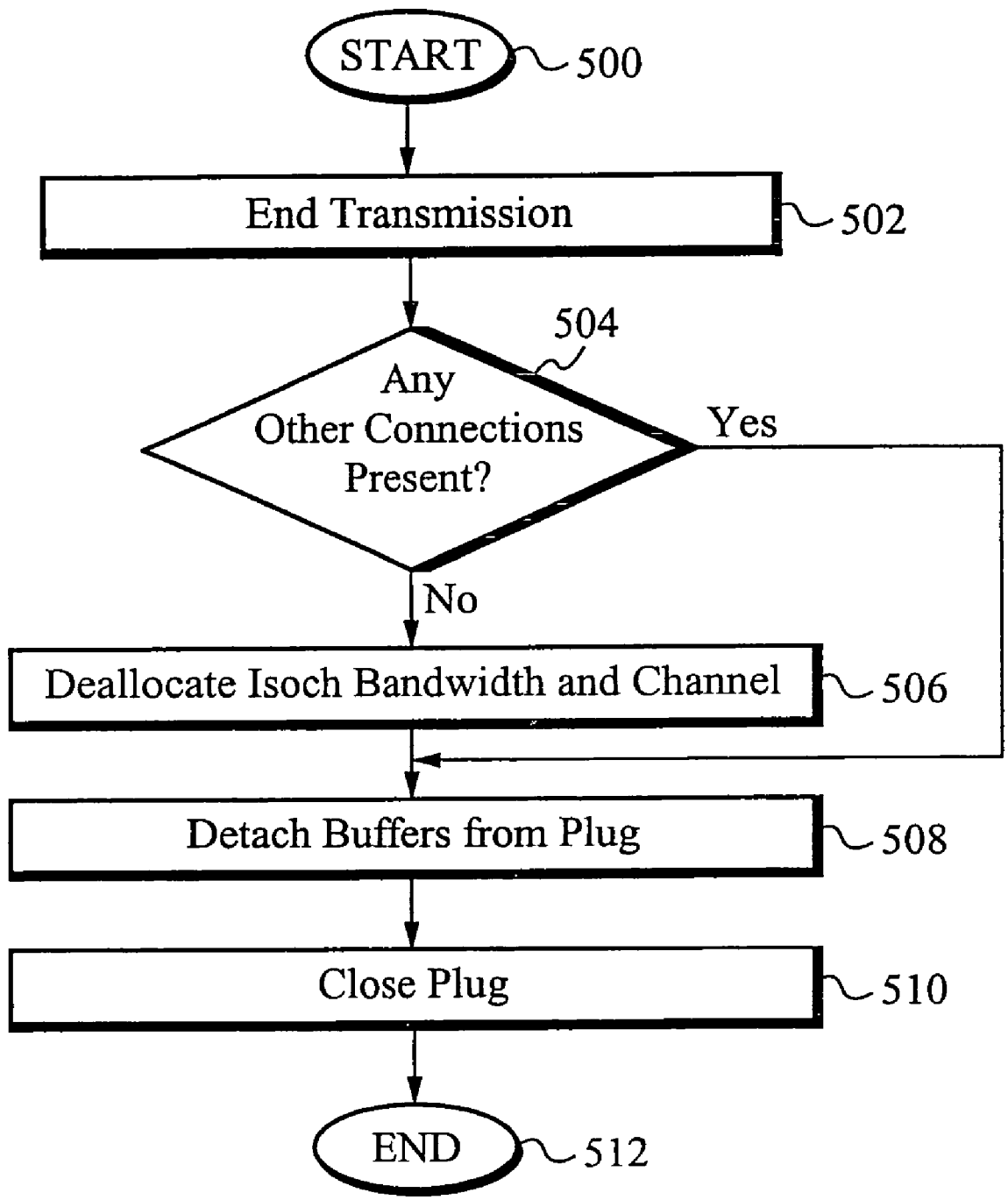
FIG. 16 illustrates a flowchart showing the process followed by the isochronous API in response to an end point-to-point transmission request from an application.

Utilizing the isochronous API of the present invention, an application ends a point-to-point transmission on an output plug, by transmitting a request to the isochronous API to end the point-to-point transmission. The isochronous API then ends the point-to-point transmission, deallocates the appropriate resources, if no other connections are present, detaches buffers from the plug and closes the plug. A flowchart illustrating the process followed by the isochronous API in response to an end point-to-point transmission request from an application is illustrated in FIG. 16. This end point-to-point transmission process starts at the step 500. At the step 502, the transmission is ended by calling the function PtoPTransmitOff, as defined in Table XXVII below, which decrements the point-to-point connection counter (PCC) on the output plug control register (oPCR), determines if any other connections are present at the step 504, and if no other connections are present, then deallocates the isochronous bandwidth and channel associated with the plug, at the step 506.

TABLE XXVII

| STATUS | PtoPTransmitOff ( | in | PLUG_HANDLE *plugHandle, |
|---|---|---|---|
| | | in | DEV_61883_HANDLE devHandle, |
| | | in | BYTE plugNumberToDisconnect ) |

The function PtoPTransmitOff ends an ongoing transmission of isochronous data to a designated device on a designated plug, and deallocates the isochronous bandwidth and channel, if no other broadcast or point-to-point connections on the plug are present. Within the function PtoPTransmitOff, the parameter PLUG_HANDLE *plughandle provides a handle to the opened output plug. The parameter DEV_61883_HANDLE devHandle provides a handle to the IEC-61883 receiving device from which the local device wants to disconnect from. The parameter BYTE plugNumberToDisconnect provides the plug number of the input plug of the receiving device to be disconnected. A return value parameter STATUS returns a status value of success, specifying that the operation was successful, failed, specifying that the operation was not successful, invalid_plug_handle, specifying that the plug handle is not valid, invalid_device_handle, specifying that the device handle is not valid, and invalid_plug_number, specifying that the plug number is not valid.

After it is determined that there are other connections present, at the step 504, or after the appropriate isochronous bandwidth and channel are deallocated, at the step 506, then, the buffers are detached from the plug, at the step 508, by calling the function DetachBufferFromPlug, as defined in Table XXI and discussed above. The plug is then closed at the step 510, by calling the function CloseIsochOutputPlug, as defined in Table XXIII and discussed above. After the pointto-point transmission is turned off and the plug is closed, the process then ends at the step 512.

Broadcast Reception

Figure 17:
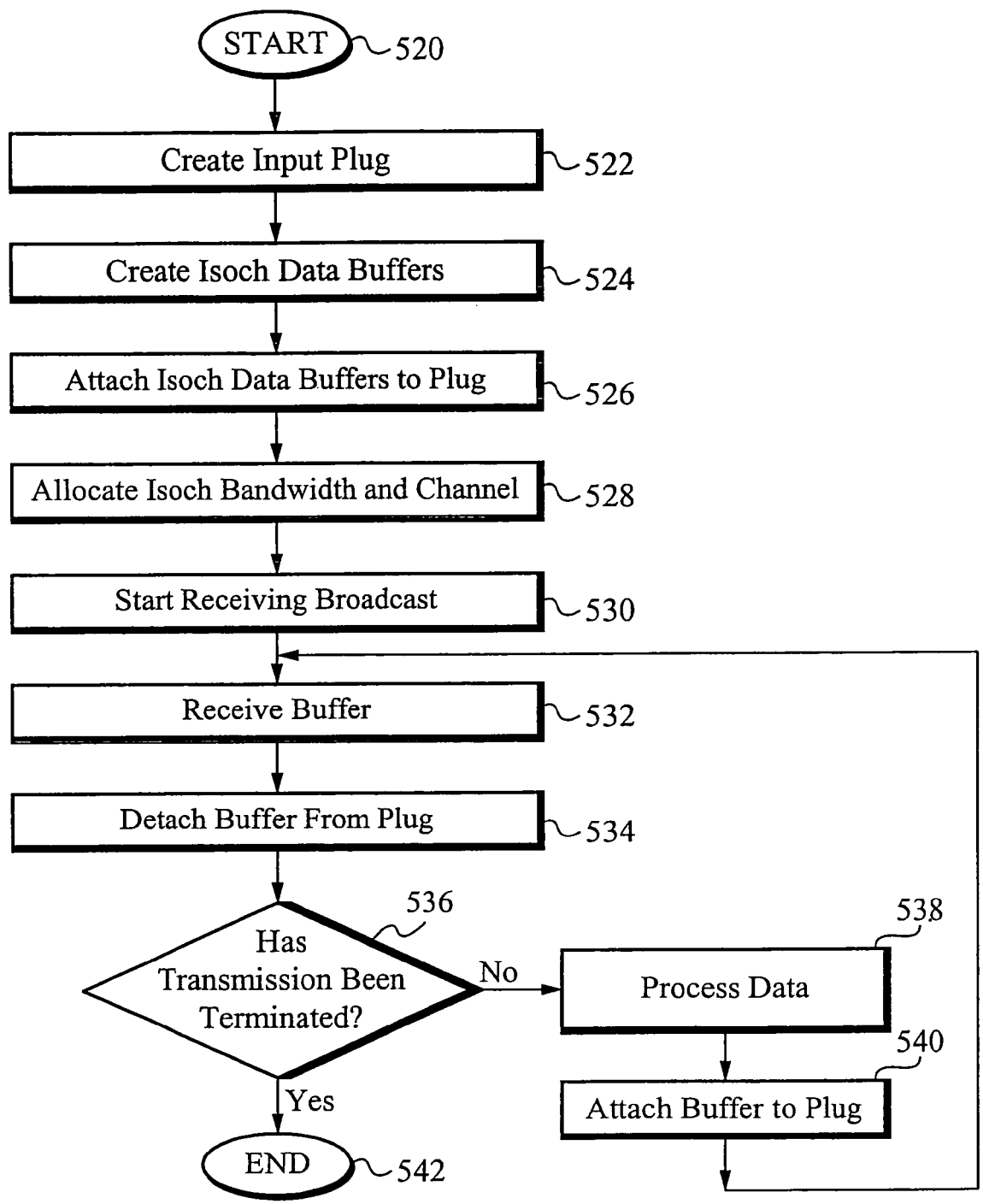
FIG. 17 illustrates a flowchart showing the process followed by the isochronous API in response to a broadcast reception request from an application.

Utilizing the isochronous API of the present invention, an application begins a broadcast reception on an input plug, by transmitting a request to the isochronous API to begin the broadcast reception. The isochronous API then connects an input plug, allocates the appropriate resources and manages the resources during the isochronous reception. A flowchart illustrating the process followed by the isochronous API in response to a broadcast reception request from an application is illustrated in FIG. 17. This broadcast reception process starts at the step 520. At the step 522, the input plug is created by calling the function OpenIsochInputPlug, as defined in Table XXVIII below.

TABLE XXVIII

| STATUS OpenIsochInputPlug ( | in | BYTE plugNumber, |
|---|---|---|
| | in | BYTE channel, |
| | in | BYTE dataFormat, |
| | in | EVENT plugEvent, |
| | out | PLUG_HANDLE *plugHandle ) |

The function OpenIsochInputPlug opens an input plug, turning the input plug on and allocating a DMA channel for the input plug. Within the function OpenIsochInputPlug used to create an input plug, the parameter, BYTE plugNumber provides the plug number of the local device. The parameter BYTE channel specifies a channel number to be used for the broadcast reception. If the parameter Byte channel is set to the value USE_ANY_CHANNEL, then any free channel can be used for the broadcast reception. For listening on the broadcast channel, the parameter BYTE channel is set to the value USE_BROADCAST_CHANNEL. The parameter BYTE dataFormat represents the data format of the plug data and preferably supports raw data formats, DV data formats, MPEG data formats and audio data formats. For raw data returned in a buffer, the isochronous API is not required to do any work on the data. For DV and MPEG data, the isochronous API is required to perform some work to put the data in the appropriate format, because of header and other extension requirements. When DV and MPEG data is being output, the isochronous API of the present invention adds header and appropriate extension information to the data. When DV and MPEG data is being received as input data, the isochronous API of the present invention strips header and any other non-needed extension information from the data. The parameter EVENT plugEvent provides a handle to the plug event which signals any external driven changes that occur on the specified input plug. This event handle is monitored by the appropriate client application. The parameter PLUG_HANDLE *plugHandle provides a handle to the opened plug, which is used for other plug actions and to close the input plug. A return value parameter STATUS returns a status value of success, specifying that the plug has been opened successfully, failed, specifying that the plug could not be opened, and invalid_plug_handle, specifying that the plug handle is not valid.

After the input plug is created at the step 522, initial isochronous data buffers are then created, at the step 524. After the buffers are created, the isochronous data buffers are then attached to the plug, at the step 526, by calling the function AttachBufferToPlug, as defined in Table XVI and discussed above.

After the isochronous data buffers are attached to the plug, at the step 526, the broadcast reception is then started by calling the function BroadcastReceiveOn, as defined in Table XXIX below, which allocates the appropriate isochronous bandwidth and channel, if necessary, at the step 528, and starts the broadcast reception, at the step 530, by incrementing the broadcast connection counter (BCC) of the input plug control register (iPCR) and informing the DMA to begin the isochronous transmission.

TABLE XXIX

| STATUS | BroadcastReceiveOn ( in PLUG_HANDLE *plugHandle ) |
|---|---|

The function BroadcastReceiveOn is used to start receiving isochronous data on the designated broadcast channel. Within the function BroadcastReceiveOn, the parameter PLUG_HANDLE *plugHandle provides a handle to the opened input plug. A return value parameter STATUS returns a status value of success, specifying that the operation was successful, failed, specifying that the operation was not successful, and invalid_plug_handle, specifying that the plug handle is not valid.

After the broadcast reception has been started at the step 530, the received data is stored within the next buffer attached to the plug at the step 532. Once the buffer is full of received data, then the registered callback is called. The buffer is then detached from the plug at the step 534, by calling the function DetachBufferFromPlug, as defined in Table XXI and discussed above.

After the buffer is detached from the plug, at the step 534, it is then determined at the step 536, if the transmission has been terminated. If the transmission has not been terminated, then the data within the filled buffer is processed, at the step 538, and the empty buffer is then attached to the plug, at the step 540, as described above. Once the buffer is emptied and attached to the input plug, the buffer is then again used to receive data, at the step 532. Otherwise, if the transmission has been terminated, then the process ends at the step 542.

Figure 18:
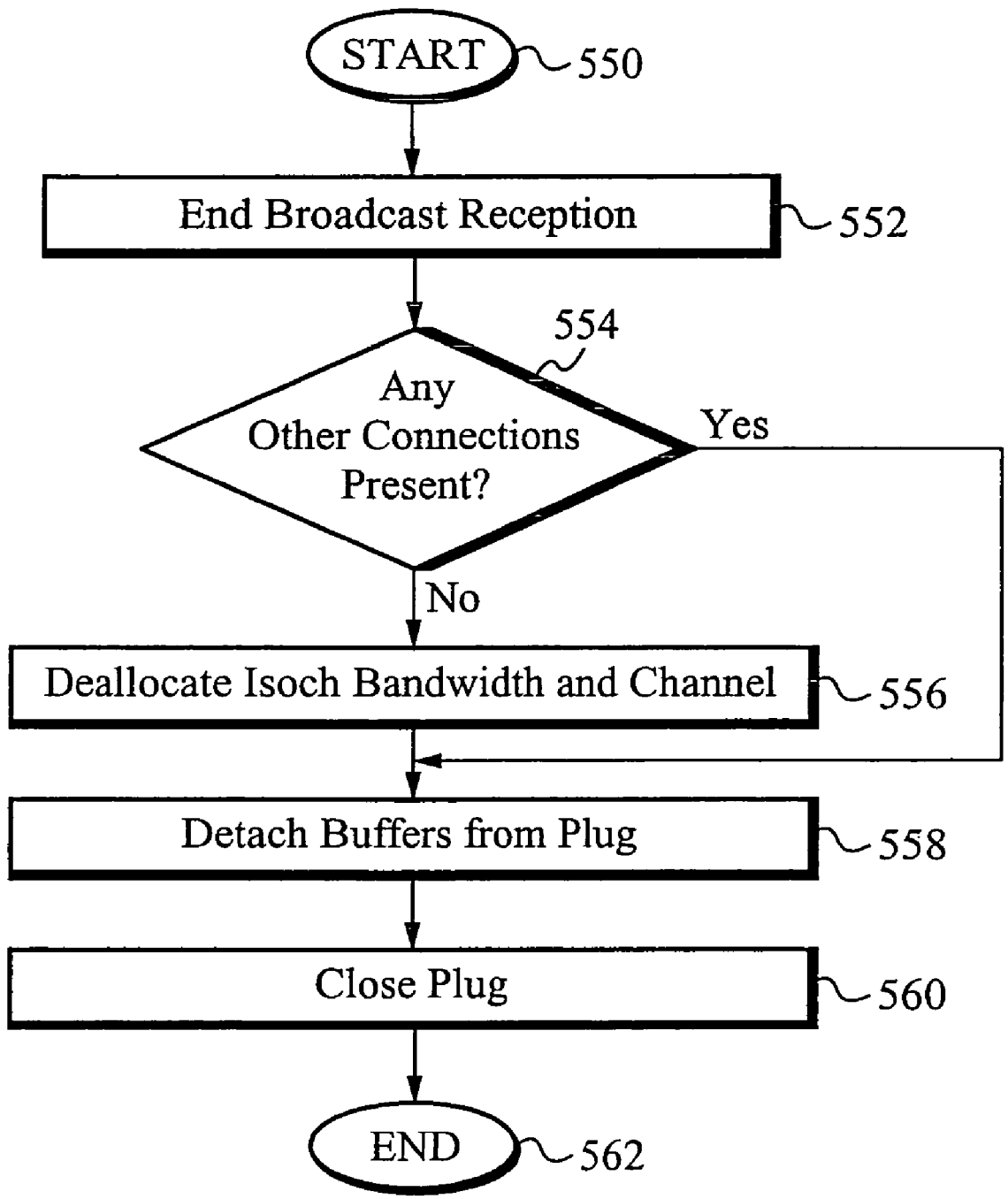
FIG. 18 illustrates a flowchart showing the process followed by the isochronous API in response to an end broadcast reception request from an application.

Utilizing the isochronous API of the present invention, an application ends a broadcast reception on an input plug, by transmitting a request to the isochronous API to end the broadcast reception. The isochronous API then ends the broadcast reception, deallocates the appropriate resources, if no other connections are present, detaches buffers from the plug and closes the plug. A flowchart illustrating the process followed by the isochronous API in response to an end broadcast reception request from an application is illustrated in FIG. 18. This end broadcast reception process starts at the step 550. At the step 552, the broadcast reception is then ended by calling the function BroadcastReceiveOff, as defined in Table XXX below, which decrements the broadcast connection counter (BCC) on the input plug control register (iPCR), determines if any other connections are present at the step 554, and if no other connections are present, then deallocates the isochronous bandwidth and channel associated with the plug, at the step 556.

TABLE XXX

| STATUS | BroadcastReceiveOff ( in PLUG_HANDLE *plugHandle ) |
|---|---|

The function BroadcastReceiveOff stops the broadcast reception of isochronous data on a designated broadcast channel. Within the function BroadcastReceiveOff, the parameter PLUG_HANDLE *plugHandle provides a handle to the opened input plug. A return value parameter STATUS returns a status value of success, specifying that the operation was successful in ending the broadcast reception, failed, specifying that the operation was not successful in ending the broadcast reception, and invalid_plug_handle, specifying that the plug handle is not valid.

After it is determined that there are other connections present, at the step 554, or after the appropriate isochronous bandwidth and channel are deallocated, at the step 556, then, the buffers are detached from the plug, at the step 558, by calling the function DetachBufferFromPlug, defined in Table XIX and discussed above. The plug is then closed at the step 560, by calling the function CloseIsochInputPlug, as defined in Table XI below.

TABLE XXXI

| STATUS | CloseIsochInputPlug ( in PLUG_HANDLE *plugHandle ) |
|---|---|

The function CloseIsochInputPlug is used to close an input plug. If no other connections for the input plug exist, then the DMA channel resource for the plug is deallocated and the plug is set to offline. Within the function CloseIsochInputPlug, the parameter PLUG_HANDLE *plugHandle specifies the handle of an opened input plug. A return value parameter STATUS returns a status value of success, specifying that the plug was closed successfully, failed, specifying that the plug was not closed successfully, and invalid_plug_handle, specifying that the plug handle is not valid. After the broadcast reception is turned off and the input plug is closed, the process then ends at the step 562.

Point-To-Point Reception

Figure 19:
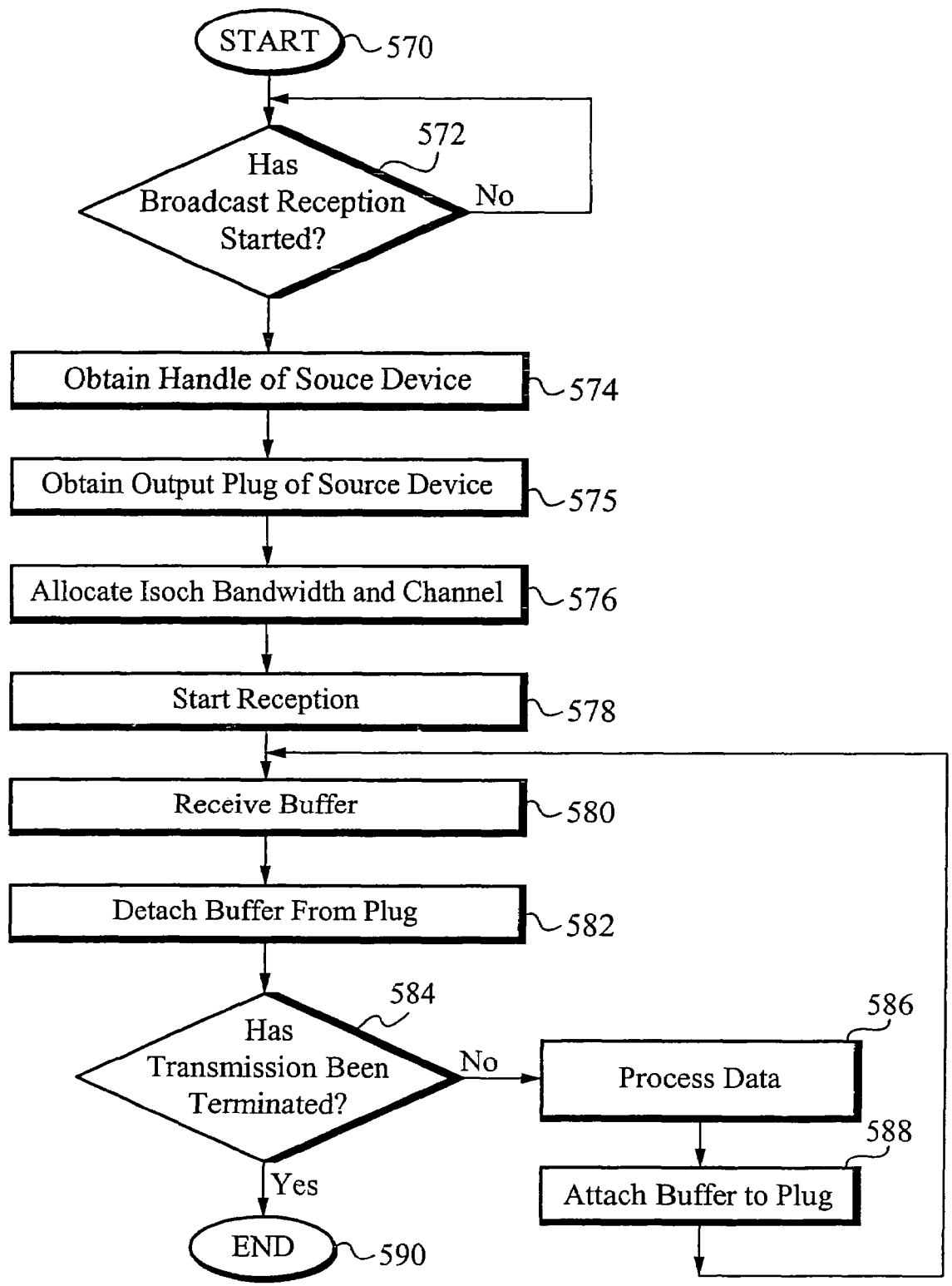
FIG. 19 illustrates a flowchart showing the process followed by the isochronous API in response to a point-to-point reception overlay request from an application.

A point-to-point reception is started as discussed above, to receive a point-to-point transmission. A client application can also request that a point-to-point reception be overlayed on a current broadcast reception by transmitting a point-to-point reception overlay request to the isochronous API of the present invention. The isochronous API then determines that the broadcast reception has been started, obtains the handle of the source device, allocates the appropriate resources and manages the resources during the reception from the output plug of the source device. A flowchart illustrating the process followed by the isochronous API in response to a point-to-point reception overlay request from an application is illustrated in FIG. 19. This point-to-point reception overlay process starts at the step 570. At the step 572, it is determined if the broadcast reception has started. Once the broadcast reception starts, then the handle of the source device is obtained by the isochronous API, at the step 574. Using the device handle, the isochronous API then obtains the output plug of the source device, at the step 575, using the function GetPlugNumber, as defined in Table XXIV and discussed above.

Because this is an existing reception, the input plug and data buffers are already initialized. After the isochronous data buffers are attached to the plug, the point-to-point reception is then started by calling the function PtoPReceiveOn, as defined in Table XXXII below, which allocates the appropriate isochronous bandwidth and channel, if necessary, at the step 576, and starts the reception, at the step 578, by incrementing the point-to-point connection counter (PCC) of the input plug control register (iPCR) and informing the DMA to begin the isochronous reception.

TABLE XXXII

| STATUS | PtoPReceiveOn ( | in | PLUG_HANDLE *plugHandle, |
|---|---|---|---|
| | | in | DEV_61883_HANDLE devHandle, |
| | | in | BYTE plugNumber ) |

The function PtoPReceiveOn starts receiving isochronous data from a designated device on a designated plug, and allocates the isochronous bandwidth and channel, if no broadcast or point-to-point connections on the plug are present. Within the function PtoPReceiveOn, the parameter PLUG_HANDLE *plugHandle provides a handle to the opened input plug. The parameter DEV_61883_HANDLE devHandle provides a handle to the IEC-61883 receiving device to which the local device is connecting. The parameter BYTE plugNumber provides the plug number of the output plug of the source device. A return value parameter STATUS returns a status value of success, specifying that the operation was successful, failed, specifying that the operation was not successful, invalid_plug_handle specifying that the plug handle is not valid, invalid_device_handle, specifying that the device handle is not valid, and invalid_plug number, specifying that the plug number is not valid.

After the reception has been started at the step 578, the received data is stored within the next buffer attached to the plug at the step 580. Once the buffer is full of received data, then the registered callback is called. The buffer is then detached from the plug at the step 582, by calling the function DetachBufferFromPlug, as defined in Table XXI and discussed above.

After the buffer is detached from the plug, at the step 582, it is then determined at the step 584, if the transmission has been terminated. If the transmission has not been terminated, then the data within the filled buffer is processed, at the step 586, and the empty buffer is then attached to the plug, at the step 588, as described above. Once the buffer is emptied and attached to the plug, the buffer is then again used to receive data, at the step 580. Otherwise, if the transmission has been terminated, then the process ends at the step 590.

Figure 20:
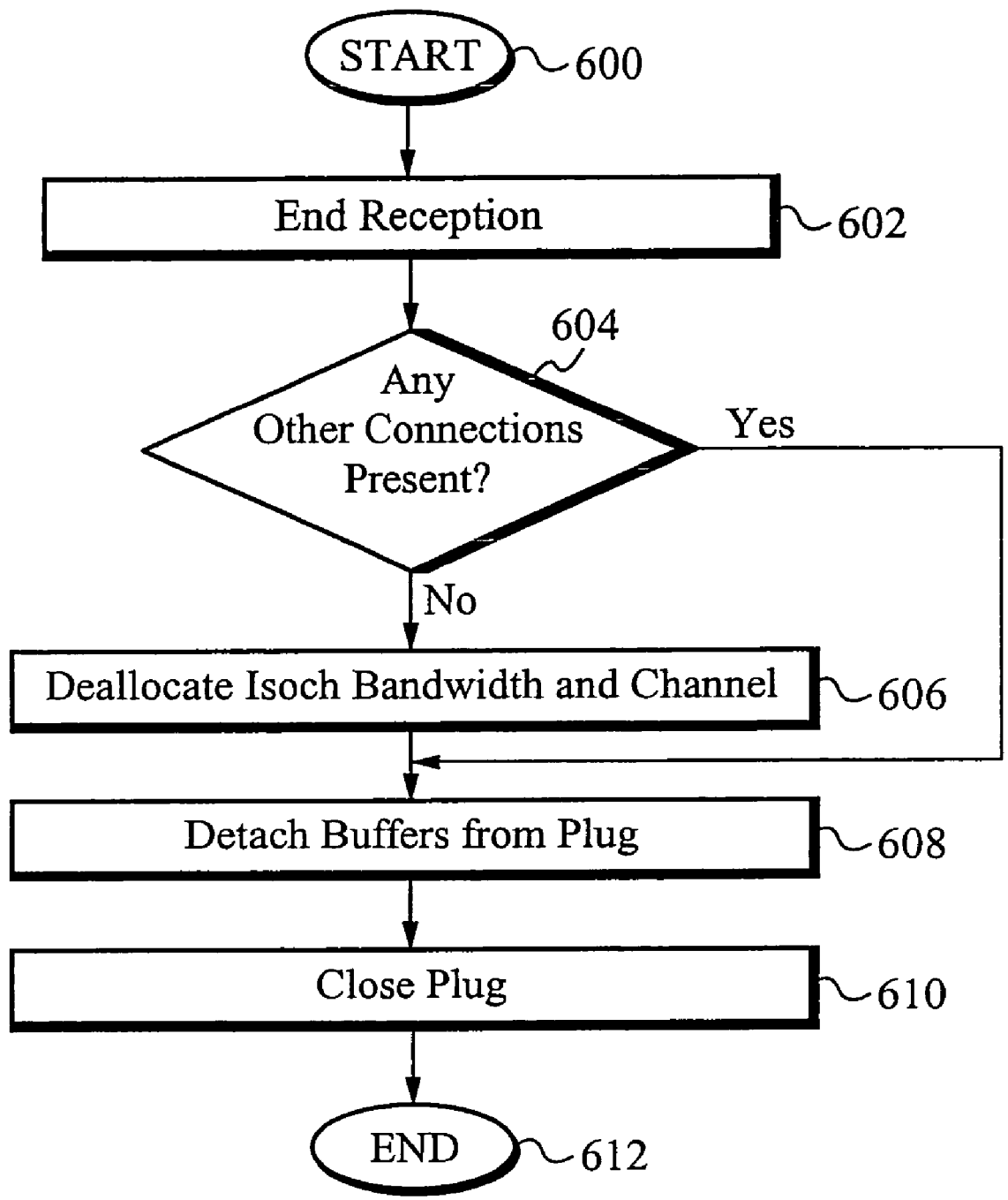
FIG. 20 illustrates a flowchart showing the process followed by the isochronous API in response to an end point-to-point reception request from an application.

Utilizing the isochronous API of the present invention, an application ends a point-to-point reception on an input plug, by transmitting a request to the isochronous API requesting to end the point-to-point reception. The isochronous API then ends the point-to-point reception, deallocates the appropriate resources, if no other connections are present, detaches buffers from the plug and closes the plug. A flowchart illustrating the process followed by the isochronous API in response to an end point-to-point reception request from an application is illustrated in FIG. 20. This end point-to-point reception process starts at the step 600. At the step 602, the reception is then ended by calling the function PtoPReceiveOff, as defined in Table XXXIII below, which decrements the point-to-point connection counter (PCC) on the input plug control register (iPCR) of the local device and the output plug control register (oPCR) of the source device, determines if any other connections are present at the step 604, and if no other connections are present, then deallocates the isochronous bandwidth and channel associated with the plug, at the step 606.

TABLE XXXIII

| STATUS | PtoPReceiveOff ( | in | PLUG_HANDLE *plugHandle , |
|---|---|---|---|
| | | in | DEV_61883_HANDLE devHandle, |
| | | in | BYTE plugNumberToDisconnect ) |

The function PtoPReceiveOff ends an ongoing reception of isochronous data from a designated device on a designated plug, and deallocates the isochronous bandwidth and channel, if no other broadcast or point-to-point connections on the plug are present. Within the function PtoPReceiveOff, the parameter PLUG_HANDLE *plugHandle provides a handle to the opened output plug. The parameter DEV_61883_HANDLE devHandle provides a handle to the IEC- 61883 source device from which the local device wants to disconnect from. The parameter BYTE plugNumberToDisconnect provides the plug number of the output plug of the source device to be disconnected. A return value parameter STATUS returns a status value of success, specifying that the operation was successful, failed, specifying that the operation was not successful, invalid_plug_handle, specifying that the plug handle is not valid, invalid_device_handle, specifying that the device handle is not valid, and invalid_plug_number, specifying that the plug number is not valid.

After it is determined that there are other connections present, at the step 604, or after isochronous bandwidth and channel are deallocated, at the step 606, then, the buffers are detached from the plug, at the step 608, by calling the function DetachBufferFromPlug, defined in Table XXI and discussed above. The plug is then closed at the step 610, by calling the function CloseIsochOutputPlug, defined in Table XXIII and discussed above. After the point-to-point reception is turned off and the plug is closed, the process then ends at the step 612.

The isochronous API of the preferred embodiment of the present invention implements and manages isochronous data transfer and receive operations between a client application and a bus structure. The isochronous API presents a virtual representation of a plug, using a plug handle, in which multiple client applications can register to a given plug. The isochronous API also notifies a client application of any state changes on a connected plug through the event handle, ensuring that the client application is informed about the state changes. The isochronous API also manages buffers utilized during a data operation on a connected plug by attaching and detaching the buffers to the connected plug, as appropriate, to manage the data flow.

The present invention has been described in terms of specific embodiments incorporating details to tacilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

We claim:

1. An interface between an application and a bus structure to manage data transfer operations between the application and the bus structure comprising:
   a. an applications interface to communicate with the application to receive requests from and send instructions to the application;
   b. a controller to control isochronous data transfer operations between the application and the bus structure including managing a linked list of buffer descriptors, each corresponding to and representing a buffer, wherein each of the buffer descriptors in the linked list include capability for a callback completion routine which is activated to call the application at a predetermined completion point during a data transfer operation; and
   c. a bus interface circuit to provide a physical interface to the bus structure to send and receive data packets over the bus structure.

2. The interface as claimed in claim 1 wherein the buffers are assigned by the application to the applications interface, and the linked list is generated and assigned by the application to the applications interface.

3. The interface as claimed in claim 1 wherein the linked list includes a forward pointer for each buffer within the linked list.

4. The interface as claimed in claim 3 wherein the linked list further includes a backward pointer for each buffer within the linked list thereby making the list circular.

5. An interface between an application and a bus structure to manage data transfer operations between the application and the bus structure comprising:
   a. an applications interface to communicate with the application to receive requests from and send instructions to the application;
   b. a controller to control isochronous data transfer operations between the application and the bus structure including managing a linked list of buffer descriptors, each corresponding to and representing a buffer, wherein each of the buffer descriptors included in the list include capability for a resynchronization event which is activated to resynchronize the application to reset one or more application parameters to a predetermined value during a data transfer operation; and
   c. a bus interface circuit to provide a physical interface to the bus structure to send and receive data packets over the bus structure.

6. The interface as claimed in claim 1 further comprising an automatic transaction generator for automatically generating transactions necessary to complete an asynchronous data transfer operation between a buffer assigned by the application and the bus structure.

7. The interface as claimed in claim 1 wherein the bus structure is an IEEE 1394 standard bus structure.

8. The interface as claimed in claim 1 wherein the linked list includes a forward pointer and a backward pointer for each buffer within the linked list thereby making the list linear.

9. An interface between an application and an IEEE 1394 standard bus structure to manage data transfer operations between the application and the bus structure comprising:
   a. an applications interface to communicate with the application to receive requests from and send instructions to the application;
   b. a controller to control isochronous data transfer operations between the application and the bus structure including a linked list of buffers provided by the application, wherein each of the buffers in the linked list include capability for a callback completion routine which is activated to call the application at a predetermined completion point during a data transfer operation; and
   c. a bus interface circuit to provide a physical interface to the bus structure to send and receive data packets over the bus structure.

10. The interface as claimed in claim 9 wherein the linked list includes a forward pointer and a backward pointer for each buffer within the linked list thereby making the list circular.

11. An interface between an application and an IEEE 1394 standard bus structure to manage data transfer operations between the application and the bus structure comprising:
   a. an applications interface to communicate with the application to receive requests from and send instructions to the application;

b. a controller to control isochronous data transfer operations between the application and the bus structure including a linked list of buffers provided by the application, wherein each of the buffers in the linked list include capability for a resynchronization event which is activated to resynchronize the application to reset one or more application parameters to a predetermined value during a data transfer operation; and c. a bus interface circuit to provide a physical interface to the bus structure to send and receive data packets over the bus structure.

12. The interface as claimed in claim 9 wherein the linked list includes a forward pointer and a backward pointer for each buffer within the linked list thereby making the list linear.

13. A buffer management method for handling data transmitted on an isochronous channel, the method comprising:

establishing a linked list of buffers for receiving isochronous data from a sender devices wherein each of the buffers included in the linked list include capability for a callback completion routine which is activated to call the application at a predetermined completion point during a data transfer operation;

receiving the isochronous data from the sender device;

loading the isochronous data into the linked list of buffers; and accessing the data in the linked list of buffers for output to a client device, wherein the data is transmitted between an application and a bus structure.

14. The buffer management method as claimed in claim 13 wherein during an isochronous send operation the application processes a buffer by loading data into the buffer.

15. The buffer management method as claimed in claim 13 wherein during an isochronous receive operation the application processes a buffer by obtaining data from the buffer.

16. A buffer management method for handling data transmitted on an isochronous channel, the method comprising:

establishing a linked list of buffers for receiving isochronous data from a sender device, wherein each of the buffers included in the linked list include capability for a resynchronization event which is activated to resynchronize the application to reset one or more application parameters to a predetermined value during a data transfer operation;

receiving the isochronous data from the sender device;

loading the isochronous data into the linked list of buffers; and accessing the data in the linked list of buffers for output to a client device, wherein the data is transmitted between an application and a bus structure.

17. A buffer management method for handling data transmitted on an isochronous channel, the method comprising:

establishing a linked list of buffers for receiving isochronous data from a sender device, each buffer comprising a forward pointer to the next buffer in the list and a backward pointer to the previous pointer in the list, wherein each of the buffers included in the linked list include capability for a callback completion routine which is activated to call the application at a predetermined completion point during a data transfer operation;

receiving the isochronous data from the sender device;

loading the isochronous data into the linked list of buffers; and accessing the data in the linked list of buffers for output to a client device, wherein the data is transmitted between an application and a bus structure.

18. The buffer management method as claimed in claim 17 wherein during an isochronous send operation the application processes a buffer by loading data into the buffer.

19. The buffer management method as claimed in claim 17 wherein during an isochronous receive operation the application processes a buffer by obtaining data from the buffer.

20. A buffer management method for handling data transmitted on an isochronous channel, the method comprising:

establishing a linked list of buffers for receiving isochronous data from a sender device, each buffer comprising a forward pointer to the next buffer in the list and a backward pointer to the previous pointer in the list, wherein each of the buffers included in the linked list include capability for a resynchronization event which is activated to resynchronize the application to reset one or more application parameters to a predetermined value during a data transfer operation;

receiving the isochronous data from the sender device;

loading the isochronous data into the linked list of buffers; and accessing the data in the linked list of buffers for output to a client device, wherein the data is transmitted between an application and a bus structure.

21. An interface between an application and a bus structure to manage data transfer operations between the application and the bus structure comprising:

a. an applications interface to communicate with the application to receive requests from and send instructions to the application;

b. a controller to control isochronous data transfer operations between the application and the bus structure including managing a linked list of buffer descriptors, each corresponding to and representing a buffer, wherein the linked list includes a forward pointer and a backward pointer for each buffer within the linked list and further wherein each of the buffer descriptors in the linked list include capability for a callback completion routine which is activated to call the application at a predetermined completion point during a data transfer operation; and c. a bus interface circuit to provide a physical interface to the bus structure to send and receive data packets over the bus structure.

22. An interface between an application and a bus structure to manage data transfer operations between the application and the bus structure comprising:

a. an applications interface to communicate with the application to receive requests from and send instructions to the application;

b. a controller to control isochronous data transfer operations between the application and the bus structure including managing a linked list of buffer descriptors, each corresponding to and representing a buffer, wherein the linked list includes a forward pointer and a backward pointer for each buffer within the linked list and further wherein each of the buffer descriptors in the linked list include capability for a resynchronization event which is activated to resynchronize the application to reset one or more application parameters to a predetermined value during a data transfer operation; and c. a bus interface circuit to provide a physical interface to the bus structure to send and receive data packets over the bus structure.

* * * * *

UNITED STATES PATENT AND TRADEMARK OFFICE
CERTIFICATE OF CORRECTION

PATENT NO. : 7,577,782 B2  Page 1 of 1
APPLICATION NO. : 11/002048
DATED : August 18, 2009
INVENTOR(S) : Lym et al.

It is certified that error appears in the above-identified patent and that said Letters Patent is hereby corrected as shown below:

In Claim 13, at column 53, line 19, please replace "devices" with "device;" so that the corresponding claim limitation reads

- establishing a linked list of buffers for receiving isochronous data from a sender device; wherein each of the buffers included in the linked list include capability for a callback completion routine which is activated to call the application at a predetermined completion point during a data transfer operation; -

Signed and Sealed this

Thirteenth Day of October, 2009

David J. Kappos
*Director of the United States Patent and Trademark Office*